(12) United States Patent
Millington et al.

(10) Patent No.: US 7,464,386 B2
(45) Date of Patent: Dec. 9, 2008

(54) DATA CONTROLS ARCHITECTURE

(75) Inventors: Brad Millington, Bellevue, WA (US); Nikhil Kothari, Sammamish, WA (US); Eilon Lipton, Bellevue, WA (US); Polita Huff, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 10/847,648

(22) Filed: May 17, 2004

(65) Prior Publication Data

US 2005/0256834 A1    Nov. 17, 2005

(51) Int. Cl.
G06F 9/44    (2006.01)
G06F 3/00    (2006.01)

(52) U.S. Cl. .................. 719/331; 717/120; 719/328

(58) Field of Classification Search .............. 717/105, 717/106, 107
See application file for complete search history.

(56) References Cited

U.S. PATENT DOCUMENTS

| | | |
|---|---|---|
| 3,937,925 A | 2/1976 | Boothroyd |
| 3,956,615 A | 5/1976 | Anderson et al. |
| 4,186,871 A | 2/1980 | Anderson et al. |
| 4,807,154 A | 2/1989 | Scully et al. |
| 4,847,785 A | 7/1989 | Stephens |
| 4,949,300 A | 8/1990 | Christenson et al. |
| 4,979,148 A | 12/1990 | Bush et al. |
| 5,093,778 A | 3/1992 | Favor et al. |
| 5,299,315 A | 3/1994 | Chin et al. |
| 5,339,424 A | 8/1994 | Fushimi |
| 5,349,657 A | 9/1994 | Lee |
| 5,375,242 A | 12/1994 | Kumar et al. |
| 5,388,156 A | 2/1995 | Blackledge, Jr. et al. |
| 5,434,992 A | 7/1995 | Mattson |
| 5,465,332 A | 11/1995 | Deloye et al. |
| 5,471,318 A | 11/1995 | Ahuja et al. |
| 5,517,655 A | 5/1996 | Collins et al. |
| 5,548,340 A | 8/1996 | Bertram |
| 5,550,560 A | 8/1996 | Kanada et al. |
| 5,577,253 A | 11/1996 | Blickstein |
| 5,604,908 A | 2/1997 | Mortson |
| 5,608,890 A | 3/1997 | Berger et al. |
| 5,613,117 A | 3/1997 | Davidson et al. |
| 5,638,176 A | 6/1997 | Hobbs et al. |
| 5,640,449 A | 6/1997 | Worley et al. |

(Continued)

FOREIGN PATENT DOCUMENTS

EP    01111679 A2    12/2000

(Continued)

OTHER PUBLICATIONS

"Metadata Activity Statement", Feb. 2001, W3C, date unknown.

(Continued)

*Primary Examiner*—Tuan Q. Dam
*Assistant Examiner*—Isaac T Tecklu
(74) *Attorney, Agent, or Firm*—Merchant & Gould, PC

(57) ABSTRACT

Systems and methods for data controls architecture are described. In one aspect, a data source control exposes an interface for generic access to a data store. A data-bound control implements the interface to automatically databind to the data store at an appropriate time during runtime operations of the data-bound control.

39 Claims, 4 Drawing Sheets

U.S. PATENT DOCUMENTS

| | | |
|---|---|---|
| 5,649,131 A | 7/1997 | Ackerman et al. |
| 5,659,753 A | 8/1997 | Murphy et al. |
| 5,664,228 A | 9/1997 | Mital |
| 5,675,520 A | 10/1997 | Pitt, III et al. |
| 5,689,703 A | 11/1997 | Atkinson et al. |
| 5,706,505 A | 1/1998 | Fraley et al. |
| 5,727,159 A | 3/1998 | Kikinis |
| 5,732,256 A | 3/1998 | Smith |
| 5,732,267 A | 3/1998 | Smith |
| 5,745,103 A | 4/1998 | Smith |
| 5,748,890 A | 5/1998 | Goldberg et al. |
| 5,754,774 A | 5/1998 | Bittinger et al. |
| 5,764,235 A | 6/1998 | Hunt et al. |
| 5,764,236 A | 6/1998 | Tanaka |
| 5,764,873 A | 6/1998 | Magid et al. |
| 5,774,670 A | 6/1998 | Montulli |
| 5,793,982 A | 8/1998 | Shrader et al. |
| 5,802,600 A | 9/1998 | Smith et al. |
| 5,812,996 A | 9/1998 | Rubin et al. |
| 5,835,724 A | 11/1998 | Smith |
| 5,855,020 A | 12/1998 | Kirsch |
| 5,873,097 A | 2/1999 | Harris et al. |
| 5,878,141 A | 3/1999 | Daly et al. |
| 5,878,282 A | 3/1999 | Mital |
| 5,889,992 A | 3/1999 | Koerber |
| 5,892,937 A | 4/1999 | Caccavale |
| 5,897,622 A | 4/1999 | Blinn et al. |
| 5,897,644 A | 4/1999 | Nielsen |
| 5,911,068 A | 6/1999 | Zimmerman et al. |
| 5,911,145 A | 6/1999 | Arora et al. |
| 5,918,007 A | 6/1999 | Blackledge, Jr. et al. |
| 5,923,882 A | 7/1999 | Abrams et al. |
| 5,935,207 A | 8/1999 | Logue et al. |
| 5,937,409 A | 8/1999 | Wetherbee |
| 5,940,075 A | 8/1999 | Mutschler, III et al. |
| 5,940,847 A | 8/1999 | Fein et al. |
| 5,953,524 A | 9/1999 | Meng et al. |
| 5,956,489 A | 9/1999 | San Andres et al. |
| 5,961,601 A | 10/1999 | Iyengar |
| 5,963,952 A | 10/1999 | Smith |
| 5,974,430 A | 10/1999 | Mutschler, III et al. |
| 5,983,227 A | 11/1999 | Nazem et al. |
| 5,987,242 A | 11/1999 | Bentley et al. |
| 5,987,247 A | 11/1999 | Lau |
| 5,991,802 A | 11/1999 | Allard et al. |
| 5,995,753 A | 11/1999 | Walker |
| 6,006,230 A | 12/1999 | Ludwug et al. |
| 6,014,637 A | 1/2000 | Fell et al. |
| 6,014,666 A | 1/2000 | Helland et al. |
| 6,023,714 A | 2/2000 | Hill et al. |
| 6,032,207 A | 2/2000 | Wilson |
| 6,038,551 A | 3/2000 | Barlow et al. |
| 6,058,455 A | 5/2000 | Islam et al. |
| 6,059,913 A | 5/2000 | Asmussen et al. |
| 6,061,690 A | 5/2000 | Nori et al. |
| 6,067,413 A | 5/2000 | Gustafsson et al. |
| 6,067,578 A | 5/2000 | Zimmerman et al. |
| 6,072,664 A | 6/2000 | Aoyagi et al. |
| 6,076,108 A | 6/2000 | Courts et al. |
| 6,101,502 A | 8/2000 | Heubner et al. |
| 6,101,607 A | 8/2000 | Bachand et al. |
| 6,108,717 A | 8/2000 | Kimura et al. |
| 6,115,744 A | 9/2000 | Robins |
| 6,119,078 A | 9/2000 | Kobayakawa et al. |
| 6,119,115 A | 9/2000 | Barr |
| 6,119,155 A | 9/2000 | Rossmann et al. |
| 6,121,968 A | 9/2000 | Arcuri et al. |
| 6,122,637 A | 9/2000 | Yohe et al. |
| 6,128,623 A | 10/2000 | Mattis et al. |
| 6,138,150 A | 10/2000 | Nichols et al. |
| 6,138,171 A | 10/2000 | Walker |
| 6,151,624 A | 11/2000 | Teare et al. |
| 6,167,438 A | 12/2000 | Yates et al. |
| 6,167,441 A | 12/2000 | Himmel |
| 6,167,524 A | 12/2000 | Goodnow et al. |
| 6,173,316 B1 | 1/2001 | De Boor et al. |
| 6,178,461 B1 | 1/2001 | Chan et al. |
| 6,185,608 B1 | 2/2001 | Hon et al. |
| 6,185,625 B1 | 2/2001 | Tso et al. |
| 6,202,199 B1 | 3/2001 | Wydogny et al. |
| 6,203,220 B1 | 3/2001 | Takenoshita et al. |
| 6,205,480 B1 | 3/2001 | Broadhurst et al. |
| 6,212,192 B1 | 4/2001 | Mirashrafi et al. |
| 6,218,958 B1 | 4/2001 | Eichstaedt et al. |
| 6,230,160 B1 | 5/2001 | Chan et al. |
| 6,230,313 B1 | 5/2001 | Callahan et al. |
| 6,246,403 B1 | 6/2001 | Tomm |
| 6,246,422 B1 | 6/2001 | Emberling et al. |
| 6,247,044 B1 | 6/2001 | Gosling et al. |
| 6,249,844 B1 | 6/2001 | Schloss et al. |
| 6,253,228 B1 | 6/2001 | Ferris et al. |
| 6,253,234 B1 | 6/2001 | Hunt et al. |
| 6,279,151 B1 | 8/2001 | Breslau et al. |
| 6,282,670 B1 | 8/2001 | Rezaul Islam et al. |
| 6,286,133 B1 | 9/2001 | Hopkins |
| 6,297,819 B1 | 10/2001 | Furst |
| 6,300,947 B1 | 10/2001 | Kanevsky |
| 6,311,215 B1 | 10/2001 | Bakshi et al. |
| 6,326,957 B1 | 12/2001 | Nathan et al. |
| 6,334,126 B1 | 12/2001 | Nagatomo et al. |
| 6,334,157 B1 | 12/2001 | Oppermann et al. |
| 6,336,161 B1 | 1/2002 | Watts |
| 6,343,148 B2 | 1/2002 | Nagy |
| 6,345,279 B1 | 2/2002 | Li et al. |
| 6,351,767 B1 | 2/2002 | Batchelder et al. |
| 6,353,447 B1 | 3/2002 | Truluck et al. |
| 6,353,452 B1 | 3/2002 | Hamada et al. |
| 6,354,477 B1 | 3/2002 | Trummer |
| 6,363,352 B1 | 3/2002 | Dailey et al. |
| 6,370,561 B1 | 4/2002 | Allard et al. |
| 6,370,682 B1 | 4/2002 | Eckardt et al. |
| 6,373,841 B1 | 4/2002 | Goh et al. |
| 6,381,735 B1 | 4/2002 | Hunt |
| 6,397,253 B1 | 5/2002 | Quinlan et al. |
| 6,401,099 B1 | 6/2002 | Koppulu et al. |
| 6,401,132 B1 | 6/2002 | Bellwood et al. |
| 6,405,241 B2 | 6/2002 | Gosling et al. |
| 6,412,008 B1 | 6/2002 | Fields et al. |
| 6,421,717 B1 | 7/2002 | Kloba et al. |
| 6,421,733 B1 | 7/2002 | Tso et al. |
| 6,424,981 B1 | 7/2002 | Isaac et al. |
| 6,426,761 B1 | 7/2002 | Kanevsky et al. |
| 6,430,575 B1 | 8/2002 | Dourish et al. |
| 6,438,576 B1 | 8/2002 | Huang et al. |
| 6,457,030 B1 | 9/2002 | Adams et al. |
| 6,457,172 B1 | 9/2002 | Carmichael et al. |
| 6,460,071 B1 | 10/2002 | Hoffman |
| 6,460,141 B1 | 10/2002 | Olden |
| 6,463,442 B1 * | 10/2002 | Bent et al. ............... 707/103 R |
| 6,466,203 B2 | 10/2002 | Van Ee |
| 6,470,381 B2 | 10/2002 | De Boor et al. |
| 6,473,609 B1 | 10/2002 | Schwartz et al. |
| 6,480,894 B1 | 11/2002 | Courts et al. |
| 6,487,665 B1 | 11/2002 | Andrews et al. |
| 6,496,692 B1 | 12/2002 | Shanahan |
| 6,505,238 B1 | 1/2003 | Tran |
| 6,509,913 B2 | 1/2003 | Martin et al. |
| 6,514,408 B1 | 2/2003 | Smith et al. |
| 6,523,027 B1 | 2/2003 | Underwood |
| 6,535,896 B2 | 3/2003 | Britton et al. |
| 6,539,421 B1 | 3/2003 | Appelman et al. |
| 6,539,501 B1 | 3/2003 | Edwards |
| 6,542,908 B1 | 4/2003 | Ims |
| 6,542,967 B1 | 4/2003 | Major |

| | | |
|---|---|---|
| 6,546,473 B2 | 4/2003 | Cherkasova et al. |
| 6,546,516 B1 | 4/2003 | Wright et al. |
| 6,556,217 B1 | 4/2003 | Makipaa et al. |
| 6,557,038 B1 | 4/2003 | Becker et al. |
| 6,560,598 B2 | 5/2003 | Delo et al. |
| 6,560,618 B1 | 5/2003 | Ims |
| 6,560,639 B1 | 5/2003 | Dan et al. |
| 6,560,699 B1 | 5/2003 | Konkle |
| 6,563,517 B1 | 5/2003 | Bhagwat et al. |
| 6,563,913 B1 | 5/2003 | Kaghazian |
| 6,564,251 B2 | 5/2003 | Katariya et al. |
| 6,591,272 B1 | 7/2003 | Williams |
| 6,593,944 B1 | 7/2003 | Nicolas et al. |
| 6,601,233 B1 | 7/2003 | Underwood |
| 6,606,418 B2 | 8/2003 | Mitchell et al. |
| 6,609,128 B1 | 8/2003 | Underwood |
| 6,610,105 B1 | 8/2003 | Martin et al. |
| 6,622,168 B1 | 9/2003 | Datta |
| 6,633,416 B1 | 10/2003 | Benson |
| 6,643,712 B1 | 11/2003 | Shaw et al. |
| 6,678,518 B2 | 1/2004 | Eerola |
| 6,687,735 B1 | 2/2004 | Logston et al. |
| 6,697,825 B1 | 2/2004 | Underwood et al. |
| 6,704,024 B2 | 3/2004 | Robotham et al. |
| 6,704,728 B1 | 3/2004 | Chang et al. |
| 6,714,794 B1 | 3/2004 | O'Carroll |
| 6,725,219 B2 | 4/2004 | Nelson et al. |
| 6,728,421 B2 | 4/2004 | Kokemohr |
| 6,732,364 B1 | 5/2004 | Bhaskaran et al. |
| 6,738,968 B1 | 5/2004 | Bosworth et al. |
| 6,757,708 B1 | 6/2004 | Craig et al. |
| 6,757,899 B2 | 6/2004 | Zhdankin et al. |
| 6,757,900 B1 | 6/2004 | Burd et al. |
| 6,772,408 B1 | 8/2004 | Velonis et al. |
| 6,782,403 B1 | 8/2004 | Kino et al. |
| 6,789,105 B2 | 9/2004 | Ludwig et al. |
| 6,792,575 B1 | 9/2004 | Samaniego et al. |
| 6,792,605 B1 | 9/2004 | Roberts et al. |
| 6,792,607 B1 * | 9/2004 | Burd et al. ................. 719/316 |
| 6,826,597 B1 | 11/2004 | Lonnroth et al. |
| 6,832,263 B2 | 12/2004 | Polizzi et al. |
| 6,836,883 B1 | 12/2004 | Abrams et al. |
| 6,847,333 B2 | 1/2005 | Bokhour |
| 6,886,013 B1 | 4/2005 | Beranek |
| 6,892,226 B1 | 5/2005 | Tso et al. |
| 6,901,437 B1 | 5/2005 | Li |
| 6,904,600 B1 | 6/2005 | James et al. |
| 6,915,307 B1 | 7/2005 | Mattis et al. |
| 6,915,454 B1 | 7/2005 | Moore et al. |
| 6,918,107 B2 | 7/2005 | Lucas et al. |
| 6,920,480 B2 | 7/2005 | Mitchell et al. |
| 6,922,827 B2 | 7/2005 | Vasilik et al. |
| 6,928,488 B1 | 8/2005 | de Jong et al. |
| 6,944,797 B1 | 9/2005 | Guthrie et al. |
| 6,948,174 B2 | 9/2005 | Chiang et al. |
| 6,950,875 B1 | 9/2005 | Slaughter et al. |
| 6,954,751 B2 | 10/2005 | Christfort et al. |
| 6,954,854 B1 | 10/2005 | Miura et al. |
| 6,961,750 B1 | 11/2005 | Burd et al. |
| 6,961,754 B2 | 11/2005 | Christopoulos et al. |
| 6,961,776 B1 | 11/2005 | Buckingham et al. |
| 6,964,009 B2 | 11/2005 | Samaniego et al. |
| 6,990,653 B1 | 1/2006 | Burd et al. |
| 7,013,340 B1 | 3/2006 | Burd et al. |
| 7,016,963 B1 | 3/2006 | Judd et al. |
| 7,076,786 B2 | 7/2006 | Burd et al. |
| 7,099,870 B2 | 8/2006 | Hsu et al. |
| 7,117,504 B2 * | 10/2006 | Smith et al. ................. 719/328 |
| 7,159,007 B2 | 1/2007 | Stawikowski |
| 7,162,723 B2 | 1/2007 | Guthrie et al. |
| 7,171,443 B2 | 1/2007 | Tiemann et al. |
| 7,171,454 B2 | 1/2007 | Nguyen |
| 7,181,731 B2 | 2/2007 | Pace et al. |
| 7,188,112 B1 | 3/2007 | Lindquist et al. |
| 7,188,155 B2 | 3/2007 | Flurry et al. |
| 7,216,294 B2 | 5/2007 | Gibbs et al. |
| 2001/0013070 A1 | 8/2001 | Sasaki |
| 2001/0018648 A1 * | 8/2001 | Turner et al. ................. 703/22 |
| 2001/0027474 A1 | 10/2001 | Nachman et al. |
| 2001/0037404 A1 | 11/2001 | Hafsteinsson et al. |
| 2001/0047358 A1 | 11/2001 | Tuatini |
| 2001/0054020 A1 | 12/2001 | Barth et al. |
| 2002/0004815 A1 | 1/2002 | Muhlestein et al. |
| 2002/0008703 A1 | 1/2002 | Merrill et al. |
| 2002/0056085 A1 | 5/2002 | Fahraeus |
| 2002/0062396 A1 | 5/2002 | Kakei et al. |
| 2002/0073163 A1 | 6/2002 | Churchill et al. |
| 2002/0078101 A1 | 6/2002 | Chang et al. |
| 2002/0078144 A1 | 6/2002 | Lamkin et al. |
| 2002/0083171 A1 | 6/2002 | Hoogenboom et al. |
| 2002/0095445 A1 | 7/2002 | alSafadi et al. |
| 2002/0107891 A1 | 8/2002 | Leamon et al. |
| 2002/0108102 A1 | 8/2002 | Muhlestein et al. |
| 2002/0116534 A1 | 8/2002 | Teeple |
| 2002/0120677 A1 | 8/2002 | Goward et al. |
| 2002/0120753 A1 | 8/2002 | Levanon et al. |
| 2002/0129016 A1 | 9/2002 | Christfort et al. |
| 2002/0133635 A1 | 9/2002 | Schechter et al. |
| 2002/0138331 A1 | 9/2002 | Hosea et al. |
| 2002/0152244 A1 | 10/2002 | Dean et al. |
| 2002/0161923 A1 | 10/2002 | Ndili |
| 2002/0161938 A1 | 10/2002 | Bonomo et al. |
| 2002/0188890 A1 | 12/2002 | Shupps et al. |
| 2002/0194227 A1 | 12/2002 | Day et al. |
| 2003/0004998 A1 | 1/2003 | Datta |
| 2003/0009476 A1 | 1/2003 | Fomenko et al. |
| 2003/0009519 A1 | 1/2003 | Gosling et al. |
| 2003/0009567 A1 | 1/2003 | Farouk |
| 2003/0018827 A1 | 1/2003 | Gutherie et al. |
| 2003/0025728 A1 | 2/2003 | Ebbo et al. |
| 2003/0028565 A1 | 2/2003 | Landsman et al. |
| 2003/0028892 A1 | 2/2003 | Gewickey et al. |
| 2003/0066056 A1 | 4/2003 | Petersen et al. |
| 2003/0074634 A1 | 4/2003 | Emmelmann |
| 2003/0097639 A1 | 5/2003 | Niyogi et al. |
| 2003/0110234 A1 | 6/2003 | Egli et al. |
| 2003/0187952 A1 | 10/2003 | Young et al. |
| 2003/0204622 A1 | 10/2003 | Blizniak et al. |
| 2003/0233477 A1 | 12/2003 | Ballinger et al. |
| 2004/0003112 A1 | 1/2004 | Alles et al. |
| 2004/0003117 A1 | 1/2004 | McCoy et al. |
| 2004/0003139 A1 | 1/2004 | Cottrille et al. |
| 2004/0003248 A1 | 1/2004 | Arkhipov |
| 2004/0012627 A1 | 1/2004 | Zakharia et al. |
| 2004/0015879 A1 | 1/2004 | Pauw et al. |
| 2004/0030740 A1 | 2/2004 | Stelting |
| 2004/0073873 A1 | 4/2004 | Croney et al. |
| 2004/0172484 A1 | 9/2004 | Hafsteinsson et al. |
| 2004/0218045 A1 | 11/2004 | Bodnar et al. |
| 2004/0230958 A1 | 11/2004 | Alaluf |
| 2005/0066287 A1 * | 3/2005 | Tattrie et al. ................. 715/769 |
| 2005/0091230 A1 | 4/2005 | Ebbo et al. |
| 2005/0138560 A1 | 6/2005 | Lee et al. |
| 2005/0171967 A1 * | 8/2005 | Yuknewicz et al. ......... 707/101 |
| 2005/0193097 A1 | 9/2005 | Guthrie et al. |
| 2005/0229186 A1 | 10/2005 | Mitchell et al. |
| 2005/0251380 A1 | 11/2005 | Calvert et al. |
| 2005/0256834 A1 | 11/2005 | Millington et al. |
| 2005/0256924 A1 | 11/2005 | Chory et al. |
| 2005/0256933 A1 | 11/2005 | Millington et al. |
| 2005/0257138 A1 | 11/2005 | Chory et al. |
| 2005/0268292 A1 | 12/2005 | Ebbo et al. |
| 2005/0278351 A1 | 12/2005 | Niyogi et al. |
| 2006/0004901 A1 | 1/2006 | Burd et al. |
| 2006/0004910 A1 | 1/2006 | Burd et al. |
| 2006/0020883 A1 | 1/2006 | Kothari et al. |

| | | | |
|---|---|---|---|
| 2006/0112336 | A1 | 5/2006 | Gewickey et al. |
| 2006/0130038 | A1 | 6/2006 | Claussen et al. |
| 2007/0005795 | A1 | 1/2007 | Gonzalez |
| 2007/0033533 | A1 | 2/2007 | Sull |
| 2007/0174845 | A1 | 7/2007 | Guthrie et al. |

FOREIGN PATENT DOCUMENTS

| | | |
|---|---|---|
| EP | 1156415 | 11/2001 |
| EP | 1156427 | 11/2001 |
| EP | 1156428 | 11/2001 |
| EP | 1156429 | 11/2001 |
| EP | 1164473 | 12/2001 |
| EP | 1241593 | 3/2002 |
| EP | 01111678.7-2201 | 4/2002 |
| EP | 01111680.3-2201 | 4/2002 |
| EP | 01111681.1-2201 | 4/2002 |
| EP | 01111682.9-2201 | 4/2002 |
| GB | 1367741 | 9/1974 |
| GB | 2339374 A | 1/2000 |
| JP | 11-98134 | 4/1999 |
| JP | 2002-24079 | 1/2002 |
| JP | 2002-41299 | 2/2002 |
| JP | 2002-49484 | 2/2002 |
| JP | 2002-49585 | 2/2002 |
| WO | WO 98/21651 | 5/1998 |
| WO | WO 98/44695 | 10/1998 |
| WO | WO 99/34288 | 7/1999 |
| WO | WO 01/27783 | 4/2001 |
| WO | WO 01/75667 | 10/2001 |
| WO | WO 02/21343 | 3/2002 |

OTHER PUBLICATIONS

"Web Services Description Language (WSDL)", Mar. 2001, W3C, date unknown.
"Metadata Activity Statement", http://web.archive.org/web/20000616163950/http://www.w3.org/Metadata/Activity.html, May 8, 2000, pp. 1-5.
"Spyglass Prism 3.1 Supports the latest Standards for Transmission of Content to Wireless Devices," Internet citation, Jul. 5, 1000, wrong year.
Abrams et al., "UIML an appliance-independent XML user interface language," Computer Networks, Elsevier Science Publishes B.V., Amsterdam, NL, vol. 31, No. 11-16, May 17, 1999 pp. 1695-1708.
Aggarwal, Charu et al., "Caching on the World Wide Web" IEEE Transactions on Knowledge and Data Engineering, vol. 11, No. 1, Jan./Feb. 1999. pp. 94-107, date unknown.
Alves Dos Santos, L.M., "Multimedia Data and tools for Web services over Wireless Platforms," IEEE Personal Communications, Oct. 1998, pp. 42-46, date unknown.
Ballinger, "Fun with SOAP Extensions", Mar. 2001, MSDN, pp. 1-5, date unknown.
Chapter 1 Introduction—"Java Script Language", Netscape Communications, Apr. 23, 2001.
Ciancarini et al., "An extensible rendering engine for XML and HTNL", Computer Networks and ISDN System, North Holland Publishing, vol. 30, No. 1-7, Apr. 1998, pp. 225-237, date unknown.
Davidson, et al., "Schema for Object-Oriented IML 2.0", Jul. 1999, W3 Consortium, pp. 1-29, date unknown.
European Search Report EP 02 00 5786, date unknown.
Flammia, G., "The Wireless Internet Today and Tomorrow," IEEE Intelligent Systems, [Online] vol. 15, Sep. 2000, pp. 82-83, date unknown.
Heins, et al., "Taking Your Information Into the Wireless World: Developing Information for Delivery to Mobile Devices", IEEE, pp. 237-244, Oct. 2001, date unknown.
Howard, "Web Services with ASP.NET", Feb. 2001, MSDN, pp. 1-9, date unknown.
Kaasinen Eija et al.: "Two approaches to bringing internet services to WAP devices," Computer Networks and ISDN Systems, North Holland Publishing, Amsterdam, NL, vol. 33, No. 1, 2000, pp. 231-246, date unknown.
Kaffe, "Server Side Java", Jan. 16, 2998.

Kagal, et al., "Centaurus: A Framework for Intelligent Services in a Mobile Environment", Computer Science and Electrical Engineering, IEEE, pp. 195-201, Apr. 2001, date unknown.
Kirda, "Web Engineering Device Independent Web Services", Distributed Systems Group, IEEE, pp. 795-796, May 2001, date unknown.
Krikelis, A., "Mobile multimedia: shapring the Inforverse", IEEE Concurrency, Jan.-Mar. 1999 pp. 7-9, date unknown.
Moore, M M, et al. "Migrating legacy user interfaces to the internet: shifting dialogue initiative", IEEE, Nov. 23, 2000, pp. 52-58.
Muller-Wilken S. et al.; "On integrating mobile devices into a workflow management scenario," Database and Expert Systems Applications, 2000. Proccedings 11th International Workshop on Sep. 4-8, 2000, Piscataway, NJ, USA, IEEE, pp. 186-190.
Platt, "Thunderclap, the Newsletter of Rolling Thunder Computing", dated to Aug. 2001, vol. 3, No. 2, pp. 1-18, date unknown.
Ren, Robin, "Practical Active Server Pages Technique: Porting Windows CGI Applications to ASP", Microsoft Interactive Developer, No. 10, pp. 89-98, ASCII Corporation, Nov. 18, 1998 (CSDB: Technical Journal in Japan 2000001200009).
Tuecke, "Microsoft Professional Developers Conference Summary", 1996, date unknown.
W3C, SOAP Version 1.2 Specification Jul. 9, 2001 Working Draft, Jul. 2001.
Winer, Dave, "XMP RPC Specification", Jun. 15, 1999.
Yoshikawa, Kazuhiro, et al. "Expanding a System via the Internet: Construction/Operation Points to be Considered: Exploring a Construction/Operation for Improving Reliability and Security", Nikkei Open Systems, No. 63, pp. 182-191, Nikkei Business Publications, Inc., Jun. 15, 1998 (CSBD: Technical Journal in Japan 199800933009).
A.D. Gordon and D Syme, *Typing a Multi-Language Intermediate Code*, submitted to The 28th ACM Principles of Programming Languages, (Feb. 2001), pp. 1-9, date unknown.
European Search Report for EP 01115100, date unknown.
Fabre, Christian et al., *Java-ANDF Feasibility Study Final Report*, Mar. 26, 1997.
Gosling, J. et al., *The Java Language Environment*, A White Paper, Sun Microsystems Computer Company, Oct. 1, 1995 pp. 1, 4-85.
Henglein, Fritz & Jorgensen, Jesper, *Formally Optimal Boxing*, Proceedings of the 21st ACM SIGPLAN-SIGACT, date unknown.
Symposium on Principles of Programming Languages, 1994, pp. 213-216, date unknown.
Johnson, Andrew et al., *The ANDF Technology Program at the OSF RI*, Dec. 8, 1992.
Lindholm, Tim & Yellin, Frank, *The Java Virtual Machine Specification, Second Edition*, Sun Microsystems, 1999, Ch. 2, pp. 1-44, date unknown.
M. Tofte and J.P. Talpin, *Region-Based Memory Management, Information and Computation*, 1997, vol. 132(2), pp. 109-176, date unknown.
Manual page of AR, Free Software Foundation, 1999. Retreived from Internet on Feb. 20, 2008. Retreived from URL: <http://www.freebsd.org/cgi/man.cgi?query=ar&apropos=0&sektion=0&manpath=FreeBSD+4.8-RELEASE&format=html>.
Manual page of GCC, Free Software Foundation, 1998. Retrieved from Internet on Feb. 20, 2008. Retrieved from URL: <http://www.freebsd.org/cgi/man.cgi?query=gcc&apropos=0&sektion=0&manpath=FreeBSD+4.8-RELEASE&format=html>.
Peeling, Dr. N.E., *ANDF Features and Benefits*, Feb. 5, 1993.
Rational, Rose/C++, Rational Software Corporation, whole manual, released 1996, date unknown.
S. Peyton Jones and J. Launchbury, *Unboxed Values as First Class Citizens, In Functional Programming Languages and Computer Architecture*, vol. 523 of Lecture Notes in Computer Science, Springer Verlag, 1991, pp. 636-666, date unknown.
Shao, Zhong, *Flexible Representation Analysis*, Proceedings of the Second ACM SIGPLAN International Conference on Functional Programming, 1997, pp. 85-98, date unknown.
SNAP Using the SNAP Language, Template Software, Chapter 7, published 1997, date unknown.
Software Construction with Examples in ADA, Bo Sanden, published 1994, pp. 104-109, date unknown.

Standard Output of Command, 'ar': contents of '/usr/lib/libbz2.a', print out of files in '/usr/lib/libbz2.a', date unknown.

Thiemann, Peter, *Unboxed Values and Polymorphic Typing Revisiting*, Proceedings of the Seventh International Conference On Functional Programming Languages and Computer Architecture, 1995, pp. 24-35, date unknown.

Visual Object-Oriented Programming, M. Burnett et al., pp. 1-42, 199-274, published 1994, date unknown.

X. Leroy, *Unboxed Objects and Polymorphic*, in *19th ACM SIGPLAN-SIGACT Symposium on Principles of Programming Languages*, ACM Press, 1992, pp. 177-188, date unknown.

Y.G. Park and B. Goldberg, *Escape Analysis On Lists*, in *ACM SIGPLAN on Programming Language Design and Implementation*, ACM Press, 1992, pp. 116-127, date unknown.

"A Brief History of Hypertext", from Microsoft Corporation © 1996, date unknown.

"Alterego Networks Introduces First Mobile Web Server for Enterprises, Telcos and Providers"; Redwood City, CA; Nov. 14, 2000; 3 pages.

"Best Practices for Creating Adaptive User Interfaces with the Mobile Internet Toolkit"; Microsoft Corporation, Jan. 2002; 15 pages, date unknown.

"Best Practices for the Microsoft Mobile Internet Toolkit Image Control"; Microsoft Corporation, Feb. 2002, date unknown.

"Bluestone Software Layes Foundation for Internet Operating Environment with Total-E-Server . . . " Screaming Media, Business Wire; Jun. 5, 2000; 3 pages.

"Developing ASP-Based Applications" from Microsoft Corporation © 1996, date unknown.

"HTML Encyclopaedia"; http://www.scit.wlv.ac.uk/encyc/form.html; 2 pages, date unknown.

"HTTP Made Really Easy—A Practical Guide to Writing Clients and Servers", by Marshall, Aug. 15, 1997.

Anderson, Richard; Homer, Alex; Howard, Rob; Sussman, Dave; "A Preview of Activer Server Pages+"; Copyright 2000, Wrox Press, pp. 1-73, date unknown.

Article, ColdFusion Web Application Server, update and summary, from Allaire Corp—www@allaire.com, date unknown.

Chapter 3, "Mechanics of Developing JavaScript Applications," Server Side Javascript Guide, 'Online! 1999, pp. 51-108, www.Developer.netscape.com/docs/manuals,ssjs/1_4/ssjs.pdf>, date unknown.

Chapter 6, "Session Management Service," Server-Side Javascript Guide, 'Online! 1999, pp. 125-166, www.developer.netscape.com/docs/manuals/ssjs/1_4/ssjs.pdf>, date unknown.

Custer, Helen; "Inside Windows NT"; Microsoft Press 1993; pp. 74-81, date unknown.

Davulcu, Hasan; Freire, Juliana; Kifer, Michael; Ramakrishnan, I.V.; "A Layered Architecture for Querying Dynamic Web Content"; ACM 1999; pp. 491-502, date unknown.

Dobson, R., "Data Binding in Dynamic HTML," DBMS MAG, 'Online! Mar. 1998 pp. 47-52, date unknown.

Dowd, Tyson et al., "Compiling Mercury to the .NET Common Language Runtime," Electronic Notes in Theoretical Computer Sciences 59 No. 1 (Netherlands) (2001), pp. 1-16, date unknown.

Duan, Nick N.; "Distributed Database Access in a Corporate Environment Using Java" Bell Atlantic Corporation; 1996; 8 pages, date unknown.

Esposito, Dino, "Heaven sent," Developer Network Journal, Mar.-Apr. 2001, Matt Publishing, UK, No. 23, pp. 18-24, date unknown.

Franklin, K., "Supercharge Data Binding," Visual Basic Programmer's Journal, Mar. 2000, Fawcette Technical Publications, vol. 10, No. 3, pp. 32-33, 39-40, 42, 44, 46, date unknown.

Frost, Jim: "Windows NT Security"; May 4, 1995; 7 pages; http://world.std.com/~jimf/papers/nt-security/nt-security.html.

Hammock swings through Web Interfaces (3 pages) by Eric Hammond, date unknown.

Hammock(TM), Think of it as Swing(TM) for the Web (10 pages), date unknown.

Hannay, Phillip et al., "MSIL For the .NET Framework: The Next Battleground?", Virus Bulletin Conference, Sep. 2001, pp. 173-196.

Holmes, John W.; e-Mail response to question regarding GET/POST. HTTP request, extracted from Google's News Groups, php.general, Nov. 11, 2002.

Hovanes, Michael E.; Deal, John R. Grizz; Rowberg, Alan H.; "Seamless Multiresolution Display of Portable Wavelet-Compressed Images" Journal of Digital Imaging, vol. 12, No. 2 suppl 1 (May), 1999, pp. 109-111, date unknown.

Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages, date unknown.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79, date unknown.

Kunz, T.; El Shentenawy, M.; Gaddah, A.; Hafez, R.; Image Transcoding for Wireless WWW Access: The User Perspective; Multimedia Computing and Networking 2002, Proceedings of SPIE vol. 467 (2002) pp. 28-33, date unknown.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, Vo. 21, No. 3, Oct. 2001, pp. 131-137.

Li, W.-S., et al., "PowerBookmarks: a system for personalizable Web information organization, sharing, and management," Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. and Systems, Dec. 11, 1999, pp. 179-184, date unknown.

Nadamoto, Akiyo; Kondo, Hiroyuki; Tanaka, Katsumi; "WebCarousel: Restructuring Web Search Results for Passive Viewing in Mobile Environments" IEEE 2001 p. 164-165, date unknown.

"NCSA httpd" nttpd@ncsa.uiuc.edu, date unknown.

O'Leary, M., "Web personalization Does It Your Way," O'Leary Online, vol. 23, No. 2, Mar.-Apr. 1999, pp. 79-80.

OOP Launches Hammock at JavaOne (1 page), date unknown.

Penn, Gerald; Hu Jianying; Luo, Hengbin; McDonald, Ryan; "Flexible Web Document Analysis for Deliver to Narrow-Bandwidth Devices"; IEEE 2001; pp. 1074-1078, date unknown.

Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25, date unknown.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34, date unknown.

Shapiro, M., "A Binding Protocol for Distributed Shared Objects," Proceedings of the International Conference on Distributed Computing Systems, Poznan, Poland, Jun. 21-24, 1994, Los Alamitos, IEEE Comp. Soc. Press, date unknown.

Shi, Weisong; Collins, Eli; Karamcheti, Vijay; "Modeling Object Characteristics of Dynamic Web Content"; Proceedings of the IEEE Global Internet Conference, Nov. 2002, 5 pgs, date unknown.

Solomon, David A. "Inside Windows NT, Second Edition"; Microsoft Press 1998; pp. 310-319, date unknown.

Stewart, Tony: "The Document as Application: Issues and Implications" GCA XML Europe 1999; pp. 575-599, date unknown.

Syme, Don, "ILX: Extending the .NET Common IL for Functional Language Interoperability," Electronic Notes in Theoretical Computer Science 59 No. 1 (2001), pp. 1-20, date unknown.

Varela, Carlos A.; Caroline C. Hayes; "Providing Data on the Web: From Examples to Programs," Second International WWW Conference, Chicago, IL; Oct. 17, 1994; 17 pages.

Wu, Dapeng; Hou, Yiwci Thomas-Zhang, Ya-Qin; "Scalable Video Transport over Wireless IP Networks"; IEEE 2000; pp. 1185-1191, date unknown.

* cited by examiner

DATA CONTROLS ARCHITECTURE

TECHNICAL FIELD

Systems and methods of the invention relate to Web server application development.

BACKGROUND

Certain technologies and frameworks for developing web applications, such as ASP.NET, use the notion of controls that can be dropped on a design surface to quickly develop the outlines of a web application. The controls are further customized through code written by a developer, setting of properties, etc. One class of controls is data-bound controls which are bound to some backend data source and allow access to stored data, such as in a database. To generate a date-bound control, the developer is responsible for programmatically constructing and assigning the associated data source to the data-bound control, for example, by calling a method to explicitly databind the control at an appropriate time in a web page request lifecycle.

For example, databinding occurs at the request of the page developer. The developer is required to retrieve the data manually in code, assign it to a data source property of a data-bound control, and call a data bind method on it to recreate the control tree based on the new data. Whenever an event happened on the data-bound control, such as paging to the next visible set of data records, the programmer was required to call the data binding method again to refresh the rendering of the control. Similarly, when the user requested a data manipulation operation such as updating a record, the programmer needs to retrieve the new data out of the text entry controls on the page, make the necessary calls to the data store to update the record, and then call the data bind method to refresh the rendering of the control. This requirement on the page developer to manually retrieve data in code and force the data-bound control to synchronize with the data was time-consuming and error-prone. To make matters worse, the page developer is forced to learn the architecture and re-implement specific implementation patterns to achieve consistency with standard controls.

In view of the above, systems and methods to reduce the amount of programming effort and detailed knowledge needed by a developer to implement a data-bound control and databind the data-bound control to a data source, and/or to leverage other code that has already been written to perform such function(s), are desirable.

SUMMARY

Systems and methods for data controls architecture are described. In one aspect, a data source control exposes an interface for generic access to a data store. A data-bound control implements the interface to automatically databind to the data store at an appropriate time during runtime operations of the data-bound control.

BRIEF DESCRIPTION OF THE DRAWINGS

In the figures, the left-most digit of a component reference number identifies the particular figure in which the component first appears.

DETAILED DESCRIPTION

Overview

Figure 1:
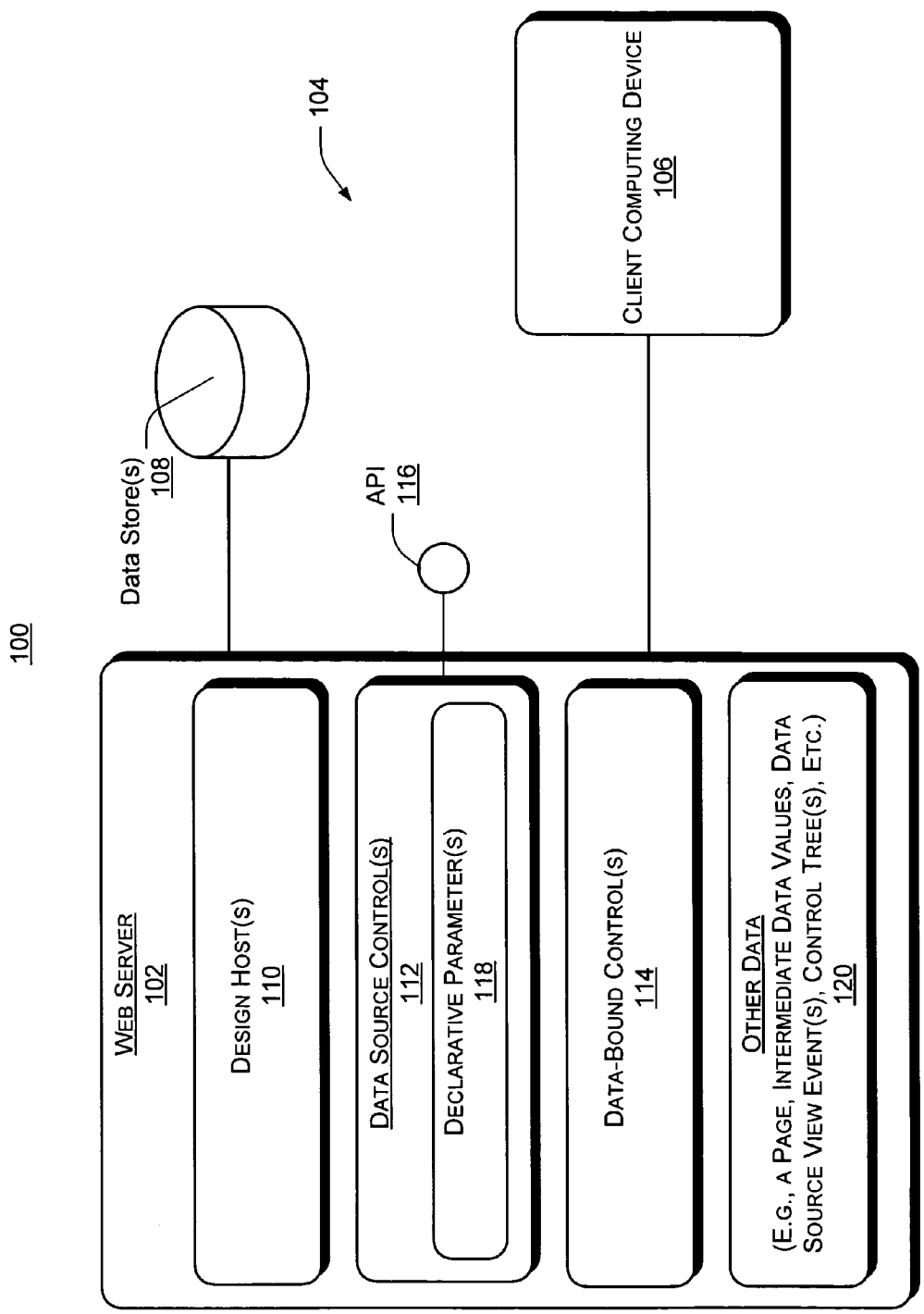
FIG. 1 shows an exemplary system providing a run-time data control architecture/model.

The following systems and methods for data controls architecture provide abstract data source controls that expose an interface generic to substantially all types of tabular and hierarchical data stores, or data sources. More particularly, and as described in greater detail below, the systems and methods for data control architecture provide, for example:

A set of interfaces and base classes that represent the definition of a data source and data-bound control. Data controls can be hierarchical and/or tabular in nature.

A general design pattern for data sources to expose capabilities, and a method for discovering and invoking those capabilities from bound UI controls.

A system for automatically databinding controls within a page request and monitoring data source controls for change events.

A set of data source parameter types for associating external values with inputs to data source operations. Parameters represent query string variables, form elements, cookie, session or personalization values, or other controls on the page, for example.

A collection of exemplary data source implementations that represent, for example, relational databases, business objects, markup (e.g., Extended Markup Language (XML) and DataSet files, site navigation data.

A collection of exemplary data-bound control implementations that render, for example, UI for grid and detail tables, treeviews, and menus on a web page.

The systems and methods providing data control architecture are now described in greater detail.

An Exemplary System

Turning to the drawings, wherein like reference numerals refer to like elements, the systems and methods for a data controls architecture are described and shown as being implemented in a suitable computing environment. Although not required, the invention is described in the general context of computer-executable instructions (program modules) being executed by a computing device. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 providing a runtime data control architecture/model. System 100 includes, for example, Web server 102 coupled across network 104 to a client computing device 106. In one implementation, Web server 102 and client computing device 106 are implemented in an active server page (ASP) technology paradigm such as that provided by ASP.Net having the following described data control architecture implemented therein. Network 104 may include any combination of a local area network (LAN) and general wide area network (WAN) communication environments, such as those which are commonplace in offices, enterprise-wide computer networks, intranets, and the Internet.

Web server 106 is coupled to one or more data store(s) 108/data source(s). A data store 108 can host any type of data. In one implementation, for example, a data store 108 is an SQL component, XML component, a Web Service, a local application component, and/or so on. In view of this, a data store 108 may host hierarchical data or non-hierarchical data of any data type, the data type being a function of the particular implementation of the data store 108.

Web server 102 includes program modules and program data. Program modules include, for example, designer host 110, data source control(s) 112, and data-bound control(s) 114. At design-time, design host 110 allows a page developer to create and configure data source control(s) 112. Data source controls(s) 112 (e.g., IDataSource or IHierarchicalDataSource control(s), both of which are described in greater detail below in Appendix A) are reusable and configured to connect to an underlying data store 108 and interface with virtually any type of data that is associated with the data store 108. Data source control(s) 112 allows the developer to discover and enable respective capabilities of the underlying data source 108 by simply setting properties presented to a user by exposed application programming interface (API) 116. Such properties include, for example, ConnectionString and SelectCommand properties for a database data store 108. Each data source control 112 abstracts a specific data type through API 116 (e.g. IDataSource, IHierarchicalDataSource interface(s)). API 116 is generic to substantially all types of data store(s) 108.

Design host 110 also allows a page developer to add data-bound control(s) 114 to a document such as a page, and associate data-bound control(s) 114 to respective data source control(s) 112. Data-bound controls 114 do not store data; rather, they display data without retaining data longer than required to create a control tree (e.g., see "other data" 120). Data-bound controls 114 include a grid that shows data in tabular form and a treeview that shows data in a hierarchical form. Other data bound controls 114 may show relational data or a combination of prior types of data.

To assist a control developer, system 100 provides base classes for building data-bound controls 114. Such base classes include, for example, BaseDataBoundControl, the most basic class, provides for setting an associated IDataSource control and view name. BaseDataBoundControl exposes events and methods used by inherited controls to create the control structure at the correct time. DataBoundControl inherits from BaseDataBoundControl and adds functionality unique to displaying tabular data. DataBoundControl connects to and retrieves data directly from the DataSourceView at the right time in the page lifecycle, as well as listening for events on the DataSourceView. HierarchicalDataBoundControl also inherits from BaseDataBoundControl and acts much like DataBoundControl, but connects to hierarchical data. Through these classes, writing a data-bound control 114 is greatly simplified and substantially prevents common mistakes and performance problems.

Exemplary classes for implementing data bound control(s) 114 are described below in reference to Appendix B—Exemplary Data-Bound Control Classes.

Data-bound controls 114 are associated with a data source control 112 to consume, render, manipulate, and/or otherwise interface with the underlying data without needing to implement a unique API for each data type being utilized, and without requiring a page developer to write any code. Data-bound controls 114 are visual controls whose rendering depends on data from a data source control 112. An exemplary association between a data source control 112 and a data-bound control 114 is shown in TABLE 1.

TABLE 1

EXEMPLARY DATA SOURCE ASSOCIATION TO A DATA-BOUND CONTROL

```
<form runat="server">
    <asp:GridView id="MyGridView" DataSourceId="MySource"
    runat="server"
/>
    <asp:SqlDataSource id="MySource"
        ConnectionString="server=(local);database=pubs;
        trusted_connection=yes"
        SelectCommand="select * from authors"
        runat="server"
    />
</form>
```

Once associated with a data-bound control 114, a data source control 112 is used to automatically retrieve data from the underlying data store 108 during a page's execution. For instance, during runtime operations, a data-bound control 112 automatically binds at an appropriate time to one or more data stores 108 that underly the associated data source control(s) 112. In this implementation, data-bound controls 114 bind to data when they are first rendered, when control properties change the rendering settings, and/or when their data changes. A control 114 that inherits from DataBoundControl or HierarchicalDataBoundControl automatically receives this functionality. Data-bound controls (those inheriting from either DataBoundControl or HierarchicalDataBoundControl) 114 can set a flag telling the control 114 to bind itself.

In this implementation, at the latest possible time in the page framework, a control 114 will call DataBind, which will in turn call Select on the DataSourceView. When the data-bound control's callback is called, the control 114 creates its control hierarchy and renders itself.

In view of the above, data controls architecture 100 provides a dramatically simplified runtime databinding model as compared to conventional databinding models. In this implementation, if a page developer has opted to call DataBind before the data-bound control 114 does so automatically, the control 114 does not call DataBind again, and thereby avoids redundant data retrieval.

At appropriate time(s) a data-bound control 114 interfaces via API 116 with the data source control 112 to perform any type of operation associated with the data store(s) 108. In one implementation, such operations include, for example, select, sort, page, update, insert, delete operations, and/or other types of operations. In this manner, a data-bound control 114 is able to consume data from the data store(s) 108 and otherwise interface with the data source(s) 108. In this implementation, certain types of data bound control(s) 114, such as GridView and DetailsView data bound control(s) 114 offer automatic paging over data from their associated data source controls 112, which in turn retrieves data from their data store 108. Exemplary scenarios and classes for such data paging capable data source controls 112 are presented below in Appendix C—Exemplary Data Source Paging. Data-bound control(s) 114 also allow for a data source control developer to offer data store data caching in a simple and novel manner. Such caching is described in greater detail below in Appendix D.

Exemplary Reusable Data Source Controls

As indicated above, a data source control(s) 112 abstracts a specific data type through API 116. Data source control(s) 112 are reusable, and can thereby allow a page developer to easily configure respective data-bound control(s) 114 to consumer, render, and/or otherwise interface with specific types of data that underlie the data source control(s) 112. To illustrate such a scenario, consider the following exemplary data source control(s) 112: AccessDataSource, SqlDataSource, SiteMapDataSource, XmlDataSource, ObjectDataSource, and/or so on. Exemplary base classes for a data source control 112 are described below in reference to Appendix A—Exemplary Data Source Control Base Classes. For example:

Object data source controls 112 associate a data-bond control 114 with data exposed, for example, by a business component. Exemplary object data source controls and sample scenarios for their use are described below in reference to Appendix E—Exemplary Aspects of a Data Object Data Source Control.

Structured Query Language (SQL) data source control(s) 112 represent a connection to a database provider and exposes associated database interfaces. Exemplary SQL data source control objects 112 and exemplary use scenarios are described below in reference to Appendix F—Exemplary Aspects of an SQL Data Source Control.

Markup data source controls 112 allow a data-bound control 114 to consume, render, or in any other manner interface with markup in a data source 106 such as a file. In one implementation, markup is Extensible Markup Language (XML). Exemplary XML data source control objects 112 and exemplary use scenarios are described below in reference to Appendix G—Exemplary Aspects of an XML Data Source Control.

A data-bound control 114 (e.g., TreeView or Menu for hierarchical data such as XML) can bind to XML data via an XML data source control 112, relational data (e.g., via tabular data bound controls such as GridView, DetailsView, FormView, and DataList) via an SQL data source control (SqlDataSource), or arbitrary objects that return data (ObjectDataSource) using exactly the same interface exposed by respective one of the data source control(s) 112.

Data Source Views

API 116 offers different data source views (DataSourceView or HierarchicalDataSourceView, see Appendix A) on a data store 108. For instance, a data source control 112 that connects to a database (a respective one of the data store(s) 108) may have different views to represent different tables in the database. A HierarchicalDataSourceView enables navigation through parent-child relationships in the exposed hierarchy of data. Using this navigator, a data-bound control 114 can create a hierarchical rendering, such as an expandable tree view or menu.

Each data source view ("view") inherits from its view type has an associated name such as the table name, and a data-bound control 114 can discover those view names through the GetViewNames method. The view name can then be passed to the data source control's GetView function to retrieve the associated data source view (DataSourceView/HierarchicalDataSourceView). Thus, a view on a data store 108 is self-describing about the operations the view can support. This ability for a data source control 112 provided view to promote operations and make them dynamically discoverable allows for UI controls (e.g., data bound control(s) 114) to automatically take advantage of these capabilities.

For example, a data source view portion of API 116 has methods on it to allow the data source control 112 to retrieve data (Select), insert new data (Insert) in the data store 108, delete data (Delete) from the data store 108, and update data (Update) in the data store 108. Because data retrieval may take a considerable amount of time (for instance, when accessing data offered, for example, by a Web service—an exemplary data store 108—over a slow connection), each of these functions takes a callback method which will be called asynchronously by the data source control 112 (responsive to an operations request) and when associated data has been retrieved. This allows the page and data-bound control 114 to continue execution while the data is fetched.

Not all data stores 108 need to support all available operations. For example, a database data store 108 may not support updating data unless an update command is supplied. Accordingly, and in one implementation, a specific DataSourceView advertises its abilities through a set of properties such as CanUpdate and CanSort. A data-bound control 114 can discover these capabilities to offer (present/display/disable) appropriate UI for a user to take advantage of the supported operations, while disabling the UI for non-supported operations (calling Update on a DataSourceView whose CanUpdate property returns false will result in an exception).

Deleting, updating, and inserting rows in a data store 108 will result in a change in the data in the data store 108. Because multiple data-bound controls 114 can be associated to a single view, other data-bound controls 114 whose rendering depends on the data associated with the view are notified by respective one(s) of the data source control(s) 112 that a change in underlying data has occurred. A view's DataSourceChanged event (shown as a respective portion of "other data" 120) is raised in response to data manipulation events. A data-bound control 114 listening to such an event can re-retrieve data from the view to render an updated view of the data store 108. A DataSourceChanged event is also raised in response to a ParameterCollection ParameterChanged event, described below.

Declarative Data Source Parameters

A data store may parameterize data based on values from other data sources. For instance, a data store may filter or sort data based on the value in a text box on a page. In conventional systems, parameters were typically handled programmatically in page developer code, which placed the burden on the developer to retrieve parameter values at the right time in the page execution lifecycle. Often developers performed this incorrectly or insecurely, resulting in errors or vulnerabilities in their pages.

In contrast to such conventional systems, data controls architecture 100 supports the ability for "smart" data-bound controls 114 to automatically invoke supported runtime operations of an associated data store 108 at appropriate time(s) in page execution via API 116, as exposed by a respective data source control 112. The values passed to these operations, for example, are extracted from input controls filled in by a user, e.g. a textbox rendered by a GridView row in edit mode. When the data-bound control 114 creates these input controls as part of its own rendering, it extracts the input values.

To these ends, data source control(s) 112 provide declarative parameter(s) 118. Parameters 118 offer a declarative and intuitive way for page developers to specify which values for a data source 108 retrieve their values from external sources and how those parameters 118 can be evaluated at runtime. In this implementation, ControlParameter is for retrieving parameter values from page controls at runtime (e.g., just prior to executing an associated command), SessionParameter is for retrieving values from ASP.NET Session State, FormParameter is for retrieving values from the form, CookieParameter is for retrieving values from a browser cookie, ProfileParameter is for retrieving values from ASP.NET profiles, and QueryStringParameter for retrieving values from the page request's query string. This extensible class could be used to create many additional parameters and will automatically work with data sources 108 that have ParameterCollections. See, for example, the section in Appendix F titled "Filtering with Parameterized Objects."

In this implementation, parameters 118 are described declaratively, in tag-based form on the page (kind of like HTML markup). As such parameter(s) 118 encourage a design pattern that is easy (declarative), automatic (in terms of when values are retrieved), and secure (in terms of how parameters are implemented to inject values into a data operation).

When values of a declarative parameter 118 changes, data returned by a data source 108 are also likely changed. A data source 108 can define a ParameterCollection for each operation. In the case of the Select parameters, the data source 108 will request the values of the parameters from the ParameterCollection using the GetValues method at the right time in the page lifecycle. The ParameterCollection will enumerate through each parameter 118 and determines the new value of the parameter 118. If the parameter 118 has stored an old value from the previous postback in ViewState, the parameter 118 will raise its ParameterCollection's ParametersChanged event, which will cause the DataSourceView to raise its DataSourceChanged event. The DataSourceChanged event will in turn cause all data-bound controls 114 associated with the DataSourceView to rebind.

In the case of Update, Insert, or Delete parameters 118, a parameter value change does not indicate that the data retrieved by the data source 108 has changed, so they do not need to be evaluated until Update, Insert, or Delete is called. In this implementation, parameters 118 are merged into a dictionary of values passed to a method to create the collection of values used to execute the update, insert, or delete operation.

Exemplary data source control parameters are described below in Appendix H.

An Exemplary Procedure

Figure 2:
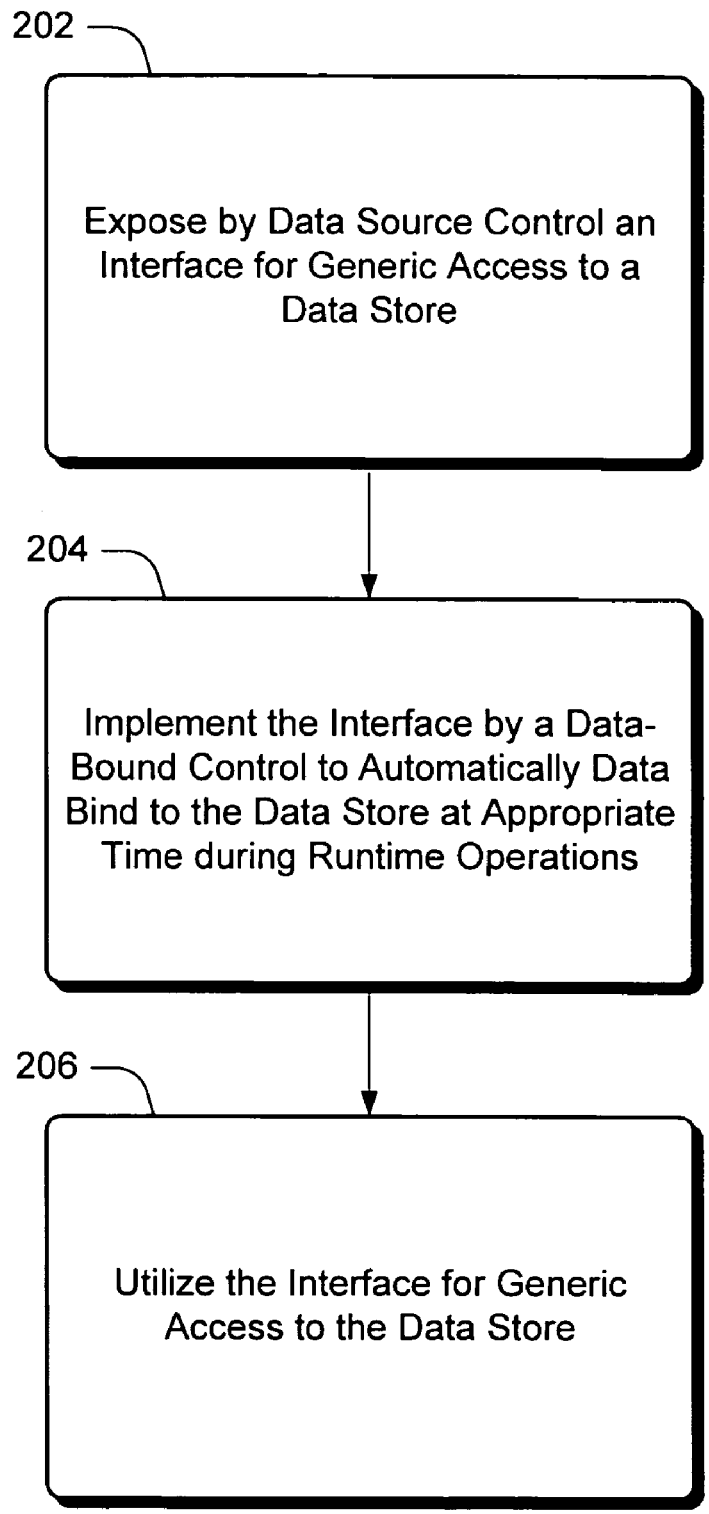
FIG. 2 shows an exemplary procedure for data control architecture.

FIG. 2 illustrates an exemplary procedure 200 for data controls architecture 100 of FIG. 1. For purposes of discussion, operations of the procedure are discussed in relation to the components of FIG. 1. (All reference numbers begin with the number of the drawing in which the component is first introduced). At block 202, a data source control 112 exposes application programming interface (API) 116 for generic access by a data-bound control 114 to a data store 108. The generic access is independent of any specific data store or data type associated with the data store. The generic access includes access to data and/or operations associated with the data store 108. In one implementation, the data is tabular or hierarchical in nature. In one implementation, the data store is associated with a database, a file object, file system data, a universal resource identifier (URI), business data, and/or the like. At block 204, the data-bound control 114 implements API 116 to automatically data bind to the data store 108 at appropriate times during runtime operations. Exemplary aspects of block 204 re described in greater detail below in reference to FIG. 3.

At block 206, API 116 is utilized for generic access to the data store 108. Such generic access includes for example: automatically paging by the data-bound control over data associated with the data store via API 116; automatically caching by the data source control of data store data, and automatic invalidation and purging of cached data when data store data changes. In another example of operations of block 206, the data-bound control 112 utilizes API 116 to dynamically discover operations promoted by a data source view that is exposed by the API; the operations are associated with the underlying data store. The data-bound control may present or disable one or more user interface elements to reflect supported or non-supported operations of the data source as indicated by the dynamically discover operations that were promoted by a data source view. In another example, a data source control 112 may receive a request from the data-bound control to implement one of these dynamically discovered operations. The data source control implements the operation to receive data back from the data store. Responsive to receiving such data, the data source control communicates the data, for example, to a predetermined callback identified by the requesting data-bound control.

Other aspects of the operations of block 206 include, for example, navigating, by a data-bound control 114, parent-child relationships in hierarchical data associated with the data store 108. Such navigation is based on a data source view provided by API 116. Such hierarchical data may be presented in an expanded tree view or menu. Other exemplary operations of block 206 include, for example, automatically implementing by a data-bound control via API 116, parameterized runtime operations with respect to the data store 108. Such automatic implementation is independent of any code developed by page developer to handle any parameter or parameter values. The data source control identifies how parameter values associated with respective ones of the runtime operations are to be evaluated at runtime using declarative parameters maintained by the data source control. Such runtime operations include for example select, insert, update, and/or delete data operations. In one implementation, such declarative parameters are specified in the tag-based data format such as XML.

Figure 3:
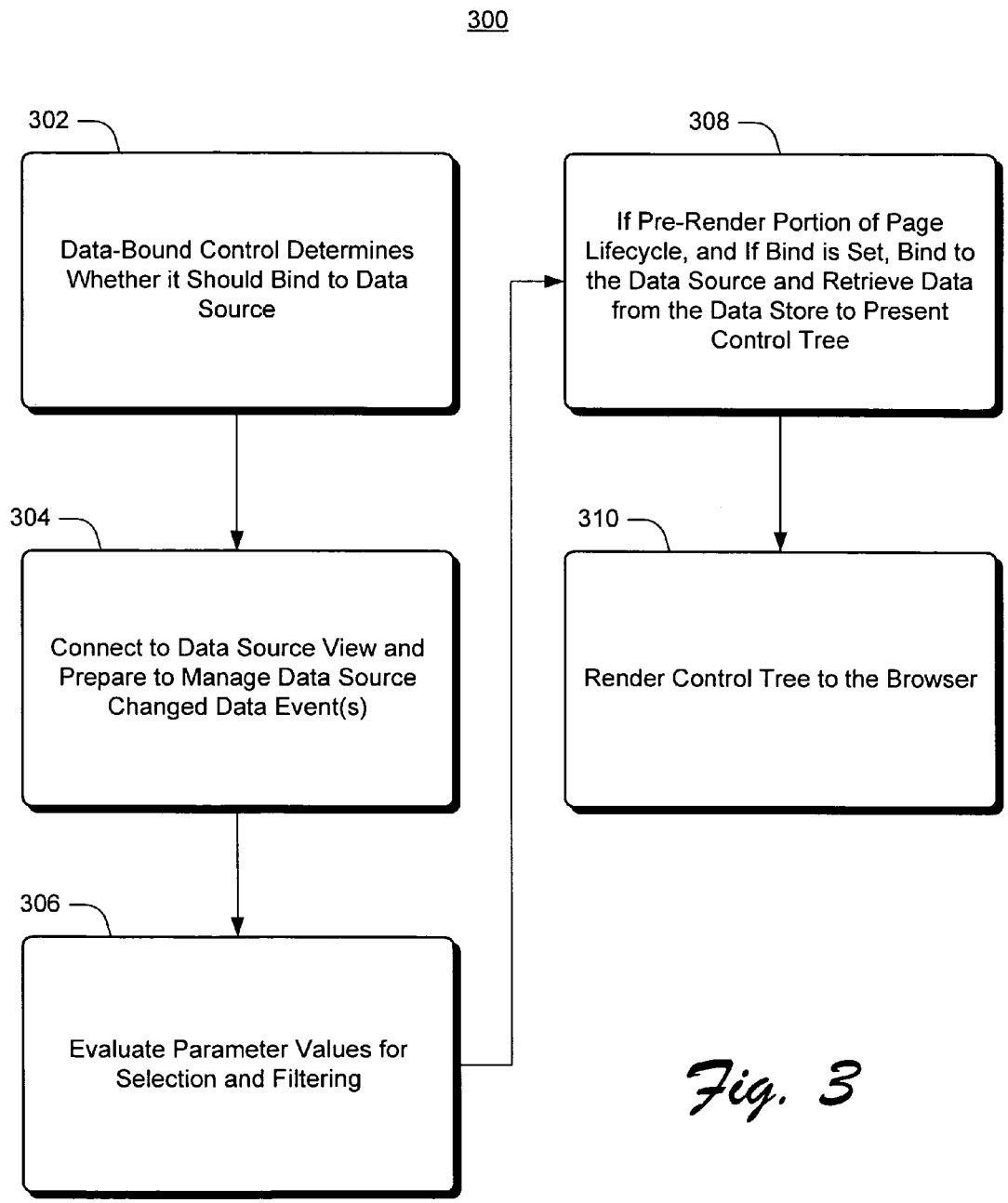
FIG. 3 shows exemplary aspects of a runtime data control lifecycle within a page lifecycle.

FIG. 3 shows exemplary aspects of a runtime data control lifecycle within a page lifecycle. At block 302, data-bound control 114 determines whether it should bind to a data source 108. More particularly, to initialize, the data bound control determines whether it needs to bind based on whether it's a postback page and based on whether view state is enabled. If the data-bound control needs to be bound, it sets required data binding equal to true. In this operation, parameters 118 load their old values from view state to compare against new values for change notifications.

At block 304, the data-bound control 114 connects to data source view exposed by the corresponding data source control 112. The data bound control prepares to manage data changed events from the data source 108. For purposes of discussion, events are processed on the data-bound control. If the data manipulation is required to handle the event, the data-bound control calls update, delete, or insert on the data source view. This causes the data source changed event to be raised. The data-bound control sets uses data binding to true in response to data source view data source changed events. At block 306, data source view evaluates its parameter values for selection and filtering. If any parameters have changed, the parameter collection raises a parameters changed event, which causes the data source view to raise its data source changed event. The data-bound control listens for this event and responsive to receiving that, sets use data binding equal to true.

At block 308, during the page's pre-render portion of a corresponding page's lifecycle, if data binding is set equal to true, the data-bound control 114 binds to the underlying data store 108 and retrieves data from the data store 108 to present in a control tree. For example, the data-bound control calls a data bind interface. Which calls Select on the data source view, passing in a function to be called when the data from the data store 108 is ready. When the data source view receives the Select call, it returns. Asynchronously, the data source view uses values from the parameter collection to create data from the data store 108. When complete, the data source view calls the data-bound control's callback function with the data. At this point, the data-bound control 114 sets use data binding attribute equal to false and creates a control tree. This control tree is saved to view state. Each parameter 118 saves its current value to view state so that changes in value can be raised in the next postback load postback data event.

At block 310, the data-bound control 114 renders the control tree to an application such as a Web browser.

An Exemplary Operating Environment

Figure 4:
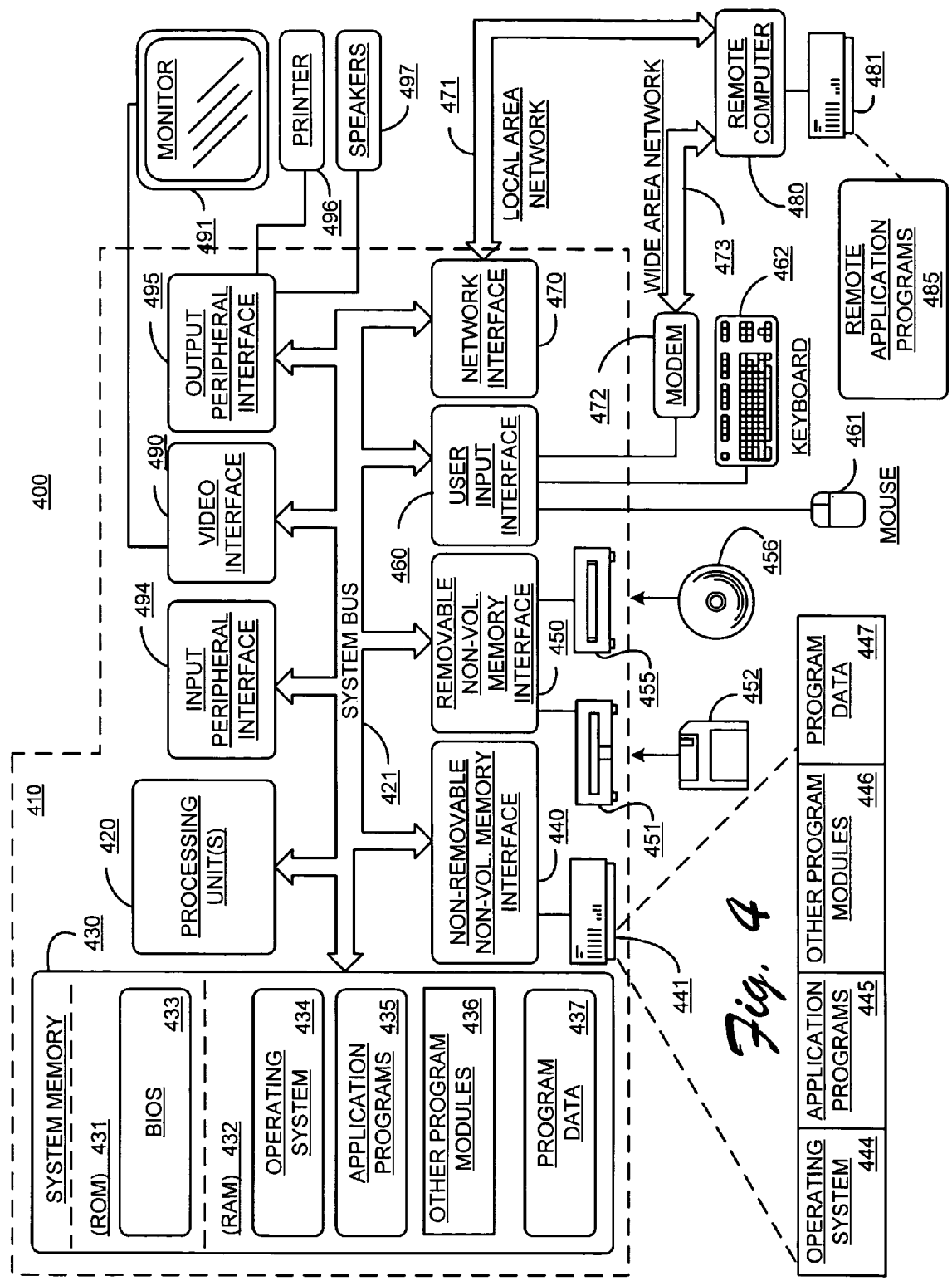
FIG. 4 shows an exemplary suitable computing environment on which the subsequently described systems, apparatuses and methods for data controls architecture may be fully or partially implemented.

FIG. 4 illustrates an example of a suitable computing environment 400 on which the system 40 of FIG. 1 and the methodology of FIGS. 2 and 3 for data controls architecture may be fully or partially implemented. Exemplary computing environment 400 is only one example of a suitable computing environment and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 4, an exemplary system for a data controls architecture includes a general purpose computing device in the form of a computer 410. The following described aspects of computer 410 are exemplary implementations of web server 42 (FIG. 1) and/or client computing device 46. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 437. In one implementation, application programs 435 include design host(s) 110, data source control(s) 112, data-bound control(s) 114, and/or the like. Program data 437 includes data associated with the computer-program modules 435, including data for design host 110, data source control(s) 112, data-bound control(s) 114, other data 120, and/or so on.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 operates in a networked environment using logical connections to one or more remote computers, such as a remote computer 480. The remote computer 480 may be a personal computer, a server, a router, a network PC, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

CONCLUSION

In view of the above, and referring to FIG. 1, a data source control 112 abstracts an underlying data store 108 and exposes properties, capabilities, and data of the data store 108 via an API 116 that is sufficiently generic for all data stores 108. Using this API 116, a data store 108 can be exposed to a page or data-bound control 114 on the page without the page or control 114 being required to understand the unique differences between these data stores 108. A page developer on the other hand, gets a very natural non-generic interface for programming the data source 108. The page developer can interface with a wide variety of data stores (data backends) 108 and implement substantially any of a number of common operational scenarios involving the underlying data store 108 and its data, without having to understand intricate details of how to interface with data backends and without having to generate any page code. This makes it easier for a page developer to build robust, error free pages.

Moreover, data controls architecture 100 is extensible in that a data source control 112 exposes APIs 116 to access any type of data from any type of data store 108, as a function of its specific design architecture. The data controls architecture 100 is also flexible in that it allows new types of data to be supported by a data-bound control 114 via one or more respective data source control(s) 112 after the data-bound control 114 has been implemented/released.

Although the systems and methods for data controls architecture have been described in language specific to structural features and/or methodological operations or actions, it is understood that the implementations defined in the appended claims are not necessarily limited to the specific features or actions described. For example, the systems and methods for data controls architecture of FIGS. 1-4 are not limited to Web page controls, rather the systems and methods apply to any data-source/data-bound control type of UI scenario. Accordingly, the specific features and actions are disclosed as exemplary forms of implementing the claimed subject matter.

Appendix A—Exemplary Data Source Control Base Classes

Data Sources:

---

```
namespace System.Web.UI {
    public interface IDataSource {
        // Events
        event EventHandler DataSourceChanged { add; remove; }
        // Methods
        DataSourceView GetView(string viewName);
        ICollection GetViewNames( );
    }
    public interface IHierarchicalDataSource {
        // Events
        event EventHandler DataSourceChanged { add; remove; }
        // Methods
        HierarchicalDataSourceView GetHierarchicalView(string
        viewPath);
    }
    public abstract class DataSourceView {
        // Constructors
        protected DataSourceView(IDataSource owner, string
        viewName);
        // Properties
        protected EventHandlerList Events { get; }
        public string Name { get; }
        // Events
        public event EventHandler DataSourceViewChanged { add;
        remove; } //
        // Methods
        protected virtual void OnDataSourceViewChanged(EventArgs
        e);
    }
    public abstract class HierarchicalDataSourceView {
        // Constructors
        protected HierarchicalDataSourceView( );
        // Methods
        public abstract IHierarchicalEnumerable Select( );
    }
    public abstract class DataSourceControl : Control, IDataSource,
```

-continued

```
    IListSource {
        protected virtual void RaiseDataSourceChangedEvent(EventArgs
        e);
    }
}
```

Data Bound Controls:

```
namespace System.Web.UI.WebControls {
        public abstract class BaseDataBoundControl : WebControl {
                // Properties
                public virtual object DataSource { get; set; }
                public virtual string DataSourceID { get; set; }
                protected bool Initialized { get; }
                protected bool IsBoundUsingDataSourceID { get; }
                protected bool UsesDataBinding { get; set; }
                // Events
                public event EventHandler DataBound { add; remove; }
                // Methods
                public sealed override void DataBind( );
                protected void EnsureDataBound( );
                protected virtual void OnDataBound(EventArgs e);
                protected virtual void OnDataPropertyChanged( );
                protected virtual void PerformDataBinding( );
                protected abstract void ValidateDataSource(object
                dataSource);
        }
        public abstract class DataBoundControl :
BaseDataBoundControl {
                // Replaces old DataBoundControl, now inherits from
BaseDataBoundControl, and adds tabular-specific functionality
                // Properties
                public virtual string DataMember { get; set; }
                // Methods
                protected DataSourceView GetData( );
                protected IDataSource GetDataSource( );
                protected override void OnDataPropertyChanged( );
                protected virtual void OnDataSourceViewChanged(object
                sender, EventArgs
e);
                protected override void ValidateDataSource(object
                dataSource);
        }
        public abstract class HierarchicalDataBoundControl :
        BaseDataBoundControl {
                // Replaces old HierarchicalDataBoundControl, now
                inherits from
BaseDataBoundControl (used to derive
                // from tabular DataBoundControl), and adds
                hierarchical-specific
functionality
                // Constructors
                protected HierarchicalDataBoundControl( );
                // Methods
                protected HierarchicalDataSourceView GetData(string
                viewPath);
                protected IHierarchicalDataSource GetDataSource( );
                protected override void OnDataPropertyChanged( );
                protected virtual void OnDataSourceChanged(object
                sender, EventArgs e);
                protected override void ValidateDataSource(object
                dataSource);
        }
        public abstract class CompositeDataBoundControl :
        DataBoundControl {
                // Methods
                protected abstract int CreateChildControls(DataSourceView
                view, bool
dataBinding); // Takes DataSourceView
                protected internal override void CreateChildControls( );
                protected override void PerformDataBinding( );
        }
                }
```

Appendix B—Exemplary Data-Bound Control Classes

This implementation includes the DataBoundControl and CompositeDataBoundControl to make it easier to implement smart data-bound controls that can interact well with data source controls. Together these classes will guide the development of consistent data-bound controls.

DataBoundControl

DataBoundControl contains the basic implementation shared by all data-bound controls 110 to allow them to be associated with a data source control, and to allow them to perform automatic data-binding on behalf of the page developer. This class will serve as the basis for data-bound controls such as TreeView and other data-bound controls such as ListControl.

```
Namespace System.Web.UI.Data {
    /// <summary>
    ///   A DataBoundControl is bound to a data source and generates its
    ///   user interface by enumerating the items in the data source it is
    ///   bound to.
    ///
    ///
    ///   DataBoundControl is an abstract base class that defines the
    ///   common characteristics of all controls that use a list as a data
    ///   source, such as SmartGrid, DataBoundTable, ListBox, TreeView
    ///   etc.
    /// </summary>
    [
    Designer(typeof(System.Web.UI.Design.Data.
    DataBoundControlDesigner))
    ]
    public abstract class DataBoundControl : WebControl {
        /// <summary>
        ///   Allows the page developer to toggle the automatic data-binding
        ///   feature of a DataBoundControl when it is bound to a
        ///   DataControl. By default, auto-data-binding is enabled.
        ///  </summary>
        public virtual bool AutoDataBind { get; set; }
        /// <summary>
        ///   The name of the list that the DataBoundControl should bind to
        ///   when its data source contains more than one list of data items.
        /// </summary>
        public virtual string DataMember { get; set; }
        /// <summary>
        ///   The data source to bind to. This allows a DataBoundControl to
        ///    bind to arbitrary lists of data items.
        /// </summary>
        public virtual object DataSource { get; set; }
        /// <summary>
        ///   The ID of the DataSourceControl that this control should use to
        ///    retrieve its data source. When the control is bound to a
        ///    DataControl, it can retrieve a data source instance on-demand,
        ///    and thereby attempt to work in AutoDataBind mode.
        /// </summary>
        public virtual string DataSourceID { get; set; }
        /// <summary>
        /// </summary>
        protected bool UsesDataBinding { get; set; }
        /// <summary>
        /// </summary>
        public override void DataBind( );
        /// <summary>
        /// </summary>
        protected void EnsureDataBound( );
        /// <summary>
        /// </summary>
        /// <returns>
        /// </returns>
        protected virtual object GetDataSource( );
        /// <summary>
        /// </summary>
        /// <returns>
        /// </returns>
```

-continued
```
        protected virtual IEnumerable GetResolvedDataSource( );
        /// <summary>
        /// </summary>
        private void OnDataSourceChanged(object sender, EventArgs e);
        /// <summary>
        /// </summary>
        protected override void OnPreRender(EventArgs e);
        /// <summary>
        /// </summary>
        ///   <param name="dataSource">The data source instance to
    be validated</param>
        protected abstract void ValidateDataSource(object dataSource);
      }
    }
```

CompositeDataBoundControl

The CompositeDataBoundControl extends DataBoundControl and implements the semantics of implementing a DataBoundControl that binds to an Ienumerable and enumerates it to build a control tree. This class will serve as the basis for data-bound controls such as SmartGrid and DetailsView.

```
Namespace System.Web.UI.Data {
      /// <summary>
      /// A CompositeDataBoundControl is bound to a data source and
      /// generates its child control hierarchy, by enumerating the items in
      /// the data source it is bound to.
      ///
      /// CompositeDataBoundControl is an abstract base class that defines
    the common
      /// characteristics of controls such as SmartGrid, DetailsView etc.
      /// </summary>
      [
    Designer(typeof(System.Web.UI.Design.Data.
    CompositeDataBoundControlDesigner))
      ]
      public abstract class CompositeDataBoundControl : DataBoundControl,
                                    InamingContainer {
        /// <summary>
        /// </summary>
        public override ControlCollection Controls { get; }
        /// <summary>
        /// Overriden by DataBoundControl to determine if the control
        /// should recreate its control hierarchy based on values in view
        /// state. If the control hierarchy can be created, i.e. view state does
        /// exist, it calls CreateChildControls with a dummy (empty) data
        /// source which is usable for enumeration purposes only.
        /// </summary>
        public override void CreateChildControls( );
        /// <summary>
        ///   Performs the work of creating the control hierarchy based on a
    data source.
        ///   When dataBinding is true, the specified data source contains real
        ///   data, and the data is supposed to be pushed into the UI.
        ///   When dataBinding is false, the specified data source is a dummy
        ///   data source, that allows enumerating the right number of items,
        ///   but the items themselves are null and do not contain data. In this
        ///   case, the recreated control hierarchy reinitializes its state from
        ///   view state. It enables a DataBoundControl to encapsulate the
        ///   logic of creating its control hierarchy in both modes into a single
        ///   code path.
        /// </summary>
        /// <param name="dataSource">
        ///   The data source to be used to enumerate items.
        /// </param>
        /// <param name="dataBinding">
        ///   Whether the method has been called from DataBind or not.
        /// </param>
        /// <returns>
        ///   The number of items created based on the data source. Put
    another way, its
        ///   the number of items enumerated from the data source.
        /// </returns>
        protected abstract int CreateChildControls(Ienumerable dataSource,
                                    bool dataBinding);
        /// <summary>
        ///   Overriden by DataBoundControl to use its properties to determin
        ///   the real data source that the control should bind to. It then
        ///   clears the existing control hierarchy, and calls
        ///   createChildControls to create a new control hierarchy based on
        ///   the resolved data source.
        ///
        ///   The implementation resolves various data source related
        ///   properties to arrive at the appropriate Ienumerable
        ///   implementation to use as the real data source.
        ///
        ///   When resolving data sources, the DataControlID takes highest
    precedence.
        ///   In this mode, DataMember is used to access the appropriate list
        ///   from the DataControl.
        ///   If DataControlID is not set, the value of the DataSource property
        ///   is used. In this second alternative, DataMember is used to
        ///   extract the appropriate list if the control has been handed an
        ///   IListSource as a data source.
        /// </summary>
        public override void DataBind( );
      }
    }
```

Automatic Data-Binding

Smart data-bound controls 110 contain logic to automatically data-bind at appropriate times on behalf of a page developer.

The support for automatic data-binding is implemented in the DataBoundControl base class. This base class implements the AutoDataBind and UsesDataBinding properties and the EnsureDataBound methods.

The page developer can turn off the automatic data-binding features of a smart data-bound control and assume full control over the data-binding process. Setting this property to False essentially allows page developers to program data-bound controls. Note that this property is meaningful only when the data-bound control's DataSourceID property has been set to a valid DataSourceControl on the page.

In this implementation, a data-bound control 110 invokes its data-binding logic as few times as possible. It therefore delays its data-binding process as late as it can during the page lifecycle. To this end, it tracks the need to perform its data-binding logic using the UsesDataBinding property. The following lists the various scenarios in which UsesDataBinding gets set to True:

OnLoad. In OnLoad during the first request, i.e. when (Page.IsPostBack==false).

This is performed in OnLoad so that the user's Page_Init and Page_Load code has been executed, and the data-bound control can start preparing itself for data-binding.

This is implemented by DataBoundControl.

OnInit. In OnInit during postbacks when the control's view state has been turned off, i.e. when (Page.IsPostBack==true) && (EnableViewState==false).

Note that in this case, the test for EnableViewState needs to account for the fact that view state may have been turned off on a parent control rather than on the data-bound control itself.

This is performed in OnInit so that data-bound control will data-bind before postback processing happens.

This is implemented by DataBoundControl.

DataSourceChanged EventHandler. When the data source control that the data-bound control is bound to raises a DataSourceChanged event.

This is implemented by DataBoundControl.

Property Changes. When the page developer changes a property value of the data-bound control that will use data-binding. For example, if the page developer changes the Fields property or the DataMember property of a SmartGrid, then the control needs to perform its data-binding logic.

FilterChanged EventHandler. When a filter value has changed in a master/detail scenario. For example, if a SmartGrid is a consumer of the IFilterProvider interface implemented by a DropDownList, changes in the DropDownList selection should cause the SmartGrid to perform its data-binding logic.

The UsesDataBinding property is set to False in the DataBind method.

A data-bound control calls EnsureDataBound when it expects to be in a data-bound state. This method invokes the data-binding process if UsesDataBinding is True. There are various scenarios where a call to EnsureDataBound is used:

In OnPreRender. Ensuring that the child control hierarchy has been created (in a SmartGrid) or that child items have been created (in a TreeView and ListControl).
This is implemented by DataBoundControl.

In CreateChildControls. This is to ensure that a data-bound control recreates its control hierarchy via data-binding if its view state has been turned off. Note that UsesDataBinding will be set to true because of the logic in OnInit described above.
This is implemented by CompositeDataBoundControl.

In LoadPostData. This applies to data-bound controls that handle postback data related to items created via data-binding, such as a DropDownList.
Note that UsesDataBinding will be set to true because of the logic in OnInit described above.
This is implemented by specific data-bound control Appendix C—Exemplary Data Source Paging Overview The GridView and DetailsView controls offer automatic paging over their associated data source, provided the data source implements the ICollection interface. Using this method of paging, the data source returns all of the row data, and the GridView or DetailsView only renders a subset of the rows (discarding the rest). For large amounts of data, this UI paging technique is not as performant as a solution where the data source only returns as much data as necessary for the GridView or DetailsView page rendering. To enable this feature, paging semantics are incorporated into the data source control interfaces, so that data-bound controls like GridView and DetailsView can take advantage of this capability at runtime.

Exemplary Scenarios

The Data Source Paging feature enables the following scenarios:

SQL Paging on SqlDataSource.

System 100 of FIG. 1 supports the ability to page over a an SQL Server backend, using the FillPage method on SqlDataAdapter or ExecutePagedReader on SqlCommand. The SqlDataSource control takes advantage of this capability to provide the paging capability at the data source interface level. When the number of rows returned from the Select method is signification, this results in a dramatic improvement in performance over the UI-paging capability of GridView and DetailsView controls.

To enable SQL paging, the page developer simply sets EnableSqlPaging on the data source. The user can optionally provide a SQL command for retrieving the total row count, to aid in the GridView or DetailsView pager rendering.

```
<form runat="server">
  <asp:GridView id="MyGridView" DataSourceId="MySource"
     AllowPaging="true" PageSize="5" runat="server" />
  <asp:SqlDataSource Id="MySource"
     ConnectionString='<%$ ConnectionStrings:Pubs %>'
     SelectCommand="select * from authors"
     SelectCountCommand="select count(*) from authors"
     EnableSqlPaging="true"
     runat="server"/>
</form>
```

EXAMPLE

SQL Paging Support in SqlDataSource

Sorting with SqlDataSource Paging Enabled.

When both sorting and paging are enabled, the desired behavior is to sort first, and then page over the sorted result (there is a similar interaction with filtering). For SqlDataSource, this means that sorting can be performed as part of the select operation. However, the SqlDataSource has no way to automatically associate the SortExpression passed by the data-bound control with a parameter of the SelectCommand. It is up to the user to supply this manually, as shown below.

```
<script runat="server">
  void MyGridView_Sorting(Object sender, GridViewSortEventArgs e) {
    switch (e.SortExpression) {
      case "city":
        MySource.SelectParameters["sortBy"] = 0;
        break;
      case "zip":
        MySource.SelectParameters["sortBy"] = 1;
        break;
    }
    e.Cancel = true;
  }
</script>
<form runat="server">
  <asp:GridView id="MyGridView" DataSourceId="MySource"
AllowSorting="true"
    AllowPaging="true" PageSize="5" OnSorting=
    "MyGridView_Sorting"
runat="server" >
  ...
  </asp:GridView>
  <asp:SqlDataSource Id="MySource"
    ConnectionString='<%$ ConnectionStrings:Pubs %>'
    SelectCommand="GetAuthorsSorted"
    SelectCountCommand="select count(*) from authors"
    EnableSqlPaging="true"
    runat="server">
    <SelectParameters>
      <asp:ControlParameter Name="state" ControlId=
        "DropDownList1"/>
      <asp:Parameter Name="sortBy" DefaultValue="0"/>
      <asp:Parameter Name="sortOrder" DefaultValue="0"/>
    </SelectParameters>
  </asp:SqlDataSource>
</form>
```

EXAMPLE

Sorting with SqlDataSource Paging Enabled

For the above example, the stored procedure might be written as follows:

```
CREATE PROCEDURE GetAuthorsByState
(
    @state char(2),
    @sortBy int,
    @sortOrder bit
) AS
BEGIN
    IF @sortBy = 0 AND @sortOrder = 0
        SELECT * from Authors WHERE state = @state ORDER BY city DESC
    ELSE IF @sortBy = 0 AND @sortOrder = 1
        SELECT * from Authors WHERE state = @state ORDER BY city ASC
    IF @sortBy = 1 AND @sortOrder = 0
        SELECT * from Authors WHERE state = @state ORDER BY zip DESC
    ELSE IF @sortBy = 1 AND @sortOrder = 1
        SELECT * from Authors WHERE state = @state ORDER BY zip ASC
END
GO
```

EXAMPLE

Sorting in a SQL Stored Procedure

Note that the user cancels the GridView sorting operation to prevent the SortExpression from being passed to the data source.

Specification

Paging will now be supported at the data source interface level. To enable this, a boolean CanPage property and overloaded Select method will be added to DataSourceView:

```
namespace System.Web.UI.Data
{
  public abstract class DataSourceView
  {
    public virtual bool CanPage { get; }
    public virtual bool CanQueryTotalRowCount { get; }
    ...
    public abstract IEnumerable ExecuteSelect
(DataSourceSelectArguments arguments);
  }
}
```

EXAMPLE

DataSourceView Paging Support

When the CanPage property of a data source is true, it is valid to call the Select method overload with paging options defined. StartRowIndex specifies the index of the first row to retrieve, while MaximumRows specifies the maximum number of rows to return from the query. Unrelated to paging, the SortExpression has also been made part of the Select operation. This supports the ability for multiple data-bound controls to bind to the same data source with different SortExpressions.

When CanPage is true, a data source may optionally support the ability to get total number of rows that would be returned from the unpaged Select method. This is typically useful to a data-bound control that wants to render better paging UI, such as the ability to move to the last record. When SupportsRowCount is true, it is valid to call the Select method that returns a rowCount output parameter. The reason this is made part of the actual Select operation instead of a separate method is because getting the total row count may actually be an expensive operation that can be performed at the same time as selecting data rows. The rowCount is typically only retrieved once, when the first set of records is retrieved.

If CanPage is true but SupportsRowCount is false, the total number of rows is indeterminant.

SqlDataSource Paging Support

The SqlDataSource control will implement this interface using the new SQL paging feature. This feature is supported by an overloaded Fill method on SqlDataAdapter that accepts a startRecord index and maxRecords count. In DataSet mode, the SqlDataSource uses this method:

public int Fill(DataSet dataSet, int startRecord, int maxRecords);

EXAMPLE

SqlDataAdapter Fill Method

There is an equivalent method on SqlCommand that returns a DataReader:

public SqlDataReader ExecutePageReader(CommandBehavior behavior, int startRow, int pageSize);

EXAMPLE

SqlCommand ExecutePagedReader Method

The paging capability of SqlDataSource is enabled by the page developer using the EnableSqlPaging boolean property. This property is false by default, so that sorting "just works" by default (the GridView and DetailsView controls can still support UI paging in this case). When EnableSqlPaging is true, the CanPage property of SqlDataSourceView becomes true and CanSort becomes false. The user can still support sorting manually; see "Scenarios" above for an example of sorting when SQL paging is enabled.

```
<asp:SqlDataSource Id="MySource"
  ConnectionString='<%$ ConnectionStrings:Pubs %>'
  SelectCommand="select * from authors"
  EnableSqlPaging="true"
  runat="server"/>
```

EXAMPLE

SqlDataSource EnableSqlPaging Property

In this implementation, SqlDataSource returns false by default from the SupportsRowCount property. However, the page developer may specify an optional SelectCountCommand property on this data source to specify a query that returns the total record count for the select command.

```
<asp:SqlDataSource Id="MySource"
    ConnectionString='<%$ ConnectionStrings:Pubs %>'
    SelectCommand="select * from authors"
    SelectCountCommand="select count(*) from authors"
    EnableSqlPaging="true"
    runat="server"/>
```

EXAMPLE

SqlDataSource SelectCountCommand Property

When the SelectCountCommand property is specified, the SqlDataSource returns this value as the rowCount output parameter of Select. If the returned value cannot be cast to an integer, the SqlDataSource throws an error that informs the user that SelectCountCommand must return an integer value.

Data-bound Control Paging Support

The GridView and DetailsView controls each support paging over the items in their data source. To enable paging behavior, the Page developer simply sets the AllowPaging property to true, as demonstrated in the example below. For GridView, the developer can also optionally set the number of rows to display per page using the PageSize property (defaults to 10). The total number of data rows divided by the PageSize is exposed as a separate read-only PageCount property.

```
<form runat="server">
    <asp:GridView id="MyGridView" DataSourceId="MySource"
        AllowPaging="true" PageSize="5" runat="server" />
    <asp:SqlDataSource id="MySource"
        ConnectionString="server=(local);database=pubs;
        trusted_connection=yes"
        SelectCommand="select * from authors"
        runat="server" />
</form>
```

EXAMPLE

Paging Data Using GridView

When the data source control does not support the paging capability (CanPage is false), the GridView and DetailsView page over their items by retrieving all records from the data source (using the Select method), and only rendering the records for the current page. Because this uses random access to the data source records, it currently only works if the return value from the Select method supports the ICollection interface. For example, the GridView can page over a DataSet or DataTable, but not a DataReader returned from SqlDataSource.

With the introduction of the SQL paging feature, SqlDataSource will be able to page over both a DataSet or DataReader. When the page developer sets EnableSqlPaging on the data source, CanPage becomes true (from the data-bound control's perspective). In this case, the data-bound control will always use the overloaded Select method that accepts startRowIndex and maximumRows, and can page over the SqlDataSource records regardless of return type.

When the Row Count is Unknown . . .

When the the SqlDataSource SupportsRowCount property is false, the GridView and DetailsView adjust their pager UI to account for the fact that the total number of rows is unknown. Instead of retrieving one data page at a time, they retrieve as many pages as is necessary to determine the number of pager buttons to display. In Numeric paging mode, a combination of the PageButtonCount and PageSize determines the number of records to retrieve.

In general, the GridView or DetailsView retrieves as many rows as necessary to fill the current page, plus as many pages as there are pager buttons in front of the selected page. One extra record is retrieved in order to determine whether to render the ellipses ( . . . ) for navigating to the next group of pager buttons.

As an example, consider the case where the database contains 25 records, the PageSize is 5 and the PageButtonCount is 3. One the first request, the grid retrieves data for startRecord=0 and maxRecords=16. Because 16 rows are returned, the grid knows to render all three pager buttons, plus the ellipses (because there is at least one more page to display). The grid still only renders the data records for the current PageIndex, e.g. records 0-4 for PageIndex 1. The remaining records are discarded.

Record 0
Record 1
Record 2
Record 3
Record 4
<u>1</u> 2 3 . . .

If the user clicks the ellipses, the grid retrieves data for startRecord=15 and maxRecords=16. This time, only 10 records are returned, so the grid renders only two pager buttons, plus the ellipses for going back (this is always rendered when PageIndex>1 and the pager button for page 1 is not visible). As before, the grid renders the only records for the current PageIndex, e.g. records 15-19 for PageIndex 4.

Record 15
Record 16
Record 17
Record 18
Record 19
. . . <u>4</u> 5

The general formula is actually a bit more complex, since the selected page may not be the first page among the visible pager buttons, but the general idea is the same.

This works similarly when the the pager is in Next/Prev mode. In this case, the grid only looks ahead one row (to determine whether to render the Next button). The number of records retrieved is given by:

startRowIndex=$1^{st}$ row in the selected PageIndex maximumRows=PageSize+1

Note that if the data source SupportsRowCount property is false and the pager is in NextPrevFirstLast mode or NumericFirstLast mode, the Last button is always omitted.

When the Row Count is Known . . .

When the user has specified a SelectCountCommand, the SqlDataSource is able to return a known total record count from the rowCount output parameter of the Select method. In this case, the GridView and DetailsView can render paging buttons based on this row count, instead of retrieving extra data records for this purpose. In this case, the SqlDataSource only retrieves as many data records as required to fill the current page:

startRowIndex=1$^{st}$ row in the selected PageIndex
maximumRows=PageSize

Note that the rowCount is only retrieved on the very first call to the Select method on the data source. The GridView and DetailsView controls retain this count in the ControlState dictionary to be reused across postbacks.

Appendix D—Exemplary Data Source Caching

Overview

This appendix describes the general design pattern for caching that is shared by all of data source controls 112 (DataSource controls).

Scenarios

DataSource caching makes several data scenarios more performant. This section illustrates three scenarios where caching makes a difference.

Read-Only Paged Report. The automatic paging features of GridView and DetailsView only implement paging at the UI-level (all data is retrieved from the DataSource on the server, but only a portion of the data is rendered). Because of this, it is important that our DataSource controls have the ability to retrieve this data from the cache, and not just from the data backend (e.g. SQL database) on every page request. The following example demonstrates a GridView with paging enabled, bound to a SqlDataSource which caches its data for 10 minutes at a time.

```
// Stock quote report, stale by 10 minutes
<form runat="server">
  <asp:GridView    DataSourceId="MySource"    AllowPaging=
"true"
runat="server"/>
  <asp:SqlDataSource id="MySource"
    EnableCaching="true"
    CacheDuration="600"
    ConnectionString="server=(local);database=
    pubs;trusted_connection=yes"
    SelectCommand="select * from stock_quotes"
    runat="server"
  />
</form>
```

EXAMPLE

GridView w/Paging Bound to Cached SqlDataSource Data

Master-Details Filtered Report. It is common to retrieve an entire table of moderately-sized data and then apply a filter to that data based on UI selection from the client. For example, consider the scenario below where documents are listed for several authors, and a dropdownlist is provided to select the particular author name to filter by. In this scenario, the document data is retrieved only once from the database, and subsequently retrieved from cache in order to apply the filter. In this example, the cache entry is refreshed every 10 minutes.

```
<form runat="server">
  <asp:DropDownList                id="AuthorsDropDown"
```

-continued

```
    DataSourceId="MyAuthorSource"
    DataTextField="AuthorName"
    AutoPostBack="true"
    runat="server"
  />
  <asp:GridView id="MyGridView" DataSourceId="MySource"
  runat="server"
  />
  <asp:SqlDataSource id="MySource"
    ConnectionString="server=(local);database=
    specs;trusted_connection=yes"
    SelectCommand="select * from specs"
    FilterExpression="author = @author"
    EnableCaching="true"
    CacheDuration="600"
    runat="server"
  >
    <FilterParameters>
      <asp:ControlParameter Name="author" ControlId=
      "AuthorsDropDown"
        PropertyName="SelectedValue" />
    </FilterParameters>
  </asp:SqlDataSource>
  <asp:SqlDataSource id="MyAuthorSource"
    ConnectionString="server=(local);database=
    specs;trusted_connection=yes"
    SelectCommand="select DISTINCT author from specs"
    EnableCaching ="true"
    CacheDuration="600"
    runat="server"
  />
</form>
```

EXAMPLE

GridView Bound to Filtered/Cached SqlDataSource Data

SQL Cache Invalidation. A new SQL cache invalidation feature, enables a cache entry to be invalidated and purged from cache when a backend database table changes. Using this feature it is possible to cache UI data indefinitely until an update to backend data is made, as demonstrated in the following example.

```
<%-- Renders a list of authors, with a link to get book details... --%>
<asp:GridView id="MyGridView"
  DataSourceId="MySource"
  DataKeyNames="au_id"
  runat="server">
  <ColumnFields>
    <asp:BoundField HeaderText="Last Name" DataField="au_lname" />
    <asp:BoundField HeaderText="First Name" DataField=
    "au_fname" />
    <asp:ButtonField    ButtonType="Link"    CommandName="select"
Text="Books..."/>
  </ColumnFields>
</asp:GridView>
<%-- Renders the books for a specific author, one book at a time
     (with next/prev buttons for paging) --%>
<asp:DetailsView runat="server"
  DataSourceId="MyDetailsSource"
  AllowPaging="true"
/>
<asp:SqlDataSource id="MySource"
  EnableCaching="true"
  CacheDuration="Infinite"
  SqlCacheDependency="pubs:Authors;"
```

-continued

```
ConnectionString="server=(local);database=
pubs;trusted_connection=yes"
    SelectCommand="select * from authors"
    runat="server"
/>
<asp:SqlDataSource id="MyDetailsSource"
    EnableCaching="true"
    CacheDuration="Infinite"
    SqlCacheDependency="pubs:Authors;pubs:TitleAuthor"
    ConnectionString="server=(local);database=
pubs;trusted_connection=yes"
    SelectCommand="select * from titles where title_id IN (select
title_id from titleauthor where au_id = @authorId)"
    runat="server"
>
    <SelectParameters>
      <asp:ControlParameter Name="authorId" ControlId="MyGridView"
PropertyName="SelectedDataKey['au_id']" />
    </SelectParameters>
</asp:SqlDataSource>
```

EXAMPLE

Master-Details Report using SQL Cache Invalidation

Specification

DataSources provide APIs for specifying how data can be cached. Many aspects of caching are handled by the control implicitly, for example the generation of the cache key or the default expiry policy (time-based, file-based, other). Other settings may be specified by the Page developer, for example the duration to store data in the cache when using a time-based expiration. Note that the caching feature is targetted at the Page developer, who specifies when and how caching can be performed; caching can be transparent to DataBound controls.

The caching semantics for each DataSource control are generally specific to that control, and there is no common caching implementation provided at the DataSource base-class level (implementing caching is completely optional).

Enabling Cache Support. DataSource control caching implementations will support a basic time-based expiry mechanism. Caching may or may not be enabled by default depending on the particular control, but may be explicitly enabled or disabled using a boolean EnableCaching property. Each DataSource control specifies a non-zero cache duration that is an appropriate default for that control.

SqlDataSource and AccessDataSource

The SqlDataSource control includes support for the SqlClient, ODBC, OLEDB, and Oracle managed providers. This control supports the default time-based cache expiration policy and an optional SqlCacheDependency-based expiry policy that is only valid for the SqlClient provider. The AccessDataSource control, which derives from SqlDataSource, adds an implicit file-based dependency to the source MDB file.

Caching is off by default (EnableCaching=false) for SqlDataSource, but caching can be documented as a best practice. When EnableCaching=true and a cache duration (in seconds) is specified, caching is enabled. Note that an absolute expiration policy is used by default, but can be configured by the Page developer to use a sliding window expiration, where the duration is reset each time the cache entry is accessed. The following example demonstrates an Access-DataSource control that caches data to expire every hour (unless the underlying data file changes, which would force an early expiration).

```
<asp:AccessDataSource
    DataFile="GrocerToGo.mdb"
    SelectCommand="select * from products"
    EnableCaching="true"
    CacheDuration="3600"
    runat="server"
/>
```

EXAMPLE

Setting the Cache Duration on a DbDataSource Control

A unique cache key is created for each combination of cache parameters, ConnectionString, SelectParameters and SelectCommand. This causes each individual "view" of the DataSource control to receive a separate cache entry. Note that it also has the side-effect of allowing identical views (even in different pages) to share a cache entry. Each unique set of cache properties, such as Duration and ExpirationPolicy, also cause a unique cache key to be created. The cache key is one-way hashed to protect the source data used to generate it.

Generating the cache key using SelectParameters allows cache entries to vary by user-specific data or page-level parameters, and so on. For example, to vary a cache key by user identity a developer might include a SelectParameter that references a session variable, personalization variable, or user identity name. The latter is demonstrated by the Example below.

```
<asp:SqlDataSource
ConnectionString="server=(local);database=
preferences;trusted_connection=yes"
    SelectCommand="select * from Favorites where userId = @uid"
    EnableCaching="true"
    CacheDuration="1200"
    runat="server"
>
    <SelectParameters>
      <asp:PageParameter Name="uid" PropertyName=
"User.Identity.Name"/>
    </SelectParameters>
</asp:SqlDataSource>
```

EXAMPLE

Varying Cache Key by User Identity

SQL Cache Invalidation Support.

The SqlDataSource control additionally supports SqlCacheDependency-based expiry (provided the service has been configured for the database server). The dependency is specified as a string property, matching the same format as supported by the related Page directive. The syntax is of the form "a:b", where (a) refers to a named database under the <cache><sqlCacheDependency> section of web.config, and (b) refers to a specific table name for that connection. Multiple table dependencies can be specified in a semicolon-delimited fashion, e.g. "a:b;a:b;a:b". For more information regarding SQL cache dependencies, refer to the SQL Cache Dependency specification.

The following example demonstrates a SqlCacheDependency defined for a SqlDataSource control. The cache duration is set to "Infinite" so that the entry never expires unless the backend table data changes (uses a type converter on the integer Duration property).

```
<asp:SqlDataSource
    ConnectionString="server=(local);database=
    pubs;trusted_connection=yes"
    SelectCommand="select * from authors"
    EnableCaching="true"
    CacheDuration="Infinite"
    SqlCacheDependency="pubs:Authors;"
    runat="server"
/>
```

EXAMPLE

Configuring a SqlCacheDependency for a SqlDataSource Control

Multiple table dependencies may be defined as well, as shown in the example below:

```
<asp:SqlDataSource
    ConnectionString="server=(local);database=
    pubs;trusted_connection=yes"
    SelectCommand="SelectAuthorTitles"
    EnableCaching="true"
    CacheDuration="1200"
    SqlCacheDependency="pubs:Authors;pubs:TitleAuthor"
    runat="server"
>
    <SelectParameters>
        <asp:ControlParameter Name="au_id" ControlId="MyDropDown"
            PropertyName="SelectedValue"/>
    </SelectParameters>
</asp:SqlDataSource>
```

EXAMPLE

Defining Multiple SqlCacheInvalidation Table Dependencies

Note that SqlCacheInvalidation is ideal for Web-farm scenarios, because an update from one machine in the farm can cause a cache invalidation for other machines in the farm.

XmlDataSource and DataSetDatasource

XmlDataSource and XmlDataSetDataSource perform caching and file monitoring automatically, e.g. EnableCaching=true and CacheDuration=Infinite by default, and implicitly adds a file dependency on the source XML DataFile (and SchemaFile or TransformFile, if defined). The cache key is computed from the hash of dependent file paths. Although basic caching is enabled by default, the base Cache object properties (Enabled, Duration, ExpirationPolicy, KeyDependency) are also user-customizable. Refer to the XmlDataSource and DataSetDataSource specifications for the exact object model.

WebServiceDataSource and ObjectDataSource

WebServiceDataSource exposes the base Cache object properties, and caching is off by default (EnableCaching=false). No implicit dependencies. The cache key is computed from the hash of the object (or Web Service proxy) identifier, method name, and parameter values.

Note that one use for ObjectDataSource is to interface with a business-logic component that retrieves data from a SQL database. The ObjectDataSource does not provide automatic support for SqlCacheInvalidation, but the object's implementation may handle this in custom code (possibly using a SqlDataSource).

SqlXmlDataSource

SqlXmlDataSource (NYI) behaves exactly like SqlDataSource.

Object Model Reference

```
namespace System.Web.UI
{
    public abstract class DataSourceCache : IStateManager
    {
        public const int Infinite = Int32.MaxValue;
        // Properties
        public virtual bool        Enabled         { get; set; }
        public virtual int         Duration        { get; set; }
        public virtual             ExpirationPolicy  { get; set; }
        DataSourceCacheExpiry
        public virtual String      KeyDependency   { get; set; }
        // Methods
        public void Invalidate (HttpContext context, String key);
        public Object LoadDataFromCache (HttpContext context,
            String key);
        protected virtual void SaveDataToCache
            (HttpContext context, String key, Object data,
        CacheDependency dependency);
        // IStateManager implementation
        protected StateBag ViewState { get; }
        protected bool IsTrackingViewState { get; }
        protected virtual Object SaveViewState (void);
        protected void TrackViewState (void);
        protected virtual void LoadViewState (Object savedState);
    }
    public sealed class SqlDataSourceCache : DataSourceCache
    {
        // Properties
        public String         SqlCacheDependency    { get; set; }
        // Methods
        public void SaveDataToCache (HttpContext context, String key,
    Object data);
    }
    public sealed class FileDataSourceCache : DataSourceCache
    {
        // Methods
        public void SaveDataToCache
            (HttpContext context, String key, Object data,
            String[ ] filenames);
    }
    public enum DataSourceCacheExpiry
    {
        Absolute = 0,
        Sliding = 1
    }
}
    Persistence Format
<asp:SqlDataSource
    EnableCaching="[true\false]"
    CacheDuration="int"
    CacheExpirationPolicy="DataSourceCacheExpiry"
    SqlCacheDependency="String"
    ConnectionString="server=(local);database=
    pubs;trusted_connection=yes"
    SelectCommand="select * from authors"
    ...
    runat="server"
/>
```

Appendix E—Exemplary Aspects of a Data Object Data Source

2. Overview

ObjectDataSource enables a completely declarative model for associating data-bound controls with the data exposed from a business component. It also takes advantage of declarative parameters for extracting values from page variables or controls to pass to the object's methods. Like all data source controls 112, ObjectDataSource exposes a common interface to data-bound control authors and is self-describing about its capabilities.

ObjectDataSource makes assumptions about the objects that it binds against in order to simplify the object model. For example, in this implementation, objects are assumed to be stateless with a default constructor, having methods that easily map to select, update, insert, and delete semantics. Additionally, updates are assumed to be performed one item at a time, rather than batched Specification ObjectDataSource allows object methods to be associated with the common DataSource select, update, insert, and delete operations. The simplest usage of ObjectDataSource defines an object type to instantiate and a select method that returns an IEnumerable or DataSet. If a method returns a DataSet, ObjectDataSource automatically extracts the default DataView (which implements IEnumerable), to return from the Select operation. The TypeName property defines the object type to create and the SelectMethod defines the method to invoke for retrieving data. The value assigned to the TypeName property can be a simple type name for objects in the code or bin directory, or a fully-qualified type name for objects in the global assembly cache (this uses a reference in the <assemblies> section of machine.config). ObjectDataSource just calls Type.GetType on this value at run-time.

```
<form runat="server">
    <asp:GridView DataSourceId="MySource" runat="server"/>
    <asp:ObjectDataSource Id="MySource"
    TypeName="IBuySomething.Commerce.ProductsDB"
    SelectMethod="GetProducts"
    runat="server"/>
</form>
```

EXAMPLE

Simple ObjectDataSource Usage

Object Instantiation and Lifetime The object associated with ObjectDataSource has a default constructor (no parameters). It is also assumed to be stateless, as ObjectDataSource will create and dispose the object for each method call, rather than holding it in memory for the lifetime of the request. If the object implements IDisposable, the Dispose method will be called on the object before releasing the object reference. Note that if the method to invoke is static, the object will not be instantiated at all. ObjectDataSource also exposes ObjectCreated and ObjectDisposing events to give the user access to the object instance before and after method invocation. These events can be used to set properties or make additional method calls on the object.

```
public void ObjectDataSource_ObjectCreated (Object sender,
   ObjectDataSourceEventArgs e) {
     ProductsDB myObj = (ProductsDB)e.ObjectInstance;
}
public void ObjectDataSource_ObjectDisposing (Object sender,
   ObjectDataSourceDisposingEventArgs e) {
     ProductsDB myObj = (ProductsDB)e.ObjectInstance;
}
```

EXAMPLE

Handling the ObjectCreated and ObjectDisposing Events

If the object does not have a default constructor, the developer may handle OnCreating event to instantiate the object programmatically instead of allowing the ObjectDataSource to create it. When the object is created through the OnCreating event, the OnCreated event is not fired. Note that the user may also cancel the OnDisposing event to ensure the object is not disposed after each method call, if the object implements IDisposable.

```
public void ObjectDataSource_ObjectCreating (Object sender,
   ObjectDataSourceEventArgs e) {
     e.ObjectInstance = new ProductsFactory(int regionID);
}
```

EXAMPLE

Handling the ObjectCreating Event

Associating Object Methods. A unique method may be invoked for each data source operation, defined by the SelectMethod, UpdateMethod, InsertMethod, and DeleteMethod properties. If a method is static, the object is not instantiated in order to make the method call (ObjectDataSource reflects against MethodInfo at run-time). ObjectDataSource will resolve method overloads on the basis of the names and number of parameters, but not types. The ObjectDataSource expects the SelectMethod to return either an IEnumerable or a DataSet. The Insert, Update, and Delete methods nearly always have associated parameters, and may optionally also have a return value. For more information regarding parameters, refer to section 3.0.3 below.

```
<asp:ObjectDataSource Id="MySource"
   TypeName="UsersDB"
   SelectMethod="GetUsers"
   InsertMethod="AddUser"
   UpdateMethod="UpdateUser"
   DeleteMethod="DeleteUser"
   runat="server">
   ...parameters...
</asp:ObjectDataSource>
```

EXAMPLE

Defining Methods for ObjectDataSource Operations

An object may optionally decorate its methods with a DataObjectMethodAttribute for associating them with one of these data source operations (represented by the DataObjectMethodType enumeration). This attribute may also indicate the default method method on the object for a particular data source operation. This attribute is primarily used at design-time to enable the design-time wizard to and property grid to automatically set the ObjectDataSource method properties when the TypeName property is set (see section 3.1 below), however it is also used at run-time to resolve overloads when there is more than one method on the object that takes the same number of parameters with identical names (ObjectDataSource cannot resolve method overloads on the basis of data type). Note, however, that a method property can be set to any method of the object, not just those marked with the DataObjectMethod attribute.

```
public class ShoppingCart {
  [DataObjectMethodAttribute(DataSourceOperation.Select)]
  public SqlDataReader GetItems(string cartID);
  [DataObjectSourceMethodAttribute(DataSourceOperation.Update)]
  public void UpdateItem(string cartID, int productID, int quantity);
  [DataObjectSourceMethodAttribute(DataSourceOperation.Delete)]
  public void RemoveItem(string cartID, int productID);
}
```

EXAMPLE

Using the ObjectDataSourceMethodAttribute

Associating Method Parameters. If a method takes parameters, the values are obtained from an associated parameters collection: SelectParameters, InsertParameters, UpdateParameters, or DeleteParameters. The collection contains Parameters objects (any object deriving from System.Web.UI.WebControls.Parameter), which can extract values from page-level intrinsics, variables, cookies, or other controls.

```
<form runat="server">
  Enter a new quantity: <asp:TextBox Id="MyTextBox" runat="server"/>
  <asp:Button Text="Submit" OnClick="DoUpdate" runat="server"/>
  <asp:ObjectDataSource Id="MySource"
    TypeName="ShoppingCartDB"
    UpdateMethod="UpdateItem"
    runat="server">
    <UpdateParameters>
      <asp:CookieParameter Name="cartId" CookieName="CartId"/>
      <asp:QueryStringParameter Name="productId"
        RequestField="ProductId"/>
      <asp:ControlParameter Name="quantity" ControlId="MyTextBox" />
    </UpdateParameters>
  </asp:ObjectDataSource>
</form>
```

EXAMPLE

Associating Parameters to ObjectDataSource Methods

The parameters collection for a particular operation can also be populated dynamically by a data-bound control, such as GridView or DetailsView. In this case, the parameters are passed as a dictionary directly to one of the ObjectDataSourceView methods, e.g. Insert (IDictionary values). Note that the data-bound control will pass parameters according to the order they appear in the UI, whereas ObjectDataSource expects parameters in order of the method signature. To remedy this disconnect, the ObjectDataSource will automatically reorder parameters passed to the view to match the order of parameters defined in the associated method signature (using reflection). The matching of parameter names is case-insensitive. ObjectDataSource will type-cast parameters according to the parameter types specified on the Parameter objects.

The Update, Insert and Delete methods usually accept a parameter for each property of the data item object, for example:

InsertAuthor(int au_id, String name, String city, String state, bool contract);

UpdateAuthor(int au_id, String name, String city, String state, bool contract);

DeleteAuthor(int au_id);

However, these methods might also accept an aggregate class type, such as an Author object:

InsertAuthor(Author a);

UpdateAuthor(Author a);

DeleteAuthor(Author a);

To support this scenario, the developer can set the DataObjectTypeName property to indicate this type. The ObjectDataSource in turn will instantiate this type (assuming a default constructor) and set its public properties to the values in the parameters dictionary for the operation before invoking the method.

```
<asp:ObjectDataSource Id="MySource"
  TypeName="Pubs.AuthorsDB"
  DataObjectTypeName="Pubs.Author"
  UpdateMethod="GetAuthors"
  UpdateMethod="UpdateAuthor"
  runat="server"/>
```

EXAMPLE

Setting the DataObjectTypeName Property

If the user needs to insert or modify parameters programmatically before the method is invoked, he/she may handle the Selecting, Inserting, Updating, or Deleting events of ObjectDataSource. The InputParameters property of ObjectDataSourceMethodEventArgs already contains any values extracted from the associated Parameters collection, and/or values populated from a data-bound control.

```
void      ObjectDataSource_Inserting      (Object      sender,
ObjectDataSourceMethodEventArgs e) {
  String value = e.InputParameters["value"].ToString( );
  params["value"] = HtmlEncode(value);
}
```

EXAMPLE

Modifying Parameter Values from User Code

It is common to have return values or reference parameters output from one or more of a business object's methods. The developer can handle the OnSelected, OnInserted, OnUpdated, or OnDeleted events to retrieve these values from the passed in event args, as demonstrated in the example below. Note that unlike SqlDataSource, ObjectDataSource does not use the Direction property to be set on items in the Parameters collection in order to identify reference parameters, since this may be obtained through reflection.

```
void        ObjectDataSource_Inserted        (Object        sender,
ObjectDataSourceStatusEventArgs e) {
    int retval = (int)e.ReturnValue;
    String value = e.OutputParameters["value"].ToString( );
}
```

EXAMPLE

Getting Return Values or Output Parameters from a Method

Caching and Filtering Selected Data. ObjectDataSource supports caching of the data returned from the SelectMethod, but not caching of the object itself. The cache key is computed from the TypeName, Method, and Parameter values. To enable caching, the developer sets the EnableCaching property to true, optionally setting related properties such as CacheDuration, CacheExpirationPolicy, or SqlCacheDependency. Refer to the DataSource Caching specification for more information about these properties.

```
<asp:ObjectDataSource id="MySource"
    TypeName="AuthorsDB"
    SelectMethod="GetAuthors"
    EnableCaching="true"
    CacheDuration="Infinite"
    SqlCacheDependency="pubs:Authors;"
    runat="server"
/>
```

EXAMPLE

Caching Method Data from ObjectDataSource

ObjectDataSource also exposes a FilterExpression property which can be used to apply a filter to the data returned from the SelectMethod, if the data is represented by a DataSet, DataTable, or DataView object. The format of the filter expression matches the syntax expected by the DataView.RowFilter property. This feature is most powerful when used in conjunction with caching, as shown in the example below.

```
<form runat="server">
    <asp:DropDownList Id="MyDropDown"
        DataSourceId="GetAuthors"
        DataTextField="state"
        runat="server"/>
    <asp:GridView Id="MyGrid"
        DataSourceId="GetAuthorsForState"
        DataTextField="state"
        runat="server"/>
    <asp:ObjectDataSource id="GetAuthorsForState"
        TypeName="AuthorsDB"
        SelectMethod="GetAuthors"
        EnableCaching="true"
        CacheDuration="Infinite"
        SqlCacheDependency="pubs:Authors;"
        FilterExpression="state=@state"
        runat="server"
    >
        <FilterParameters>
            <asp:ControlParameter Name="state" ControlId="MyDropDown" />
        </FilterParameters>
    </asp:ObjectDataSource>
    <asp:ObjectDataSource id="GetAuthors"
        TypeName="AuthorsDB"
        SelectMethod="GetAuthors"
        EnableCaching="true"
        CacheDuration="Infinite"
        SqlCacheDependency="pubs:Authors;"
        runat="server"
    />
</form>
```

EXAMPLE

Filtering Cached Data

Note: When a FilterParameter is undefined or equals null, the filter is not applied to the data. FilterParameters are also not used for the purposes of computing the cache key, since the filter is applied post-retrieval from the cache.

Sorting and Paging in the SelectMethod Implementation. If the method associated with the SelectMethod property returns a DataSet, DataView, or DataTable, the ObjectDataSource will automatically support sorting over the returned result. However, it is sometimes desirable to apply sorting in the implementation of the method itself. To support this scenario, the ObjectDataSource exposes a SortParameterName property, which can be set to the name of the parameter of the SelectMethod that can be associated with the sort expression passed by the data-bound control when the Select operation is invoked. This expression will be passed to the parameter on the object, which can apply sorting logic.

```
<asp:ObjectDataSource ID="MySource"
    TypeName="CustomCompany.CustomersDatabase"
    SelectMethod="GetCustomers"
    SortParameterName="sortex"
    runat="server"/>
```

EXAMPLE

Using the SortParameterName Property

Object Model Reference

```
namespace System.Web.UI.WebControls
{
    public class ObjectDataSource : DataSourceControl
    {
        // Properties
        public String              TypeName              { get; set; }
        public String              DataObjectTypeName    { get; set; }
        public String              SelectMethod          { get; set; }
        public String              InsertMethod          { get; set; }
        public String              UpdateMethod          { get; set; }
        public String              DeleteMethod          { get; set; }
        public String              FilterExpression      { get; set; }
        public ParameterCollection SelectParameters      { get; }
        public ParameterCollection InsertParameters      { get; }
        public ParameterCollection UpdateParameters      { get; }
        public ParameterCollection DeleteParameters      { get; }
        public ParameterCollection FilterParameters      { get; }
        public String       SortParameterName     { get; set; }
        public String       RowIndexParameterName { get; set; }
        public String       MaxRowsParameterName  { get; set; }
        public String          SelectMethod                 { get; set; }
        public virtual bool            EnablePaging           { get; set; }
        public virtual bool            EnableCaching          { get; set; }
        public virtual int             CacheDuration          { get; set; }
        public virtual DataSourceCacheExpiry   CacheExpirationPolicy  { get; set; }
        public virtual String          SqlCacheDependency     { get; set; }
        // Events
        public event ObjectDataSourceObjectEventHandler...
                                       ObjectCreating         {   add; remove; }
                                       ObjectCreated          {   add; remove; }
        public event ObjectDataSourceDisposingEventHandler...
                                       ObjectDisposing        { add; remove; }
        public event ObjectDataSourceMethodEventHandler...
                                       Selecting              { add; remove; }
                                       Inserting              { add; remove; }
                                       Updating               { add; remove; }
                                       Deleting               { add; remove; }
        public event ObjectDataSourceStatusEventHandler...
                                       Selected               { add; remove; }
                                       Inserted               { add; remove; }
                                       Updated                { add; remove; }
                                       Deleted                {   add; remove; }
        // Constructors
        public ObjectDataSource (void);
        public ObjectDataSource (String typeName, String selectMethod);
        // Methods
        public IEnumerable Select (void);
        public int Insert (void);
        public int Update (void);
        public int Delete (void);
        protected virtual void OnObjectCreating (ObjectDataSourceEventArgs e);
        protected virtual void OnObjectCreated (ObjectDataSourceEventArgs e);
        protected      virtual     void       OnObjectDisposing (ObjectDataSourceDisposingEventArgs e);
        protected virtual void OnSelecting (ObjectDataSourceMethodEventArgs e);
        protected virtual void OnInserting (ObjectDataSourceMethodEventArgs e);
        protected virtual void OnUpdating (ObjectDataSourceMethodEventArgs e);
        protected virtual void OnDeleting (ObjectDataSourceMethodEventArgs e);
        protected virtual void OnSelected (ObjectDataSourceStatusEventArgs e);
        protected virtual void OnInserted (ObjectDataSourceStatusEventArgs e);
        protected virtual void OnUpdated (ObjectDataSourceStatusEventArgs e);
        protected virtual void OnDeleted (ObjectDataSourceStatusEventArgs e);
        // IDataSource Implementation
```

-continued

```
            protected override DataSourceView GetView (String viewName);
            protected override ICollection GetViewNames (void);
            // IStateManager Implementation
            protected override void LoadViewState (Object savedState);
            protected override object SaveViewState (void);
            protected override void TrackViewState (void);
    }
        public class ObjectDataSourceEventArgs : EventArgs
        {
            // Properties
            Object                          ObjectInstance
        { get; set; }
        }
        public class ObjectDataSourceDisposingEventArgs : CancelEventArgs
        {
            // Properties
            Object                          ObjectInstance
        { get; }
        }
        public class ObjectDataSourceMethodEventArgs : EventArgs
        {
            // Properties
            public IOrderedDictionary       InputParameters         { get;
}
        }
        public class ObjectDataSourceStatusEventArgs : EventArgs
        {
            // Properties
            public Object                   ReturnValue
        { get; }
            public IOrderedDictionary       OutputParameters        { get;
}
            public Exception                Exception
        { get; }
            public bool                     ExceptionHandled        { get;
set; }
        }
}
namespace System.ComponentModel {
        [AttributeUsage(AttributeTargets.Method)]
        public sealed class DataObjectMethodAttribute : Attribute {
            {
                public      DataObjectMethodAttribute(DataObjectMethodType
methodType);
                public      DataObjectMethodAttribute(DataObjectMethodType
methodType,
                    bool isDefault);
                public bool IsDefault { get; }
                public DataObjectMethodType MethodType { get; }
            }
        [AttributeUsage(AttributeTargets.Class)]
        public sealed class DataObjectAttribute : Attribute
        {
            public static readonly DataObjectAttribute DataObject
                = new DataObjectAttribute(true);
            public static readonly DataObjectAttribute NonDataObject
                = new DataObjectAttribute(false);
            public static readonly DataObjectAttribute Default
                = NonDataObject;
            public DataObjectAttribute( );
            public DataObjectAttribute(bool isDataObject);
            public bool IsDataObject { get; }
        }
        public enum DataObjectMethodType
        {
            Fill = 0,
            Select = 1,
            Update = 2,
            Insert = 3,
            Delete = 4
        }
}
```

3. Persistence Format

```
<asp:ObjectDataSource
    TypeName="String"
    DataObjectTypeName="String"
    SelectMethod="String"
    UpdateMethod="String"
    InsertMethod="String"
    DeleteMethod="String"
    FilterExpression="String"
    EnableCaching="[true\false]"
    CacheDuration="int"
    CacheExpirationPolicy="DataSourceCacheExpiry"
    SqlCacheDependency="String"
    OnSelecting="ObjectDataSourceMethodEventHandler"
    OnUpdating="ObjectDataSourceMethodEventHandler"
    OnInserting="ObjectDataSourceMethodEventHandler"
    OnDeleting="ObjectDataSourceMethodEventHandler"
    OnSelected="ObjectDataSourceStatusEventHandler"
    OnUpdated="ObjectDataSourceStatusEventHandler"
    OnInserted="ObjectDataSourceStatusEventHandler"
    OnDeleted="ObjectDataSourceStatusEventHandler"
    OnObjectCreating="ObjectDataSourceObjectEventHandler"
    OnObjectCreated="ObjectDataSourceObjectEventHandler"
    OnObjectDisposing="ObjectDataSourceDisposingEventHandler"
    runat="server">
    <SelectParameters>
        [<System.Web.UI.WebControls.Parameter ...>]
    </SelectParameters>
    <UpdateParameters>
        [<System.Web.UI.WebControls.Parameter ...>]
    </UpdateParameters>
    <DeleteParameters>
        [<System.Web.UI.WebControls.Parameter ...>]
    </DeleteParameters>
    <InsertParameters>
        [<System.Web.UI.WebControls.Parameter ...>]
    </InsertParameters>
    <FilterParameters>
        [<System.Web.UI.WebControls.Parameter ...>]
    </FilterParameters>
</asp:ObjectDataSource>
```

Appendix F—Exemplary Aspects of an SQL Data Source Control

Overview

The SqlDataSource control is a data source control 112 that represents a connection to an SQL database provider, such as SQL, OLEDB, ODBC, Oracle, and/or the like. In this implementation, a separate AccessDataSource control is implemented, although it is possible to connect to other objects such as Access with an SqlDataSource as well. Like all data source controls, the SqlDataSource control can be declaratively bound to any data-bound control 110. SqlDataSource is self-describing about its capabilities (select, insert, update, delete, sort) so that data-bound controls can provide automatic behavior when a capability is present.

Scenarios

In the example below, a SqlDataSource control exposes the result of a stored procedure (specified as the SelectCommand property), which is data-bound to a DropDownList control. Note that the page developer does not need to write any code to perform this common read-only databinding scenario. In the example below, the SqlDataSource uses the System.Data.OleDb provider, specified by the ProviderName property. Note that if this property is not explicitly specified, the System.Data.SqlClient provider is implied.

```
<form runat="server">
    <asp:SqlDataSource id="MySource" runat="server"
        ProviderName="System.Data.OleDb"
        ConnectionString="Data Source=GrocerToGo;Integrated Security=SSPI;"
        SelectCommand="sp_GetProductCategories"/>
    Select a Product Category:
    <asp:DropDownList DataSourceId="MySource" runat="server"/>
</form>
```

EXAMPLE

Binding a Stored Procedure Result to a DropDownList

Filtering with Parameterized Queries.

The SqlDataSource control exposes several ParameterCollection properties which can contain bindings for parameters in the select, insert, update, and delete commands. The actual parameter syntax depends on the control's underlying provider, specified by the ProviderName property (e.g. for System.Data.SqlClient, the parameters are prefixed by an '@' character). These parameters can be bound to the property value of another control on the page, or to a request (querystring) or session value. Parameter values are added to the associated command's Parameters collection at runtime, just prior to executing the command.

```
<asp:SqlDataSource id="MySource" runat="server"
    ConnectionString="server=aspnet;database=messagedb;Trusted Connection=true"
    SelectCommand="SELECT @count * FROM Messages WHERE Topic LIKE @searchFor">
    <SelectParameters>
        <asp:ControlParameter    Name="count"    ControlId="Num"
PropertyName="SelectedValue" />
        <asp:RequestParameter    Name="searchFor"
RequestField="SearchFor"    DefaultValue="" />
    </SelectParameters>
</asp:SqlDataSource>
Results To Display:
<asp:DropDownList id="Num" runat="server">
    <asp:ListItem Selected>10</asp:ListItem>
    <asp:ListItem>100</asp:ListItem>
    <asp:ListItem>1000</asp:ListItem>
</asp:DropDownList>
<asp:GridView DataSourceId="MySource" runat="server"/>
```

EXAMPLE

Binding to a Parameterized Query

Editing and Deleting Data Rows.

When an UpdateCommand property or DeleteCommand property is specified, the SqlDataSource can perform edit and delete operations. Like the preceding scenario, these commands may contain parameters to be bound to an associated ParameterCollection. In the example below, the GridView control exposes edit and delete UI for the data bound to the SqlDataSource control. Note that in this particular example, parameters are supplied in the DeleteCommand and UpdateCommand properties, although no associated parameter collection specified. In this case, the GridView control dynamically populates the DeleteParameters and UpdateParameters collections with the appropriate cell values in response to user interactions before executing the delete or update command.

```
<asp:GridView id="MyGrid" runat="server"
    AutoGenerateEditButton="true"
    AutoGenerateDeleteButton="true"
    DataKeyNames="au_id"
    AllowSorting="true"
/>
<asp:SqlDataSource id="MySource" runat="server"
    SelectCommand="select * from authors"
    UpdateCommand="update authors set au_lname = @au_lname where au_id = @au_id"
    DeleteCommand="delete from authors where au_id = @au_id"
    ConnectionString="server=(local)\NetSDK;database=pubs;user=sa;password="
/>
```

EXAMPLE

Automatic Edit and Delete Capabilities of GridView

Inserting New Data Rows.

The SqlDataSource control also supports inserting new rows of data, when an InsertCommand and associated InsertParameters parameter collection are specified. The following example demonstrates an SqlDataSource control bound to a DetailsView control that supports inserting data.

```
<asp:DetailsView id="MyDetailsView" DataSourceId="MyDetailsSource"
    AutoGenerateInsertButton="true"
    runat="server"
/>
<asp:SqlDataSource id="MyDetailsSource"
    ConnectionString="server=(local);database=pubs;trusted_connection=yes"
    SelectCommand="select * from authors"
    InsertCommand="insert into authors (au_id, au_fname, au_lname) values (@au_id, @au_fname, @au_lname)"
    runat="server"
/>
```

EXAMPLE

Inserting Data with DetailsView and SqlDataSource

Specification

In this implementation, the SqlDataSource control represents a connection to an ADO.NET managed data provider, such as SQL, OLEDB, ODBC, Oracle, or a third-party provider. The SqlDataSource base class takes advantage of the ADO.NET Common Data Model, which provides a set of interfaces that all managed data providers must implement. Because the provider-specific details of the connection, adapter, and command can be abstracted into common interfaces, so too can the common functionality of the SqlDataSource control for each supported provider. In this implementation, the providers installed to a given machine are registered in machine.config. On the SqlDataSource, the provider is specified by the ProviderName property.

```
<asp:SqlDataSource id="MySource" runat="server"
    ProviderName="System.Data.OleDb"
    ConnectionString="Data Source=GrocerToGo;Integrated Security=SSPI;"
    SelectCommand="sp_GetProductCategories"
/>
```

EXAMPLE

Specifying the Provider Property on SqlDataSource

SqlDataSource Operations.

The SqlDataSource control supports select, insert, update, delete semantics over the exposed data. For select operations, a DataSet or DataReader may be returned, determined by the DataSourceMode property. In DataSet mode, filtering, sorting and caching is supported, although the DataReader mode can be a more performant choice when filtering, sorting or caching is not a requirement.

The select, insert, update, and delete commands (queries) are provided as properties on the SqlDataSource control. This assumes that developers are fluent in the underlying SQL query language syntax for the provider they are using. The command properties can take either a SQL statement or stored procedure value (the control parses the command to determine the command type). Commands or stored procedures may also be parameterized, where the values of parameters are substituted at run-time from an external source, such as a control property, session variable, or querystring request parameter. Note that the parameter substitution syntax is also specific to the provider the SqlDataSource control represents.

Note: When DbDataSource receives a null parameter value for an Insert, Update, or Delete operation, it automatically converts to DbNull when populating the command's parameter list. When it receives a null parameter value for a Select operation, it does not execute the SelectCommand and instead returns null from Select( ).

Data-bound controls can declaratively databind to a SqlDataSource control, and use the select, insert, update, and delete operations to provide UI and automatic behavior. For example, the GridView control provides a grid UI that can be paged and sorted. It also provides update and delete UI when the bound SqlDataSource defines those command properties. As with any data source control, SqlDataSource can also be used programmatically.

SqlDataSource Events.

The SqlDataSource supports events before and after each operation is performed. The Selecting, Inserting, Deleting, and Updating events are fired before the associated operation, and the event args contains a reference to the provider-specific command object. A developer can set custom properties on the command before an operation's command is executed. The Selecting event is the default event for the SqlDataSource control, demonstrated below.

The Selected, Inserted, Deleted and Updated events are fired after the associated operation is performed. The associated event args exposes a RowsAffected property for checking the number of rows affected by the operation (this is also returned from the Insert, Update, and Delete methods of the SqlDataSource).

The event args also exposes ReturnValue and OutputParameters properties for checking the return value and and the outputs of any reference (in/out) parameters (e.g. if the command is a stored procedure). Reference parameters are declared by a Parameter object with Direction=Output or Direction=InputOutput in the operation's associated Parameters collection.

Automatic Caching Behavior.

The SqlDataSource control supports automatic caching behavior, using a time-based cache expiration policy by default. Additionally, it supports an optional SqlCacheDependency-based expiry policy. EnableCaching=false by default, but caching can be documented as best practice. When EnableCaching=true, caching is enabled. Note that an absolute expiration policy is used by default, but can be configured by the Page developer to use a sliding window expiration, where the duration is reset each time the cache entry is accessed. The following example demonstrates a SqlDataSource control that caches data to expire every hour.

```
<asp:SqlDataSource
    ConnectionString="DSN=GrocerToGo"
    ProviderName="System.Data.Odbc"
    SelectCommand="select * from products"
    EnableCaching="true"
    CacheDuration="3600"
    runat="server"
/>
```

EXAMPLE

Setting the Cache Duration on a SqlDataSource Control

A unique cache key is created for each combination of caching parameters, ConnectionString, SelectParameters and SelectCommand. This causes each individual "view" of the DataSource control to receive a separate cache entry. Note that it also has the side-effect of allowing identical views (even in different pages) to share a cache entry. The cache key is one-way hashed to protect the source data used to generate it.

The SqlDataSource control additionally supports SqlCacheDependency-based expiry (provided the service has been configured for the database server). The dependency is specified as a string property, matching the same format as supported by the related Page directive. The syntax is of the form "a:b", where (a) refers to a named database under the <sqlCacheDependency> section of web.config, and (b) refers to a specific table name for that connection. Multiple table dependencies can be specified in a semicolon-delimited fashion, e.g. "a:b;a:b;a:b".

The following example demonstrates a SqlCacheDependency defined for a SqlDataSource control. The cache duration is set to "Infinite" so that the entry never expires unless the backend table data changes (uses a type converter on the integer Duration property).

```
<asp:SqlDataSource
    ConnectionString="server=(local);database=
    pubs;trusted_connection=yes"
    SelectCommand="select * from authors"
    EnableCaching="true"
    CacheDuration="Infinite"
    SqlCacheDependency="pubs:Authors;"
    runat="server"
/>
```

EXAMPLE

Configuring a SqlCacheDependency for a SqlDataSource Control

Multiple table dependencies may be defined as well, as shown in the example below:

```
<asp:SqlDataSource
    ConnectionString="server=(local);database=pubs;
    trusted_connection=yes"
    SelectCommand="SelectAuthorTitles"
    EnableCaching="true"
    CacheDuration="1200"
    SqlCacheDependency="pubs:Authors;pubs:TitleAuthor"
    runat="server"
>
    <SelectParameters>
        <asp:ControlParameter Name="au_id" ControlId="MyDropDown"
            PropertyName="SelectedValue"/>
    </SelectParameters>
</asp:SqlDataSource>
```

EXAMPLE

Defining Multiple SqlCacheInvalidation Table Dependencies

Note that SqlCacheInvalidation is useful in Web-farm scenarios, because an update from one machine in the farm can cause a cache invalidation for other machines in the farm.

Filtering and FilterParameters.

An entire table of moderately-sized data may be retrieved for filter application to that data based on UI selection from the client. For example, consider the scenario below where documents are listed for several authors, and a dropdownlist is provided to select the particular author name to filter by. In this scenario, the document data can be retrieved only once from the database, and subsequently retrieved from cache in order to apply the filter. In this example, the cache entry is refreshed every 10 minutes.

```
<form runat="server">
    <asp:DropDownList                id="AuthorsDropDown"
DataSourceId="MyAuthorSource"
        DataTextField="AuthorName"
        AutoPostBack="true"
        runat="server"
    />
    <asp:GridView id="MyGrid" DataSourceId="MySource" runat=
"server" />
    <asp:SqlDataSource id="MySource"
        ConnectionString="server=(local);database=specs;trusted_connection=
        yes"
        SelectCommand="select * from specs"
        FilterExpression="author = @author"
        EnableCaching="true"
        CacheDuration="600"
        runat="server"
    >
        <FilterParameters>
            <asp:ControlParameter Name="author" ControlId=
            "AuthorsDropDown" PropertyName="Selected Value" />
        </FilterParameters>
    </asp:SqlDataSource>
    <asp:SqlDataSource id="MyAuthorSource"
        ConnectionString="server=(local);database=specs;trusted_connection=
        yes"
```

```
SelectCommand="select DISTINCT author from specs"
EnableCaching="true"
CacheDuration="600"
runat="server"
/>
</form>
```

EXAMPLE

GridView Bound to Filtered/Cached SqlDataSource Data

Sorting in the SelectCommand Implementation.

If the command associated with the SelectCommand property returns a DataSet, DataView, or DataTable, the SqlDataSource will automatically support sorting over the returned result. However, it is sometimes desirable to apply sorting in the implementation of the command itself, such as a stored procedure. To support this scenario, the SqlDataSource exposes a SortParameterName property, which can be set to the name of the parameter of the SelectCommand stored procedure that can be associated with the sort expression passed by the data-bound control when the Select operation is invoked. This expression will be passed to the parameter on the object, which can apply sorting logic (usually through a switch/case statement).

```
<asp:SqlDataSource ID="MySource"
    ConnectionString="..."
    SelectCommand="GetCustomers"
    SortParameterName="sortex"
    runat="server"/>
```

EXAMPLE

Using the SortParameterName Property

Object Model Reference

```
namespace System.Web.UI
{
    public class SqlDataSource : DataSourceControl
    {
        // Properties
        public virtual SqlDataSourceMode    DataSourceMode      { get; set; }
        public virtual String               ConnectionString    { get; set; }
        public virtual String               ProviderName        { get; set; }
        public virtual String               SelectCommand       { get; set; }
        public virtual String               InsertCommand       { get; set; }
        public virtual String               UpdateCommand       { get; set; }
        public virtual String               DeleteCommand       { get; set; }
        public virtual String               FilterExpression    { get; set; }
        public virtual ParameterCollection  SelectParameters    { get; }
        public virtual ParameterCollection  InsertParameters    { get; }
        public virtual ParameterCollection  UpdateParameters    { get; }
        public virtual ParameterCollection  DeleteParameters    { get; }
        public virtual ParameterCollection  FilterParameters    { get; }
        public virtual String               SortParameterName   { get; set; }
        public virtual bool                 CancelSelectOnNullParameter { get; set; }
        public virtual bool                 EnableCaching       { get; set; }
        public virtual int                  CacheDuration       { get; set; }
        public virtual String               SqlCacheDependency  { get; set; }
        public virtual DataSourceCacheExpiry CacheExpirationPolicy { get; set; }
        protected virtual
        DataSourceCacheBase                 Cache               { get; }
    }
    // Constructors
    public SqlDataSource (void);
    public SqlDataSource (String connectionString, String selectCommand);
    public SqlDataSource (String providerName, String connectionString,
            String selectCommand);
    // Methods
    public IEnumerable Select (void);
    public int Insert (void);
    public int Update (void);
    public int Delete (void);
    protected virtual SqlDataSourceView CreateDataSourceView
    (SqlDataSource dataSource, String viewName);
    // Events
    public event SqlDataSourceCommandEventHandler...
            Deleting            { add; remove; }
            Inserting           { add; remove; }
```

```
                                    Selecting               { add; remove; }
                                    Updating               { add; remove; }
        public event SqlDataSourceStatusEventHandler...
                                    Deleted                       { add; remove; }
                                    Inserted               { add; remove; }
                                    Selected               { add; remove; }
                                    Updated                { add; remove; }
        // IDataSource Implementation
        protected override DataSourceView GetView (String viewName);
        protected override ICollection GetViewNames (void);
        // IStateManager Implementation
        protected override void LoadViewState (Object savedState);
        protected override object SaveViewState (void);
        protected override void TrackViewState (void);
    }
    public class SqlDataSourceCommandEventArgs : CancelEventArgs
    {
        // Properties
        public IDbCommand                       Command         { get;
}
    }
    public class SqlDataSourceStatusEventArgs : EventArgs
    {
        // Properties
        public IOrderedDictionary       OutputParameters        { get; }
        public Object                           ReturnValue     { get; }
        public int                              RowsAffected    { get; }
    }
    public class SqlDataSourceView : DataSourceView, IStateManager
    {
        // Properties
        public override String                  Name            { get;
}
        public override bool                    CanDelete       { get;
}
        public override bool                    CanInsert       { get;
}
        public override bool                    CanSort         { get;
}
        public override bool                    CanUpdate       { get;
}
        public String                   SelectCommand   { get; set; }
        public String                   UpdateCommand   { get; set; }
        public String                   DeleteCommand   { get; set; }
        public String                   InsertCommand   { get; set; }
        public String                   FilterExpression { get; set; }
        public override String                  SortExpression
        { get; set; }
        public ParameterCollection      SelectParameters        { get; }
        public ParameterCollection      UpdateParameters        { get; }
        public ParameterCollection      DeleteParameters        { get; }
        public ParameterCollection      InsertParameters        { get; }
        public ParameterCollection      FilterParameters        { get; }
        protected EventHandlerList      Events                  { get;
}
        protected virtual String        ParameterPrefix { get; }
        protected bool                          IsTrackingViewState     { get;
}
        protected StateBag              ViewState               { get; }
        // Constructors
        public SqlDataSourceView (SqlDataSource owner, string name);
        // Methods
        public int Insert (void);
        public int Delete (void);
        public int Update (void);
        public override IEnumerable Select (void);
        public override int Insert (IDictionary values);
        public override int Delete (IDictionary keys);
        public override int Update (IDictionary keys, IDictionary values);
        protected virtual void OnDeleted (SqlDataSourceStatusEventArgs e);
        protected virtual void OnDeleting (SqlDataSourceCommandEventArgs e);
        protected virtual void OnInserted (SqlDataSourceStatusEventArgs e);
        protected virtual void OnInserting (SqlDataSourceCommandEventArgs e);
        protected virtual void OnSelected (SqlDataSourceStatusEventArgs e);
        protected virtual void OnSelecting (SqlDataSourceCommandEventArgs e);
        protected virtual void OnUpdated (SqlDataSourceStatusEventArgs e);
```

-continued

```
        protected virtual void OnUpdating (SqlDataSourceCommandEventArgs e);
        protected virtual void OnDataSourceViewChanged (EventArgs e);
        // IStateManager Implementation
        protected virtual void LoadViewState (Object savedState);
        protected virtual Object SaveViewState (void);
        protected virtual void TrackViewState (void);
        // Events
        public event SqlDataSourceCommandEventHandler...
                             Deleting            { add; remove; }
                             Inserting           { add; remove; }
                             Selecting           { add; remove; }
                             Updating            { add; remove; }
        public event SqlDataSourceStatusEventHandler...
                             Deleted                       { add; remove; }
                             Inserted            { add; remove; }
                             Selected            { add; remove; }
                             Updated             { add; remove; }
        public event EventHandler DataSourceViewChanged { add; remove; }
    }
    public enum SqlDataSourceMode
    {
       DataReader = 0,
       DataSet = 1
    }
}
```

Persistence Format

```
<asp:SqlDataSource runat="server"
   DataSourceMode= "SqlDataSourceMode"
   ConnectionString="String"
   ProviderName="String"
   SelectCommand="String"
   InsertCommand="String"
   UpdateCommand="String"
   DeleteCommand="String"
   FilterExpression="String"
   EnableCaching="[true\false]"
   CacheDuration="int"
   SqlCacheDependency="String"
   CacheExpirationPolicy="DataSourceCacheExpiry"
   OnSelecting="SqlDataSourceCommandEventHandler"
   OnInserting="SqlDataSourceCommandEventHandler"
   OnUpdating="SqlDataSourceCommandEventHandler"
   OnDeleting="SqlDataSourceCommandEventHandler"
   OnSelected="SqlDataSourceStatusEventHandler"
   OnInserted="SqlDataSourceStatusEventHandler"
   OnUpdated="SqlDataSourceStatusEventHandler"
   OnDeleted="SqlDataSourceStatusEventHandler"
   OnDataSourceChanged="EventHandler"
>
   <SelectParameters>
      [<System.Web.UI.WebControls.Parameter ...>]
   </SelectParameters>
   <InsertParameters>
      [<System.Web.UI.WebControls.Parameter ...>]
   </InsertParameters>
   <UpdateParameters>
      [<System.Web.UI.WebControls.Parameter ...>]
   </UpdateParameters>
   <DeleteParameters>
      [<System.Web.UI.WebControls.Parameter ...>]
   </DeleteParameters>
   <FilterParameters>
      [<System.Web.UI.WebControls.Parameter ...>]
   </FilterParameters>
</asp:SqlDataSource>
```

| | Properties |
|---|---|
| | DataSourceMode |
| Prototype | public virtual SqlDataSourceMode DataSourceMode { get; set; } |
| Description | Gets/sets the data source mode for the control. Valid values are SqlDataSourceMode.DataSet and SqlDataSourceMode.DataReader. The DataReader mode is more performant, but does not allow for caching, filtering, or sorting behavior. |
| Default Value | SqlDataSourceMode.DataSet |
| Value Editor | |
| | ConnectionString |
| Prototype | public virtual String ConnectionString { get; set; } |
| Description | Gets/sets the connection string for the control. The format of the ConnectionString is specific to the provider specified by the SqlDataSource's ProviderName property. The ConnectionString property is not stored in ViewState. |
| Default Value | String.Empty |
| Value Editor | |
| | ProviderName |
| Prototype | public virtual String ProviderName { get; set; } |
| Description | Gets/sets the provider name for the control. The list of available providers is determined by the <providerconfiguration> section of the <system.data> group of machine.config (the invariant name is used). |
| Default Value | System.Data.SqlClient |
| Value Editor | Combo-box dropdown listing installed providers. |
| | SelectCommand |
| Prototype | public virtual String SelectCommand { get; set; } |
| Description | The command to execute when Select( ) is called on the SqlDataSourceView, or when Select( ) is called on the SqlDataSourceControl itself. |
| Default Value | String.Empty |
| Value Editor | |
| | InsertCommand |
| Prototype | public virtual String InsertCommand { get; set; } |
| Description | The command to execute when Insert( ) is called on the SqlDataSourceView, or when Insert( ) is called on the SqlDataSourceControl itself. |

-continued

| | |
|---|---|
| Default Value | String.Empty |
| Value Editor | |

UpdateCommand

| | |
|---|---|
| Prototype | public virtual String UpdateCommand { get; set; } |
| Description | The command to execute when Update( ) is called on the SqlDataSourceView, or when Update( ) is called on the SqlDataSourceControl itself. |
| Default Value | String.Empty |
| Value Editor | |

DeleteCommand

| | |
|---|---|
| Prototype | public virtual String DeleteCommand { get; set; } |
| Description | The command to execute when Delete( ) is called on the SqlDataSourceView, or when Delete( ) is called on the SqlDataSourceControl itself. |
| Default Value | String.Empty |
| Value Editor | |

FilterExpression

| | |
|---|---|
| Prototype | public virtual String FilterExpression { get; set; } |
| Description | An expression used to filter the data returned from Select( ). Filtering is allowed only when DataSourceMode=DataSet, and the FilterExpression syntax is the same as expected by the DataView's RowFilter property. Parameters are expected to be prefixed with the '@' character, similar to the SQL syntax for specifying command parameters. Example: "FieldName1 = value1, FieldName2 = value2" Example (parameterized): "FieldName1 = @param" |
| Default Value | String.Empty |
| Value Editor | |

SortExpression

| | |
|---|---|
| Prototype | public virtual String SortExpression { get; set; } |
| Description | An expression used to sort the data returned from Select( ). Sorting is allowed only when DataSourceMode=DataSet, and the SortExpression syntax is the same as expected by the DataView's Sort property, e.g. a comma-separated list of fields: "FieldName1, FieldName2". |
| Default Value | String.Empty |

SelectParameters

| | |
|---|---|
| Prototype | public virtual ParameterCollection SelectParameters { get; } |
| Description | Collection of parameters used in SqlDataSourceControl.Select( ). These parameter values are substituted for placeholders in the SelectCommand property. See also: System.Web.UI.WebControls.Parameter classes. |
| Default Value | null |
| Value Editor | |

UpdateParameters

| | |
|---|---|
| Prototype | public virtual ParameterCollection UpdateParameters { get; } |
| Description | Collection of parameters used in Update( ). These parameter values are substituted for placeholders in the UpdateCommand property. See also: System.Web.UI.WebControls.Parameter classes. |
| Default Value | null |
| Value Editor | |

DeleteParameters

| | |
|---|---|
| Prototype | public virtual ParameterCollection DeleteParameters { get; } |
| Description | Collection of parameters used in Delete( ). These parameter values are substituted for placeholders in the DeleteCommand property. See also: System.Web.UI.WebControls.Parameter classes. |
| Default Value | null |
| Value Editor | |

InsertParameters

| | |
|---|---|
| Prototype | public virtual ParameterCollection InsertParameters { get; } |
| Description | Collection of parameters used in Insert( ). These parameter values are substituted for placeholders in the InsertCommand property. See also: System.Web.UI.WebControls.Parameter classes. |
| Default Value | null |
| Value Editor | |

FilterParameters

| | |
|---|---|
| Prototype | public virtual ParameterCollection FilterParameters { get; } |
| Description | Collection of parameters used when filtering the data returned from Select( ). These parameter values are substituted for placeholders in the FilterExpression property. See also: System.Web.UI.WebControls.Parameter classes. |
| Default Value | null |
| Value Editor | |

CancelSelectOnNullParameter

| | |
|---|---|
| Prototype | public bool CancelSelectOnNullParameter { get; set; } |
| Description | Indicates whether the Select operation will be cancelled if the value of any of the SelectParameters is null. |
| Default Value | true |
| Value Editor | |

SortParameterName

| | |
|---|---|
| Prototype | public String SortParameterName { get; set; } |
| Description | The name of the parameter in the SelectMethod that specifies the sort expression. This parameter's value will be automatically set at runtime with the appropriate sort expression. |
| Default Value | String.Empty |
| Value Editor | |

EnableCaching

| | |
|---|---|
| Prototype | public virtual bool EnableCaching { get; set; } |
| Description | Enables or disables caching for the SqlDataSource control. When caching is enabled, the data returned from the Select operation will be cached, and this cache entry will be used to service additional Select operations, until it expires. Caching is only supported when DataSourceMode=DataSet. |
| Default Value | false |
| Value Editor | |

CacheDuration

| | |
|---|---|
| Prototype | public virtual int CacheDuration { get; set; } |
| Description | The duration, in seconds, to cache the selected data. This is an absolute time-based expiry value by default, although it can be configured to use a sliding window expiration. |
| Default Value | DataSourceCache.Infinite |
| Value Editor | |

SqlCacheDependency

| | |
|---|---|
| Prototype | public virtual String SqlCacheDependency { get; set; } |
| Description | An optional SqlCacheDependency string. The syntax is of the form "a:b", where (a) refers to a named database under the <cache><sqlCacheDependency> section of web.config, and (b) refers to a specific table name for that connection. Multiple table dependencies can be specified in a semicolon-delimited fashion, e.g. "a:b;a:b;a:b". The backend database are configured for SQL Cache Invalidation. |
| Default Value | String.Empty |
| Value Editor | |

CacheExpirationPolicy

| | |
|---|---|
| Prototype | public virtual DataSourceCacheExpiry CacheExpirationPolicy { get; set; } |
| Description | The expiry policy to apply for the Duration property, either Absolute or Sliding Window. |
| Default Value | DataSourceCacheExpiry.Absolute |
| Value Editor | |

Cache

| | |
|---|---|
| Prototype | protected virtual DataSourceCacheBase Cache { get; } |

-continued

| | |
|---|---|
| Description | The cache object that implements the SqlDataSource caching behavior. |
| Default Value | New SqlDataSourceCache |
| Value Editor | |

Methods
Select

| | |
|---|---|
| Prototype | public IEnumerable Select (void); |
| Description | Returns all the rows of the default datasource view (calls the Select method on that view). Parameters are taken from the SelectParameters property collection. If DataSourceMode is set to DataSet, then a DataView is returned. If DataSourceMode is set to DataReader, then a DataReader is returned and it are closed by the caller. |
| Parameters | None |

Delete

| | |
|---|---|
| Prototype | public int Delete (void); |
| Description | Deletes rows from the data source using the parameters specified in the DeleteParameters collection. |
| Parameters | None |

Insert

| | |
|---|---|
| Prototype | public int Insert (void); |
| Description | Inserts a new row with values specified the InsertParameters collection. |
| Parameters | None |

Update

| | |
|---|---|
| Prototype | public int Update (void); |
| Description | Updates rows with the values specified in the UpdateParameters collection. |
| Parameters | None |

CreateDataSourceView

| | |
|---|---|
| Prototype | protected virtual SqlDataSourceView CreateDataSourceView (SqlDataSource dataSource, String viewName); |
| Description | Creates a new SqlDataSourceView object with the specified viewName. This method is called by the GetView( ) method of SqlDataSource. |
| Parameters | dataSource - The associated SqlDataSource control object. viewName - The name of the view to create. |

Events
Selecting

| | |
|---|---|
| Prototype Handler | private void SqlDataSource_Selecting (Object sender, SqlDataSourceCommandEventHandler e); |
| Description | Raised before the SelectCommand is executed. The passed event args contains a reference to the provider-specific command object. This event is cancellable, which causes the Select operation to abort. |

Updating

| | |
|---|---|
| Prototype Handler | private void SqlDataSource_Updating (Object sender, SqlDataSourceCommandEventHandler e); |
| Description | Raised before the UpdateCommand is executed. The passed event args contains a reference to the provider-specific command object. This event is cancellable, which causes the Update operation to abort. |

Inserting

| | |
|---|---|
| Prototype Handler | private void SqlDataSource_Inserting (Object sender, SqlDataSourceCommandEventHandler e); |
| Description | Raised before the InsertCommand is executed. The passed event args contains a reference to the provider-specific command object. This event is cancellable, which causes the Insert operation to abort. |

Deleting

| | |
|---|---|
| Prototype Handler | private void SqlDataSource_Deleting (Object sender, SqlDataSourceCommandEventHandler e); |
| Description | Raised before the DeleteCommand is executed. The passed event args contains a reference to the provider-specific command object. This event is cancellable, which causes the Delete operation to abort. |

-continued

Selected

| | |
|---|---|
| Prototype Handler | private void SqlDataSource_Selected (Object sender, SqlDataSourceStatusEventHandler e); |
| Description | Raised after the SelectCommand is executed. The passed event args contains any return value or otuput parameters, and indicates the number of rows affected by the command. |

Updated

| | |
|---|---|
| Prototype Handler | private void SqlDataSource_Updated (Object sender, SqlDataSourceStatusEventHandler e); |
| Description | Raised after the UpdateCommand is executed. The passed event args contains any return value or otuput parameters, and indicates the number of rows affected by the command. |

Inserted

| | |
|---|---|
| Prototype Handler | private void SqlDataSource_Inserted (Object sender, SqlDataSourceStatusEventHandler e); |
| Description | Raised after the InsertCommand is executed. The passed event args contains any return value or otuput parameters, and indicates the number of rows affected by the command. |

Deleted

| | |
|---|---|
| Prototype Handler | private void SqlDataSource_Deleted (Object sender, SqlDataSourceStatusEventHandler e); |
| Description | Raised after the DeleteCommand is executed. The passed event args contains any return value or otuput parameters, and indicates the number of rows affected by the command. |

[ . . . ].SqlDataSourceCommandEventArgs
Properties
Command

| | |
|---|---|
| Prototype | public IDbCommand Command { get; } |
| Description | Gets the provider-specific command instance that will be used to execute the select, insert, delete, or update operation. |
| Default Value | null |
| Value Editor | |

[ . . . ].SqlDataSourceStatusEventArgs
Properties
OutputParameters

| | |
|---|---|
| Prototype | public IOrderedDictionary OutputParameters { get; } |
| Description | Gets an ordered dictionary of output parameters from the command (usually a stored procedure). In order for a parameter to be included in this dictionary, an associated System.Web.UI.WebControls.Parameter object are contained in the Parameter collection for the operation, with Direction = Output or Direction = InputOutput. |
| Default Value | null |

ReturnValue

| | |
|---|---|
| Prototype | public Object ReturnValue { get; } |
| Description | Gets the return value from the command (usually a stored procedure). In order for a parameter to be included in this dictionary, an associated System.Web.UI.WebControls.Parameter object are contained in the Parameter collection for the operation, with Direction = ReturnValue. |
| Default Value | null |
| Value Editor | |

RowsAffected

| | |
|---|---|
| Prototype | public int RowsAffected { get; } |
| Description | Gets the number of data rows affected by the insert, update, or delete command. Not applicable to select operations. |
| Default Value | 0 |
| Value Editor | |

System.Web.UI.SqlDataSourceView
Properties
Name

| | |
|---|---|
| Prototype | public override String Name { get; } |
| Description | The name of the view. |

-continued

| | |
|---|---|
| Default Value | Value passed to the constructor. |
| Value Editor | |

CanInsert

| | |
|---|---|
| Prototype | public override bool CanInsert { get; } |
| Description | Indicates that the view can insert rows. True if InsertCommand is non-empty; false otherwise. |
| Default Value | false |
| Value Editor | |

CanUpdate

| | |
|---|---|
| Prototype | public override bool CanUpdate { get; } |
| Description | Indicates that the view can update rows. True if UpdateCommand is non-empty; false otherwise. |
| Default Value | false |
| Value Editor | |

CanDelete

| | |
|---|---|
| Prototype | public override bool CanDelete { get; } |
| Description | Indicates that the view can delete rows. True if DeleteCommand is non-empty; false otherwise. |
| Default Value | false |
| Value Editor | |

CanSort

| | |
|---|---|
| Prototype | public override bool CanSort { get; } |
| Description | Indicates that the view can sort rows. True if the DataSourceMode is set to SqlDataSourceMode.DataSet; false otherwise. |
| Default Value | false |
| Value Editor | |

SelectCommand

| | |
|---|---|
| Prototype | public String SelectCommand { get; set; } |
| Description | The command to execute when Select( ) is called on the SqlDataSourceView. |
| Default Value | String.Empty |
| Value Editor | |

InsertCommand

| | |
|---|---|
| Prototype | public String InsertCommand { get; set; } |
| Description | The command to execute when Insert( ) is called on the SqlDataSourceView. |
| Default Value | String.Empty |
| Value Editor | |

UpdateCommand

| | |
|---|---|
| Prototype | public String UpdateCommand { get; set; } |
| Description | The command to execute when Update( ) is called on the SqlDataSourceView. |
| Default Value | String.Empty |
| Value Editor | |

DeleteCommand

| | |
|---|---|
| Prototype | public String DeleteCommand { get; set; } |
| Description | The command to execute when Delete( ) is called on the SqlDataSourceView. |
| Default Value | String.Empty |
| Value Editor | |

FilterExpression

| | |
|---|---|
| Prototype | public virtual String FilterExpression { get; set; } |
| Description | An expression used to filter the data returned from Select( ). Filtering is allowed only when DataSourceMode=DataSet, and the FilterExpression syntax is the same as expected by the DataView's RowFilter property. Parameters are expected to be prefixed with the '@' character, similar to the SQL syntax for specifying command parameters. Example: "FieldName1 = value1, FieldName2 = value2" Example (parameterized): "FieldName1 = @param" |
| Default Value | String.Empty |
| Value Editor | |

SortExpression

| | |
|---|---|
| Prototype | public override String SortExpression { get; set; } |
| Description | The sort expression for GetList( ), assigned to DataView.Sort before returning the list. Sorting is only supported on the view if the DataSourceMode is set to SqlDataSourceMode.DataSet. |
| Default Value | String.Empty |
| Value Editor | |

SelectParameters

| | |
|---|---|
| Prototype | public virtual ParameterCollection SelectParameters { get; } |
| Description | Collection of parameters used in SqlDataSourceControl.Select( ). These parameter values are substituted for placeholders in the SelectCommand property. See also: System.Web.UI.WebControls.Parameter classes. |
| Default Value | null |
| Value Editor | |

UpdateParameters

| | |
|---|---|
| Prototype | public virtual ParameterCollection UpdateParameters { get; } |
| Description | Collection of parameters used in Update( ). These parameter values are substituted for placeholders in the UpdateCommand property. See also: System.Web.UI.WebControls.Parameter classes. |
| Default Value | null |
| Value Editor | |

DeleteParameters

| | |
|---|---|
| Prototype | public virtual ParameterCollection DeleteParameters { get; } |
| Description | Collection of parameters used in Delete( ). These parameter values are substituted for placeholders in the DeleteCommand property. See also: System.Web.UI.WebControls.Parameter classes. |
| Default Value | null |
| Value Editor | |

InsertParameters

| | |
|---|---|
| Prototype | public virtual ParameterCollection InsertParameters { get; } |
| Description | Collection of parameters used in Insert( ). These parameter values are substituted for placeholders in the InsertCommand property. See also: System.Web.UI.WebControls.Parameter classes. |
| Default Value | null |
| Value Editor | |

FilterParameters

| | |
|---|---|
| Prototype | public virtual ParameterCollection FilterParameters { get; } |
| Description | Collection of parameters used when filtering the data returned from Select( ). These parameter values are substituted for placeholders in the FilterExpression property. See also: System.Web.UI.WebControls.Parameter classes. |
| Default Value | null |
| Value Editor | |

Methods
Select

| | |
|---|---|
| Prototype | public override IEnumerable Select (void); |
| Description | Returns all the rows of the datasource. Parameters are taken from the SqlDataSource.SelectParameters property collection. If DataSourceMode is set to DataSet then a DataView is returned. If DataSourceMode is set to DataReader then a DataReader is returned, and it are closed by the caller. |
| Parameters | None |

Insert

| | |
|---|---|
| Prototype | public override int Insert (IDictionary values); |
| Description | Inserts a new row with data from a values name/value collection parameter. |

| | -continued |
|---|---|
| Parameters | values - name/value collection representing the column names and corresponding column values to insert. |

Update

| | |
|---|---|
| Prototype | public override int Update (IDictionary keys, IDictionary values); |
| Description | Updates rows matching the keys collection, setting new values from the name/value values collection. |
| Parameters | keys - name/value collection containing column names and values to match when selecting rows to update.<br>values - name/value collection containing the column names and values to replace in the rows matched by the keys collection. |

Delete

| | |
|---|---|
| Prototype | public override int Delete (IDictionary keys); |
| Description | Deletes rows from the data source with given keys. |
| Parameters | keys - name/value collection containing column names and values to matcsh when selecting rows to delete. |

Insert

| | |
|---|---|
| Prototype | public int Insert (void); |
| Description | Inserts a new row with names and values specified the InsertParameters collection. |
| Parameters | None |

Update

| | |
|---|---|
| Prototype | public int Update (void); |
| Description | Updates rows with the values specified in the UpdateParameters collection. |
| Parameters | None |

Delete

| | |
|---|---|
| Prototype | public int Delete (void); |
| Description | Deletes rows from the data source using the parameters specified in the DeleteParameters collection. |
| Parameters | None |

Events

Selecting

| | |
|---|---|
| Prototype Handler | private void SqlDataSourceView_Selecting (Object sender, SqlDataSourceCommandEventHandler e); |
| Description | Raised before the SelectCommand is executed. The passed event args contains a reference to the provider-specific command object. This event is cancellable, which causes the Select operation to abort. |

Updating

| | |
|---|---|
| Prototype Handler | private void SqlDataSourceView_Updating (Object sender, SqlDataSourceCommandEventHandler e); |
| Description | Raised before the UpdateCommand is executed. The passed event args contains a reference to the provider-specific command object. This event is cancellable, which causes the Update operation to abort. |

Inserting

| | |
|---|---|
| Prototype Handler | private void SqlDataSourceView_Inserting (Object sender, SqlDataSourceCommandEventHandler e); |
| Description | Raised before the InsertCommand is executed. The passed event args contains a reference to the provider-specific command object. This event is cancellable, which causes the Insert operation to abort. |

Deleting

| | |
|---|---|
| Prototype Handler | private void SqlDataSourceView_Deleting (Object sender, SqlDataSourceCommandEventHandler e); |
| Description | Raised before the DeleteCommand is executed. The passed event args contains a reference to the provider-specific command object. This event is cancellable, which causes the Delete operation to abort. |

Selected

| | |
|---|---|
| Prototype Handler | private void SqlDataSourceView_Selected (Object sender, SqlDataSourceStatusEventHandler e); |
| Description | Raised after the SelectCommand is executed. The passed event args contains any return value or otuput parameters, and indicates the number of rows affected by the command. |

Updated

| | |
|---|---|
| Prototype Handler | private void SqlDataSourceView_Updated (Object sender, SqlDataSourceStatusEventHandler e); |
| Description | Raised after the UpdateCommand is executed. The passed event args contains any return value or otuput parameters, and indicates the number of rows affected by the command. |

Inserted

| | |
|---|---|
| Prototype Handler | private void SqlDataSourceView_Inserted (Object sender, SqlDataSourceStatusEventHandler e); |
| Description | Raised after the InsertCommand is executed. The passed event args contains any return value or otuput parameters, and indicates the number of rows affected by the command. |

Deleted

| | |
|---|---|
| Prototype Handler | private void SqlDataSourceView_Deleted (Object sender, SqlDataSourceStatusEventHandler e); |
| Description | Raised after the DeleteCommand is executed. The passed event args contains any return value or otuput parameters, and indicates the number of rows affected by the command. |

DataSouceViewChanged

| | |
|---|---|
| Prototype Handler | private void SqlDataSourceView_DataSourceViewChanged (Object sender, EventArgs e); |
| Description | Raised when the DataSourceView changes, which causes DataSourceChanged event to fire on the owner DataSourceControl, causing any data-bound controls to re-bind |

Appendix G—Exemplary Aspects of an XML Data Source Control

Overview

The XmlDataSource control 112 is derived from DataSource control (please see, Appendix A) which abstracts a specific type of data, in this case XML, through a common interface shared by other DataSource controls. Data-bound controls 110 can be associated with a DataSource control to consume and render the underlying data, without requiring a page developer to write any code whatsoever. XmlDataSource supports both read-only scenarios and read-write (insert, update and delete) scenarios.

Since each DataSource control exposes a common interface (or set of interfaces), data-bound controls can easily consume many different types of data without understanding a unique API for each data type it supports.

The two types of DataSource control interfaces are IDataSource and IHierarchicalDataSource (see, Appendix A), which represent tabular and hierarchical data, respectively. The XmlDataSource control supports both of these interfaces, allowing it to bind to either hierarchical or list controls. The tabular view of XML is a list of XmlNodes at a given level of hierarchy, whereas the hierarchical view is represented by the complete XmlDocument hierarchy. For more information about the IHierarchicalDataSource and IDataSource interfaces, as well as supporting interfaces and classes, see Appendix A.

Specification

The XmlDataSource control can accept XML input data as a relative filename assigned to the DataFile property, or as a string containing the XML content assigned to the Data property. If the XML data does not also contain schema information, the XML schema may be additionally specified as a separate SchemaFile or Schema string. Once the input data for XmlDataSource is supplied, the control exposes that data through its IDataSource or IHierarchicalDataSource interfaces, which can be consumed by any data-bound control that communicates with either of those interfaces. The XmlDataSource will be commonly bound to a hierarchical control, such as TreeView or Menu, as shown in the following example.

```
<form runat="server">
  <asp:XmlDataSource    id="XmlSource"    DataFile=
  "Warehouse.xml" runat="server"/>
  <asp:TreeView DataSourceId="XmlSource" runat="server" >
    <Bindings>
      <asp:TreeNodeBinding Depth="0" DataMember="Department"
        TextField="Name" ValueField="DeptId" />
      <asp:TreeNodeBinding Depth="1" DataMember="Category"
        TextField="Name" ValueField="CategoryId" />
      <asp:TreeNodeBinding Depth="2" DataMember="Product"
        TextField="Name" ValueField="SKU" />
    </Bindings>
  </asp:TreeView>
</form>
```

EXAMPLE

TreeView Bound to XmlDataSource

The TreeView binds to each item of the XML data hierarchy for which a corresponding TreeNodeBinding association is defined. For example, a fragment of the Warehouse.xml file for the above example might appear as follows:

```
<warehouse>
  <department name="dairy" deptid="111">
    <category name="yogurt" categoryid="2222">
      <product name="horizon" sku="3333-3333"/>
    </category>
  </department>
</warehouse>
```

The TreeView interacts with the IHierarchicalDataSource interface of XmlDataSource, and the underlying data objects are exposed as XmlNodes in the XmlDocument. The TextField and ValueField attributes on TreeNodeBinding map directly to properties on this object. *

In this implementation, XML APIs, there are six XmlNodeTypes: text, comment, namespace, processing instruction, attribute, and element. Of these, our XmlDataSource only exposes elements as bindable nodes (the element name, innertext, value and attributes are exposed as properties through a customtypedescriptor). In one implementation, a CustomTypeDescriptor on XmlNode exposes the attributes collection. In another implementation, XmlNode is encapsulated into another object to expose the attributes collection. XmlNode.Name returns a fully qualified name if there is a namespace, and a local name if there is no namespace. This allows our XmlDataSource to examine a single property of XmlNode for matching the DataMember specified by the user.

Applying XSL Transformations

XmlDataSource can also transform its underlying XML data using XSLT. The result of the transformation is reflected in both the tabular and hierarchical interfaces exposed by XmlDataSource. XmlDataSource will apply an XSL transformation when the TransformFile property is set to a relative file path of an XSLT document or when the Transform property is set to XSLT content. When the Transform or TransformFile property is defined, an optional TransformArgumentList property may also be defined, which contains a list of arguments passed to the style sheet to be used during the XSL transformation. The Transforming event is fired just prior to applying the transformation, so that the user can populate the TransformArgumentList.

An XSL transformation is often used when the structure of an XML document does not match the structure needed to process the XML data. For example, the TreeView control may need to transform XML data to create a uniform hierarchy to which it can bind each tree level.

Consider the following sample XML data, which represents books of different genres in an online bookstore. Each book node contains information about its title and price, as well as several chapters containing the book's content.

```
<bookstore>
  <genre name="fiction">
    <book ISBN="10-861003-324">
      <title>The Handmaid's Tale</title>
      <price>12.95</price>
      <chapters>
        <chapter num="1" name="Introduction">
          Contents...
        </chapter>
        <chapter num="2" name="Body">
          Contents...
        </chapter>
        <chapter num="3" name="Conclusion">
          Contents...
        </chapter>
      </chapters>
    </book>
    <book genre="fiction" ISBN="1-861001-57-5">
      <title>Pride And Prejudice</title>
      <price>24.95</price>
      <chapters>
        <chapter num="1" name="Introduction">
          Contents...
        </chapter>
        <chapter num="2" name="Body">
          Contents...
        </chapter>
        <chapter num="3" name="Conclusion">
          Contents...
        </chapter>
      </chapters>
    </book>
  </genre>
</bookstore>
```

The following XSL transformation file converts the sample Bookstore.xml file to a format which the TreeView can easily consume.

```
<xsl:stylesheet                                       version="1.0"
  xmlns:xsl="http://www.w3.org/1999/XSL/Transform">
  <xsl:template match="bookstore">
    <bookstore>
      <xsl:apply-templates select="genre"/>
    </bookstore>
  </xsl:template>
```

-continued

```
<xsl:template match="genre">
  <genre>
    <xsl:attribute name="name">
      <xsl:value-of select="@name"/>
    </xsl:attribute>
    <xsl:apply-templates select="book"/>
  </genre>
</xsl:template>
<xsl:template match="book">
  <book>
    <xsl:attribute name="ISBN">
      <xsl:value-of select="@ISBN"/>
    </xsl:attribute>
    <xsl:attribute name="title">
      <xsl:value-of select="title"/>
    </xsl:attribute>
    <xsl:attribute name="price">
      <xsl:value-of select="price"/>
    </xsl:attribute>
    <xsl:apply-templates select="chapters/chapter" />
  </book>
</xsl:template>
<xsl:template match="chapter">
  <chapter>
    <xsl:attribute name="num">
      <xsl:value-of select="@num"/>
    </xsl:attribute>
    <xsl:attribute name="name">
      <xsl:value-of select="@name"/>
    </xsl:attribute>
    <xsl:apply-templates/>
  </chapter>
</xsl:template>
</xsl:stylesheet>
```

The result of the transformation on the Bookstore.xml file is given below. Note that XML hierarchy has been homogenized to represent a single element type at each level: genres, books, and chapters.

```
<bookstore>
  <genre name="fiction">
    <book ISBN="10-861003-324" title="The Handmaid's Tale" price="19.95">
      <chapter num="1" name="Introduction">
        Contents...
      </chapter>
      <chapter num="2" name="Body">
        Contents...
      </chapter>
      <chapter num="3" name="Conclusion">
        Contents...
      </chapter>
    </book>
    <book ISBN="1-861001-57-5" title="Pride And Prejudice" price="24.95">
      <chapter num="1" name="Introduction">
        Contents...
      </chapter>
      <chapter num="2" name="Body">
        Contents...
      </chapter>
      <chapter num="3" name="Conclusion">
        Contents...
      </chapter>
    </book>
  </genre>
</bookstore>
```

The preceding exemplary XML structure easily maps to the TreeView's data model, where node properties are bound against element attributes at each level of hierarchy, as shown below.

```
<form runat="server">
  <asp:XmlDataSource id="XmlSource" runat="server"
    DataFile="Bookstore.xml"
    TransformFile="Books.xsl"
  />
  <asp:TreeView DataSourceId="XmlSource" runat="server" >
    <Bindings>
      <asp:TreeNodeBinding Depth="0" DataMember="genre"
        TextField="name" ValueField="name"/>
      <asp:TreeNodeBinding Depth="1" DataMember="book"
        TextField="title" ValueField="ISBN"/>
      <asp:TreeNodeBinding Depth="2" DataMember="chapter"
        TextField="name" ValueField="num"/>
    </Bindings>
  </asp:TreeView>
</form>
```

EXAMPLE

TreeView Bound to an XmlDataSource

The rendered TreeView control appears as follows:
[-] Fiction
   [-] The Handmaid's Tale
     [-] Introduction
     [-] Body
     [-] Conclusion
[-] NonFiction
   [-] Pride and Prejudice
     [-] Introduction
     [-] Body
     [-] Conclusion Figure: TreeView Rendering Filtering XML Data with XPath Expressions The XmlDataSource also supports an XPath property that can be assigned a valid XPath expression for filtering/querying the XML data. The result of an XPath query is an XmlNodeList, which is represented by the default view returned from the IHierarchicalDataSource.GetView and IDataSource.GetView methods. Note that the XmlDataSource does not insert new nodes into this view, but it can delete or update existing nodes. The example below shows a TreeView bound to only the Category and Product elements in Warehouse.xml where the Department element has a DeptId attribute of '333'.

```
<form runat="server">
  <asp:XmlDataSource id="XmlSource" DataFile="Warehouse.xml"
    runat="server"
    XPath="Warehouse/Department[@DeptId='333']"
  />
  <asp:TreeView DataSourceId="XmlSource" runat="server" >
    <Bindings>
      <asp:TreeNodeBinding Depth="0" DataMember="Category"
        TextField="Name" ValueField="CategoryId" />
      <asp:TreeNodeBinding Depth="1" DataMember="Product"
        TextField="Name" ValueField="SKU" />
    </Bindings>
  </asp:TreeView>
</form>
```

EXAMPLE

TreeView Bound to an XPath Expression Result

In one implementation, XmlDataSource automatically extracts namespaces from the XML document, to supply when evaluating XPath expressions using SelectNodes. The XPathNavigator retains the currently in-scope namespaces.

Binding a List Control to XML Data

The XmlDataSource control can also expose its data as a tabular list of XmlNodes, for binding to a list control such as DataList or GridView. Because list controls typically do not render hierarchical data, they interact with the IDataSource interface of XmlDataSource instead of IHierarchicalDataSource. The default view of the IDataSource interface returns the root-level XmlNodes (after any XPath is applied, if it is specified). For data-bound list controls that do not directly support the DataSourceControl architecture, the XmlDataSource control implements the IListSource interface and may assigned directly to a data-bound control's DataSource property.

```
<form runat="server">
    <asp:XmlDataSource id="XmlSource" DataFile="Books.xml"
       XPath="bookstore/genre[@name='fiction']/book" runat="server"/>
    <asp:GridView DataSourceId="XmlSource" runat="server"/>
</form>
```

EXAMPLE

Binding a GridView to an XmlDataSource

Note that because the XmlDataSource supports a save operation that can be invoked after a developer have made changes to a document, a data-bound control might also render UI for editing the table data directly. Internally, the XmlDataSource invokes its Save( ) method each time Insert, Update or Delete is called by the GridView. Any changes committed back to the XmlDataSource are reflected in the underlying source XML document immediately. In one implementation, this automatic save behavior can be turned off using the AutoSave property of XmlDataSource. In this case, user code can call Save( ) manually when appropriate.

Binding a Templated List Control to XmlDataSource

A templated control, such as DataList or Repeater, can also be bound to an XmlDataSource, and individual XML data fragments may be bound inside the template using the XPathBinder helper object. The XPathBinder.Eval method accepts an XmlNode (as Object) and XPath expression, and will evaluate the result. A format string can also be passed to Eval, which applied using String.Format before returning the result.

XPathBinder.Eval (Object container, String expression)
→Object

XPathBinder.Eval (Object container, String expression, String format)→String

XPathBinder.Eval tries to cast the Object container to IXPathNavigable in order to apply the XPath expression, otherwise it fails. Note that a simplified syntax for XPathBinder is also supported, where the container is implicitly inferred as Container.DataItem: XPath (String expression [, String format]).

The following example shows a Repeater control bound to an XmlDataSource, where XPathBinder is used to retrieve the title of each book under the genre "fiction", along with the values of the author node's first-name and last-name attributes.

```
<form runat="server">
    <asp:XmlDataSource id="XmlSource" DataFile="Bookstore.xml" runat="server"
       XPath="bookstore/genre[@name='fiction']"/>
    <asp:Repeater DataSourceId="XmlSource" runat="server">
       <ItemTemplate>
          <h1><%# XPath ("book/@title") %></h1>
          <b>Author:</b>
          <%# XPath ("book/author/@first-name") %>
          <%# XPath ("book/author/@last-name") %>
       </ItemTemplate>
    </asp:Repeater>
</form>
```

EXAMPLE

Binding a DataList to an XmlDataSource, Using XPathBinder

XPathBinder can also return an IEnumerable from its Select method, which takes a container XmlNode Object and XPath expression and returns a list of nodes. Note that if the container Object does not implement IXPathNavigable, XPathBinder.Select throws InvalidCastException. Like XPathBinder.Eval, a simplified XPathSelect syntax may be used in it's place.

XPathBinder.Select (Object container, String expression)
→IEnumerable

The return value can be enumerated directly, or even assigned to the DataSource property of another list UI control, such as a Repeater or DataList. The following example demonstrates a Repeater control nested within the template of a parent Repeater control, bound to the result of an XPath query using XPathBinder.Select. Note that further XPath queries may be applied to the data in the nested repeater's ItemTemplate.

```
<form runat="server">
    <asp:XmlDataSource id="XmlSource" DataFile="Bookstore.xml" runat="server"
       XPath="bookstore/genre[@name='fiction']" />
    <asp:Repeater DataSourceId="XmlSource" runat="server">
       <ItemTemplate>
          <h1><%# XPath ("book/@title") %></h1>
          <b>Author:</b>
          <%# XPath ("book/author/@first-name") %>
          <%# XPath ("book/author/@last-name") %>
          <asp:Repeater
             DataSource='<%# XPathSelect ("book/chapters") %>'
             runat="server" >
             <ItemTemplate>
                <%# XPath ("chapter/@name") %>
             </ItemTemplate>
          </asp:Repeater>
       </ItemTemplate>
    </asp:Repeater>
</form>
```

EXAMPLE

Nested DataLists Bound to an XmlDataSource

Parameterized XPath Queries

In this implementation, like other DataSource controls, the XmlDataSource supports parameterized queries, where parameter values are bound from an associated ParameterCollection. This feature accepts an XPath query and name/value pair parameter list, and returns an XmlNodeList result. This allows for filtering and Master-Details scenarios, such as the scenario demonstrated in the following example.

```
<form runat="server">
  <asp:XmlDataSource  id="MasterSource"  DataFile="Bookstore.xml" runat="server"
     XPath="bookstore/genre" />
  <asp:XmlDataSource  id="DetailsSource"  DataFile="Bookstore.xml" runat="server"
     XPath="bookstore/genre[@name='$x']">
     <Parameters>
        <asp:ControlParameter name="x" ControlId="Genres" />
     </Parameters>
  </asp:XmlDataSource>
  <asp:DropDownList id="Genres" DataSourceId="MasterSource"
     DataTextField="Name" runat="server"/>
  <asp:GridView id="BooksForGenre" DataSourceId="DetailsSource"
     DataMember="Books" runat="server" />
</form>
```

EXAMPLE

Master-Details Example Using Parameterized XPath

Object Model Reference

```
namespace System.Web.UI.WebControls
{
    public class XmlDataSource : HierarchicalDataSourceControl,
IDataSource, IListSource
    {
        // Properties
        public virtual String         DataFile              { get; set; }
        public virtual String         Data                  { get; set; }
        public virtual String         SchemaFile            { get; set; }
        public virtual String         Schema                { get; set; }
        public virtual String         Transform             { get; set; }
        public virtual String         TransformFile         { get;
set; }
        public virtual XsltArgumentList  TransformArgumentList  { get;
set; }
        public virtual String         XPath                 { get; set; }
        public virtual bool           EnableCaching         { get;
set; }
        public virtual int            CacheDuration         { get;
set; }
        public virtual
DataSourceCacheExpiry    CacheExpirationPolicy             { get; set; }
        protected virtual   FileDataSourceCache   Cache     { get; }
        // Constructors
        public XmlDataSource (void);
        // Events
        public event EventHandler Transforming    { add; remove; }
        public event EventHandler DataSourceChanged  { add; remove; }
        // Methods
        public Save (void);
        public XmlDocument GetXmlDocument (void);
        protected virtual void OnTransforming (EventArgs e);
        protected virtual void OnDataSourceChanged (EventArgs e);
        // IDataSource Implementation
        event EventHandler IDataSource.DataSourceChanged { ... }
        DataSourceView IDataSource.GetView (String viewName);
        ICollection IDataSource.GetViewNames (void);
        // IHierarchicalDataSource Implementation
        event EventHandler IHierarchicalDataSource.DataSourceChanged { ... }
        HierarchicalDataSourceView IHierarchicalDataSource.GetView (String
viewPath);
        // IListSource Implementation
        bool IListSource.ContainsListCollection { get; }
        IList IListSource.GetList (void);
    }
    public class XmlHierarchicalDataSourceView : HierarchicalDataSourceView
    {
        // Methods
        public override IHierarchicalEnumerable GetHierarchicalList (void);
    }
    public class XmlHierarchicalEnumerable : IHierarchicalEnumerable
    {
        // IHierarchicalEnumerable Implementation
```

```
        IHierarchicalEnumerator IHierarchicalEnumerable.GetEnumerator (void);
        // IEnumerable Implementation
        IEnumerator IEnumerable.GetEnumerator (void);
}
public class XmlHierarchicalEnumerator : IHierarchicalEnumerator
{
        // IHierarchicalEnumerator Implementation
        bool IHierarchicalEnumerator.HasChildren { get; }
        String IHierarchicalEnumerator.Path { get; }
        Object IHierarchicalEnumerator.this [String propertyName] { get; }
        HierarchicalDataSourceView IHierarchicalEnumerator.GetChildren (void);
        HierarchicalDataSourceView IHierarchicalEnumerator.GetParent (void);
        // IEnumerator Implementation
        Object IEnumerator.Current { get; }
        bool IEnumerator.MoveNext (void);
        void IEnumerator.Reset (void);
}
public class XmlDataSourceView : DataSourceView
{
        // Properties
        public override String Name                               { get; }
        // Methods
        public override IEnumerable ExecuteSelect(DataSourceSelectArguments
        arguments);
}
}
```

Persistence Format

```
<asp:XmlDataSource
    DataFile="String"
    SchemaFile="String"
    TransformFile="String"
    XPath="String"
    EnableCaching="[true\false]"
    CacheDuration="int"
    CacheExpirationPolicy="DataSourceCacheExpiry"
    OnDataSourceChanged="EventHandler"
    OnTransforming="EventHandler"
    runat="server"
>
    <Data>
        [ Inline XML Data ]
    </Data>
    <Schema>
        [ Inline XML Schema ]
    </Schema>
    <Transform>
        [ Inline XSL Tranform ]
    </Transform>
</asp:XmlDataSource>
```

Appendix H—Exemplary Data Source Control Parameters

Overview

DataSource Parameter classes described in this document are supporting types to the systems and methods for data control architecture 100 of FIG. 1. Development tools provided by design host 110 of FIG. 1 make it easy to associate control and page values with parameters at design-time. A DataSource control class (an instantiation of which represents a respective data source control 112) abstracts a specific type of data through a common interface shared by other controls based on DataSource.

Data-bound controls (i.e., data-bound control(s) 110) can be associated with a DataSource control to consume and render the underlying data, without requiring a Page developer to write any code whatsoever. Rather, page developers can declaratively associate request, session or control values with data source parameters, to be bound at runtime when an operation is invoked. No code is required to assign the value. Data-bound controls can programmatically create parameters and assign them to a DataSource control's ParameterCollection property to associate values with insert, update or delete parameters on-demand. The GridView and DetailsView controls do this to provide automatic edit, insert and delete functionality. In this implementation, all parameters share a common base class that allows new parameter types to be defined that work with existing DataSource controls. The supported Parameter types described in this document are Parameter (static), QueryStringParameter, FormParameter, CookieParameter, SessionParameter, ControlParameter, , and ProfileParameter Several DataSource controls, including the SqlDataSource and ObjectDataSource controls, support parameterized operations to select, insert, update, and delete data. The syntax of a parameterized operation is specific to the data source control provider or underlying data type represented by the DataSource control. For example, SqlDataSource command parameters are prefixed with '@' when using the System-.Data.SqlClient provider, whereas when using the System-.Data.OleDb provider the command parameters are prefixed with '?'. ObjectDataSource parameters are inferred from the MethodInfo of the associated object method for a given operation.

Scenarios

Below are provided a number of exemplary scenarios supported by DataSource Parameters:

Filtering Data with Parameterized Queries

DataSource Parameters allow values of request fields or control properties to be bound to the parameters in a DataSource control command. The example below shows a parameter bound to the SelectedValue property of a DropDownList control, as well as a property bound to a "searchFor" querystring value. When the "searchFor" value is unavailable, an empty string DefaultValue is used.

```
<form runat="server">
    <asp:SqlDataSource id="MySource" runat="server"
ConnectionString="server=aspnet;database=messagedb;
```

-continued

```
trusted_connection=yes"
        SelectCommand="SELECT @count * FROM Messages
        WHERE Topic
LIKE @searchFor">
        <Parameters>
            <asp:ControlParameter Name="count" ControlId="Num"
            PropertyName="SelectedValue"/>
            <asp:QueryStringParameter Name="searchFor"
QueryStringField="SearchFor"
            Default Value=""/>
        </Parameters>
    </asp:SqlDataSource>
    Results To Display:
    <asp:DropDownList id="Num" runat="server">
        <asp:ListItem Selected>10</asp:ListItem>
        <asp:ListItem>100</asp:ListItem>
        <asp:ListItem>1000</asp:ListItem>
    </asp:DropDownList>
    <asp:GridView DataSourceId="MySource" runat="server"/>
</form>
```

EXAMPLE

Binding to a Parameterized Query

In this implementation, if the PropertyValue on ControlParameter is not specified, it uses the default control property as indicated by the ControlValuePropertyAttribute (see ControlParameter description in the Reference Specification section below).

Creating a Master-Details Report Page

A common use for parameters is to enable a completely declarative master-details scenario, where the value from a master control, such as a dropdownlist, is used as input to a data source bound to a details control, such as a grid.

```
<form runat="server">
    <asp:DropDownList id="StateDropDown" DataSourceId="MyStateSource"
        DataTextField="state" AutoPostBack="true" runat="server"/>
    <asp:GridView id="MyGridView" DataSourceId="MySource"
        DataKeyNames="au_id"
        AutoGenerateEditButton="true"
        AutoGenerateDeleteButton="true"
        AllowSorting="true"
        AllowPaging="true"
        runat="server" />
    <asp:SqlDataSource id="MySource"
        ConnectionString="server=(local);database=pubs;trusted_connection=yes"
        SelectCommand="select * from authors where state = @state"
        UpdateCommand="update authors set au_lname = @au_lname where au_id = @au_id"
        DeleteCommand="DeleteAuthor"
        runat="server"
    >
        <SelectParameters>
            <asp:ControlParameter Name="state" ControlId="StateDropDown"
                PropertyName="SelectedValue" />
        </SelectParameters>
    </asp:SqlDataSource>
    <asp:SqlDataSource id="MyStateSource"
        ConnectionString="server=(local);database=pubs;trusted_connection=yes"
        SelectCommand="select DISTINCT state from authors"
        runat="server"
    />
</form>
```

EXAMPLE

Creating a Master-Details Page

Inserting, Updating, or Deleting Data Rows

Parameters may also be used to substitute values to an insert, update, or delete command of a DataSource control. The following example demonstrates an AccessDataSource control bound to an MDB database file, which takes a value to insert from a TextBox control on the page.

```
<script runat="server">
    void DoInsert (Object sender, EventArgs e) {
        MySource.Insert( );
    }
</script>
<form runat="server">
    First Name: <asp:TextBox id="FirstName" runat="server"/>
    <asp:Button Text="Insert Row" OnClick="InsertRow" runat="server"/>
    <asp:AccessDataSource id="MySource" runat="server"
        SelectCommand="SELECT * FROM Customers"
        InsertCommand="INSERT INTO Customers (FirstName)
        VALUES (?)"
        DataFile="/data/customers.mdb">
```

-continued

```
    <InsertParameters>
        <asp:ControlParameter Name="FirstName"
        ControlId="FirstName"
            PropertyName="Text" />
    </InsertParameters>
</asp:AccessDataSource>
</form>
```

EXAMPLE

Inserting Data to an Access Database

Specifying Parameter Types and Order

A "smart" data-bound control, such as a GridView or DetailsView, is able to dynamically populate update, insert, or delete parameter values without the need for declarative parameters on the DataSource control (see the GridView in the Master-Details scenario above). However, this assumes that the data-bound control either passes parameters in the correct order, or that the order of parameters is irrelevant. While parameter order is not significant for some DataSource controls (e.g. the ObjectDataSource control or the SqlClient provider of SqlDataSource), it does matter in some cases (e.g. the AccessDataSource or the OLEDB provider of SqlDataSource). Parameters may be specified to precisely define the order in which parameters are to be passed to a given DataSource operation. An optional TypeCode may be specified as well, to force the parameter value to be converted to given simple type. In the example below, the AccessDataSource control expects update parameters in the order "email, password, id". To ensure that the dynamically populated parameters from DetailsView are passed in order, all parameters are specified in order in the UpdateParameters collection of the AccessDataSource control.

```
<form runat="server">
    <asp:DetailsView DataSourceId="MySource"
    DataKeyNames="Id"
    AutoGenerateRows="false"
    AutoGenerateEditButton="true"
    runat="server">
    <RowFields>
        <asp:BoundField HeaderText="Id" DataField="Id"
        ReadOnly="true"/>
        <asp:BoundField HeaderText="Email" DataField="Email" />
        <asp:BoundField HeaderText="Password" DataField="Pwd" />
    </RowFields>
    </asp:DetailsView>
    <asp:AccessDataSource id="MySource" runat="server"
        SelectCommand="SELECT Id, Email, Pwd FROM Users
        WHERE Id =?"
        UpdateCommand="UPDATE Users SET Email = ?, Pwd = ?
WHERE Id = ?"
        DataFile="data/users.mdb">
        <SelectParameters>
        <asp:QueryStringParameter Name="Id" QueryStringField="Id"
DefaultValue="0"/>
        </SelectParameters>
        <UpdateParameters>
        <asp:Parameter Name="Email"/>
        <asp:Parameter Name="Pwd"/>
        <asp:Parameter Name="Id"/>
        </UpdateParameters>
    </asp:AccessDataSource>
</form>
```

EXAMPLE

Specifying the Order of Dynamically Populated Parameters

Parameters are reordered according to their declaration in the ParameterCollection for the DataSource control before invoking the Update operation. Note that if a dynamically added parameter is not declared in the Parameter collection, it is simply appended to the end of the parameter list in the order it was received. For example, if (A, B, C, D) is passed to a DataSource control with parameters (C, B), the resulting order is (C, B, A, D).

Output/Reference Parameters and Return Values

Some DataSource controls, such as ObjectDataSource and SqlDataSource, support the notion of output parameters, input/output (reference) parameters, and return values. Parameters support a Direction property for specifying the direction of the parameter. While the actual value of the Parameter object is not modified when marked as output or a return value, the DataSource control makes the output/retval values available in the event args passed to the DataSource's status event for the particular operation. In the example below, the OnInserted event is handled on the SqlDataSource control to obtain the return value from a stored procedure that inserts a new contact record into a SQL database. The event args to this event also exposes an OutputParameters dictionary containing the output values of any Parameters marked as output or input/output (there are none in this example).

```
<script runat="server">
    void MySource_Inserted (Object sender,
    SqlDataSourceStatusEventArgs e) {
        int retval = (int)e.ReturnValue;
    }
</script>
<form runat="server">
    <asp:SqlDataSource id="MySource" OnInserted="MySource_Inserted"
runat="server"
        ConnectionString="server=(local);database=
        contacts;trusted_connection=yes"
        InsertCommand="AddContact">
        <InsertParameters>
        <asp:Parameter Name="ContactId" Direction="ReturnValue"/>
        </InsertParameters>
    </asp:SqlDataSource>
    <asp:DetailsView DataSourceId="MySource" Mode="Insert" ...
runat="server"/>
</form>
```

EXAMPLE

Obtaining the Return Value from a DataSource Operation

Specification
In this implementation, DataSource Parameter types are defined as follows:

```
namespace System.Web.UI.WebControls
{
    public class Parameter : IStateManager
    {
        // Properties
```

-continued
```
    public String              Name                    { get; set; }
    public TypeCode            Type                    { get; set; }
    public String              DefaultValue            { get; set; }
    public bool                TreatEmptyStringAsNull  { get; set; }
    public ParameterDirection  Direction               { get; set; }
    // Methods
    protected Parameter Clone (void);
    protected Object Evaluate (HttpContext context, Control control);
    protected void OnParameterChanged (void);
    // Constructors
    public Parameter (void);
    public Parameter (String name);
    public Parameter (String name, TypeCode type);
    protected virtual StateBag ViewState { get; }
    protected bool IsTrackingViewState { get; }
    protected virtual void TrackViewState (void);
    protected virtual void LoadViewState (Object savedState);
    protected virtual Object SaveViewState (void);
    // IStateManager Implementation
    bool IStateManager.IsTrackingViewState { get; }
    void IStateManager.TrackViewState (void);
    void IStateManager.LoadViewState (Object savedState);
    Object IStateManager.SaveViewState (void);
}
public class QueryStringParameter : Parameter
{
    // Properties
    public String              QueryStringField        { get; set; }
    // Constructors
    public QueryStringParameter (void);
    public QueryStringParameter (String name, String queryStringField);
    public QueryStringParameter (String name, TypeCode type, String queryStringField);
    // Methods
    protected override Parameter Clone (void);
    protected override Object Evaluate (HttpContext context,
        Control control);
}
public class FormParameter : Parameter
{
    // Properties
    public String              FormField               { get; set; }
    // Constructors
    public FormParameter (void);
    public FormParameter (String name, String formField);
    public FormParameter (String name, TypeCode type,
        String formField);
    // Methods
    protected override Parameter Clone (void);
    protected override Object Evaluate (HttpContext context,
        Control control);
}
public class CookieParameter : Parameter
{
    // Properties
    public String              CookieName              { get; set; }
    // Constructors
    public CookieParameter (void);
    public CookieParameter (String name, String cookieName);
    public CookieParameter (String name, TypeCode type, String
cookieName);
    // Methods
    protected override Object Evaluate (Control control);
}
public class SessionParameter : Parameter
{
    // Properties
    public String              SessionField            { get; set; }
    // Constructors
    public SessionParameter (void);
    public SessionParameter (String name, String sessionField);
    public SessionParameter (String name, TypeCode type, String
SessionField);
    // Methods
    protected override Parameter Clone (void);
    protected override Object Evaluate (HttpContext context,
        Control control);
}
public class ControlParameter : Parameter
{
    // Properties
    public String              ControlId               { get; set; }
    public String              PropertyName            { get; set; }
    // Constructors
    public ControlParameter (void);
    public ControlParameter (String name, String controlID, String propertyName);
    public ControlParameter (String name, TypeCode type, String controlID, String
        propertyName);
    // Methods
    protected override Parameter Clone (void);
    protected override Object Evaluate (HttpContext context,
        Control control);
}
public class ProfileParameter : Parameter
{
    // Properties
    public String              PropertyName            { get; set; }
    // Constructors
    public ProfileParameter (void);
    public ProfileParameter (String name, String propertyName);
    public ProfileParameter (String name, TypeCode type, String propertyName);
    // Methods
    protected override Parameter Clone (void);
    protected override Object Evaluate (HttpContext context,
        Control control);
}
public class ParameterCollection : StateManagedCollection
{
    // Properties
    public                     Parameter this [int index]   { get; }
    // Methods
    public int Add (Parameter param);
    public int Add (String name, String value);
    public int Add (String name, TypeCode Type, String value);
    public void Remove (Parameter param);
    public void RemoveAt (int index);
    public void Insert (int index, Parameter param);
    public IOrderedDictionary GetValues (Control control);
    public void UpdateValues (Control control);
    protected override Object CreateKnownType (int index);
    protected override Type[ ] GetKnownTypes (void);
    protected override void OnClearComplete (void);
    protected override void OnInsert (int index, Object value);
    protected override void OnInsertComplete (int index, Object value);
    protected override void OnRemoveComplete (int index, Object value);
    protected override void OnValidate (Object o);
    protected override void SetDirtyObject (Object o);
    protected virtual void OnParametersChanged(EventArgs e);
    // Events
    public event EventHandler ParametersChanged { add; remove; }
}
}
namespace System.Web.UI {
[AttributeUsage(AttributeTargets.Class)]
public sealed class ControlValuePropertyAttribute : Attribute
{
    // Properties
    public String              Name                    { get; }
    public Object              NullValue               { get; }
    //Constructors
    public ControlValuePropertyAttribute (String name);
    public ControlValuePropertyAttribute (String name, Object nullValue);
    // Methods
    public override bool Equals (Object obj);
    public override int GetHashCode (void);
}
}
```

Persistence Format

```
<asp:DataSourceControl ... runat="server">
  <Parameters>
    <asp:QueryStringParameter
      Name="String"
      Type="TypeCode"
      DefaultValue="String"
      Direction="System.Data.ParameterDirection"
      QueryStringField="String"
    />
    <asp:FormParameter
      Name="String"
      Type="TypeCode"
      DefaultValue="String"
      Direction="System.Data.ParameterDirection"
      FormField="String"
    />
    <asp:CookieParameter
      Name="String"
      Type="TypeCode"
      DefaultValue="String"
      Direction="System.Data.ParameterDirection"
      CookieName="String"
    />
    <asp:SessionParameter
      Name="String"
      Type="TypeCode"
      DefaultValue="String"
      Direction="System.Data.ParameterDirection"
      SessionField="String"
    />
    <asp:ControlParameter
      Name="String"
      Type="TypeCode"
      DefaultValue="String"
      Direction="System.Data.ParameterDirection"
      ControlId="String"
      PropertyName="String"
      TreatEmptyStringAsNull="[true\false]"
    />
    <asp:EvalParameter
      Name="String"
      Type="TypeCode"
      DefaultValue="String"
      Direction="System.Data.ParameterDirection"
      Expression="String"
    />
    <asp:ProfileParameter
      Name="String"
      Type="TypeCode"
      DefaultValue="String"
      Direction="System.Data.ParameterDirection"
      PropertyName="String"
    />
  </Parameters>
</asp:DataSourceControl>
```

System.Web.UI.WebControls.Parameter

The Parameter class is an exemplary common base from which all other Parameter types are derived. The Parameter class also serves as the implementation for static parameters, where the value is specified statically using the DefaultValue property. Each derived Parameter class overrides and implements the protected method Evaluate, which updates and returns the value of the parameter. Each parameter also implements an internal UpdateValue method and ParameterValue property which are used by the ParameterCollection class to retrieve the value for returning from its GetValues method. This ensures that Parameter values are always accessed through their containing ParameterCollection. For derived Parameter types, the DefaultValue property determines the value to use in place of a null value obtained from the parameter source (Cookie, Request, Control, etc).

Parameters share a common Name property, which is the name of the parameter for the particular DataSource operation (for example, this would match a parameter name in the SelectCommand for the SqlDataSource). All Parameters also share a Type property which specifies the type of the parameter value. The OnParameterChanged method can be called by the Parameter whenever the value, name, or type of the parameter changes. This will in turn raise the ParametersChanged event of the parameter's ParameterCollection container, which ultimately raises the DataSource control's OnDataSourceChanged event, causing any data-bound controls to re-bind.

Parameters also share a Direction property, which is used to specify whether the Parameter is used for Input, Output (or ReturnValue), or Both Input and Output. DataSources generally expose output parameters and return values from an event args passed to the DataSource operation's status event. Refer to the Scenarios section of this specification for an example.

Properties
Name

| | |
|---|---|
| Prototype | public String Name { get; set; } |
| Description | Gets/sets the name of the parameter. |
| Default Value | String.Empty |
| Value Editor | |

Type

| | |
|---|---|
| Prototype | public TypeCode Type { get; set; } |
| Description | Gets/sets the type of the parameter's value. |
| Default Value | TypeCode.Object |
| Value Editor | |

DefaultValue

| | |
|---|---|
| Prototype | public String DefaultValue { get; set; } |
| Description | The default value for the parameter. For a derived parameter type, this value is used in place of the source value (e.g. from a Control property or QueryString/Session field) when the source value is null. |
| Default Value | null |
| Value Editor | |

TreatEmptyStringAsNull

| | |
|---|---|
| Prototype | public boot TreatEmptyStringAsNull { get; set; } |
| Description | Gets or sets whether String.Empty is converted to null when evaluating the value of the parameter. Note that the conversion from null to DefaultValue happens after this conversion. |
| Default Value | true |
| Value Editor | |

Direction

| | |
|---|---|
| Prototype | public ParameterDirection Direction { get; set; } |
| Description | Gets or sets the direction for the parameter, either Input, Output, InputOutput, or ReturnValue. DataSources generally expose output parameters and return values from an event args passed to the DataSource operation's status event. |
| Default Value | ParameterDirection.Input |
| Value Editor | |

Methods
Evaluate

| | |
|---|---|
| Prototype | protected Object Evaluate (HttpContext context, Control control); |
| Description | Evaluates the parameter and returns the new value. The control parameter is used to access the page's framework. This are overidden by a derived class to actually get the value. |
| Parameters | control - The control parameter is used to access the page's framework. |

-continued

OnParameterChanged

| | |
|---|---|
| Prototype | protected void OnParameterChanged (void); |
| Description | Raises the ParameterChanged event. This notifies a listener that it should re-evaluate the value. |
| Parameters | None |

System.Web.UI.WebControls.QueryStringParameter

The QueryStringParameter class binds the value of a querystring parameter to the value of the Parameter object. The QueryStringField property matches the name of the querystring field from which the value is retrieved. The DefaultValue property will be returned whenever the querystring value is unavailable.

Properties
QueryStringField

| | |
|---|---|
| Prototype | public String QueryStringField { get; set; } |
| Description | The name of the querystring parameter to get the value from. |
| Default Value | String.Empty |
| Value Editor | |

Methods
Evaluate

| | |
|---|---|
| Prototype | protected override Object Evaluate (HttpContext context, Control control); |
| Description | Returns the updated value of the parameter. |
| Parameters | control - The control parameter is used to access the page's framework. |

System.Web.UI.WebControls.FormParameter

The FormParameter class binds the value of an HTML form field to the value of the Parameter object. The FormField property matches the name of the form field from which the value is retrieved. The DefaultValue property will be returned whenever the Form value is unavailable.

Properties
FormField

| | |
|---|---|
| Prototype | public String FormField { get; set; } |
| Description | The name of the form field to get the value from. |
| Default Value | String.Empty |
| Value Editor | |

Methods
Evaluate

| | |
|---|---|
| Prototype | protected override Object Evaluate (HttpContext context, Control control); |
| Description | Returns the updated value of the parameter. |
| Parameters | control - The control parameter is used to access the page's framework. |

System.Web.UI.WebControls.CookieParameter

The CookieParameter class binds the value of an HttpCookie to the value of the Parameter object. The CookieName property matches the name of the cookie from which the value is retrieved (only simple-valued cookies are supported). The DefaultValue property will be returned whenever the cookie value is unavailable.

Properties
CookieName

| | |
|---|---|
| Prototype | public String CookieName { get; set; } |
| Description | The name of the cookie to get the value from. |
| Default Value | String.Empty |
| Value Editor | |

Methods
Evaluate

| | |
|---|---|
| Prototype | protected override Object Evaluate (HttpContext context, Control control); |
| Description | Returns the updated value of the parameter. |
| Parameters | control - The control parameter is used to access the page's framework. |

System.Web.UI.WebControls.SessionParameter

The SessionParameter class binds the value of a Session object to the value of the Parameter object. The SessionField property matches the name of the Session key from which the value is retrieved. The DefaultValue property will be returned whenever the Session value is unavailable.

Properties
SessionField

| | |
|---|---|
| Prototype | public String SessionField { get; set; } |
| Description | The name of the session variable to get the value from. |
| Default Value | String.Empty |
| Value Editor | |

Methods
Evaluate

| | |
|---|---|
| Prototype | protected override Object Evaluate (HttpContext context, Control control); |
| Description | Returns the updated value of the parameter. |
| Parameters | control - The control parameter is used to access the page's framework. |

System.Web.UI.WebControls.ControlParameter

The ControlParameter class binds the value of a Control property to the value of the Parameter object. The ControlID property matches the Id of the Control whose property is bound to the parameter. The PropertyName specifies the property of the control from which the actual value is retrieved. The Control whose ID is specified by ControlID may optionally define a ControlValuePropertyAttribute, which determines the default property name from which to retrieve the control's value. This property will be used whenever PropertyName is not set explicitly. The following controls define a ControlValuePropertyAttribute:

| Control Name | Control Value Property Name |
|---|---|
| TextBox, Label | Text |
| ListControl (e.g. DropDownList) | SelectedValue |
| CheckBox | Checked |
| Calendar | SelectedDate |
| DetailsView | DataKey.Value * |
| GridView | SelectedDataKey.Value * |
| TreeView | SelectedNode.Value * |

ControlValuePropertyAttribute also has a constructor overload for specifying the null value of the property. When the property equals NullValue, a ControlParameter will treat as null (and logic for converting to DefaultValue applies). This logic also gets applied when PropertyName is explicitly set by the developer, and not inferred from the ControlValuePropertyAttribute.

Properties
ControlID

| | |
|---|---|
| Prototype | public String ControlID { get; set; } |
| Description | The ID of the control to get the value from. |
| Default Value | String.Empty |
| Value Editor | |

PropertyName

| | |
|---|---|
| Prototype | public String PropertyName { get; set; } |
| Description | The name of the control's property to get the value from. If not specified, the ControlParameter uses the default property indicated by the ControlValuePropertyAttribute of the control. |
| Default Value | String.Empty |
| Value Editor | |

Methods
Evaluate

| | |
|---|---|
| Prototype | protected override Object Evaluate (HttpContext context, Control control); |
| Description | Returns the updated value of the parameter. |
| Parameters | control - The control parameter is used to access the page's framework. |

System.Web.UI.WebControls.EvalParameter

The EvalParameter class binds the value of an Eval expression to the value of the Parameter object. The Expression property matches an expression to evaluate in order to retrieve the value. The DefaultValue property will be returned whenever the expression value is unavailable.

-continued

Properties
Expression

| | |
|---|---|
| Prototype | public String Expression { get; set; } |
| Description | The name of the eval expression to get the value from. This is any expression that is valid to pass to the DataBinder.Eval( . . . ) method. |
| Default Value | String.Empty |
| Value Editor | |

Methods
Evaluate

| | |
|---|---|
| Prototype | protected override Object Evaluate (HttpContext context, Control control); |
| Description | Returns the updated value of the parameter. |
| Parameters | control - The control parameter is used to access the page's framework. |

System.Web.UI.WebControls.ProfileParameter

The ProfileParameter class binds the value of a Personalization Profile object to the value of the Parameter object. The ParameterName property matches the name of the profile property name from which the value is retrieved. The DefaultValue property will be returned whenever the property value is unavailable.

Properties
PropertyName

| | |
|---|---|
| Prototype | public String PropertyName { get; set; } |
| Description | The name of the personalization profile property to get the value from. |
| Default Value | String.Empty |
| Value Editor | |

Methods
Evaluate

| | |
|---|---|
| Prototype | protected override Object Evaluate (HttpContext context, Control control); |
| Description | Returns the updated value of the parameter. |
| Parameters | control - The control parameter is used to access the page's framework. |

System.Web.UI.WebControls.ParameterCollection

The ParameterCollection class provides a collection type for DataSource controls to use to expose parameter collection properties. A collection of Parameters usually applies to a single command in the DataSource control, such as an insert or update command. A data-bound control always accesses Parameter values through the ParameterCollection.GetValues method. The ParametersChanged event is raised whenever the name, type or value of one of the contained parameters changes.

Properties
this [int index]

| | |
|---|---|
| Prototype | public Parameter this[int index] { get; } |
| Description | Returns the Parameter at a given index. |
| Default Value | NA |
| Value Editor | |

Methods
Add

| | |
|---|---|
| Prototype | public int Add (Parameter param); |
| Description | Adds a Parameter to the collection. |
| Parameters | param - The parameter object to add to the collection. |

Add

| | |
|---|---|
| Prototype | public int Add (String name, String value); |
| Description | Adds a Parameter to the collection with a specified name, type, and default value. |
| Parameters | name - The name of the parameter object to add to the collection. |
| | value - The value of the parameter object to add to the collection. |

Add

| | |
|---|---|
| Prototype | public int Add (String name, TypeCode Type, String value); |
| Description | Adds a Parameter to the collection with a specified name, type, and default value. |

| | |
|---|---|
| Parameters | name - The name of the parameter object to add to the collection. |
| | type - The type of the parameter object to add to the collection. |
| | value - The value of the parameter object to add to the collection. |

Remove

| | |
|---|---|
| Prototype | public void Remove (Parameter param); |
| Description | Removes a Parameter from the collection. |
| Parameters | param - The parameter object to add to the collection. |

RemoveAt

| | |
|---|---|
| Prototype | public void RemoveAt (int index); |
| Description | Removes a Parameter from the collection at a given index. |
| Parameters | index - the index at which to remove a parameter. |

GetValues

| | |
|---|---|
| Prototype | public IOrderedDictionary GetValues (Control control); |
| Description | Returns an IOrderedDictionary containing Name/Value pairs of all the parameters in the collection. Data-bound controls use this method to retrieve parameter values associated with a given command. |
| Parameters | control - The control parameter is used to access the page's framework. |

UpdateValues

| | |
|---|---|
| Prototype | public void UpdateValues (Control control); |
| Description | Forces parameters to update their values, to possibly raise a ParametersChanged event. |
| Parameters | control - The control parameter is used to access the page's framework. |

Insert

| | |
|---|---|
| Prototype | public void Insert (int index, Parameter param); |
| Description | Inserts a Parameter into the collection. |
| Parameters | index - the index at which to insert a parameter. |
| | param - The parameter object to add to the collection. |

Events
ParametersChanged

| | |
|---|---|
| Prototype Handler | private void ParameterCollection_ParametersChanged (Object sender, EventArgs e); |
| Description | Raised when any of the Parameter objects in the collection change or when the collection itself changes. |

The invention claimed is:

1. A method for automatically binding data to data stores, the method comprising:

exposing, by a first data source control, a first application programming interface for generic access to a first data store having data types, wherein the first data source control represents a first data store and the capabilities of the first data store;

exposing, by a second data source control, a second application programming interface for generic access to the second data store having data types, wherein the second data source control represents a second data store and the capabilities of the second data store, and wherein the second data store is different from the first data store;

associating a first data-bound control with the first data source control, wherein the first data bound control is a visual source control whose rendering depends on the first data source control;

implementing the first application programming interface, by the first data-bound control, to automatically databind to the first data store at an appropriate time during runtime operations of the fu data-bound control, wherein the first data source control allows the manipulation of underlying data without requiring a unique application programming interface for each data type being utilized;

associating a second data-bound control with the second data source control, wherein the second data bound control is a visual source control whose rendering depends on the second data source control;

implementing the second application programming interface, by the second data-bound control to automatically databind to the second data store at an appropriate time during runtime operations of the second data-bound control, wherein the second data source control allows the manipulation of underlying data without requiring a unique application programming interface for each data type being utilized;

determining that a value associated with, a declarative parameter maintained by the first data source control has changed: and responsive to the determining, raising by the first data source control, a parameter changed event causing the first data-bound control to re-bind to the first data store.

2. A method as recited in claim 1, wherein the first data source control is a reusable component.

3. A method as recited in claim 1, wherein the generic access is independent of any specific data store or data type.

4. A method as recited in claim 1, wherein the generic access comprises access to data and/or operations associated with a particular data store, the data being tabular or hierarchical data.

5. A method as recited in claim 1, wherein the first data store is associated with database data, markup, file system data, a Universal Resource Identifier, or business data.

6. A method as recited in claim 1, wherein the first data store is a data object, an SQL data source, or a markup data source.

7. A method as recited in claim 1, wherein the method further comprises automatically paging, by the first data-bound control, over data associated with the first data store via the first application programming interface.

8. A method as recited in claim 1, wherein the method further comprises automatically caching, by the first data source control, of first data store data.

9. A method as recited in claim 1, wherein the method further comprises:
automatically caching, by the first data source control, of first data store data; and automatic invalidation and purging of cached data when data of the first data store changes.

10. A method as recited in claim 1, and further comprising dynamically discovering, by the first data-bound control, operations promoted by a data source view exposed by the first application programming interface, the operations being associated with the first data store.

11. A method as recited in claim 1, and further comprising:
dynamically discovering, by the first data-bound control, operations promoted by a data source view exposed by the first application programming interface, the operations being associated with the first data store; and
presenting or disabling, by the first data-bound control, a user interface element to reflect supported or non-supported operations of the operations.

12. A method as recited in claim 1, and further comprising:
receiving a request from the first data-bound control to implement a dynamically discovered operation promoted to the first data-bound control by a respective portion of the first application programming interface;
implementing the dynamically discovered operation, by the first data source control; responsive to implementing, receiving data from the first data store; and communicating, by the first data source control, the data to a callback of the data-bound control.

13. A method as recited in claim 1, and further comprising navigating, by the first data-bound control, parent-child relationships in hierarchical data associated with the first data store, the navigating being based on a data source view provided by the first application programming interface.

14. A method as recited in claim 1, and further comprising rendering, by the first data-bound control, information associated with the first data store as a function of a data source view provided by the first application programming interface.

15. A method as recited in claim 14, wherein the rendering is an expanded tree view or menu.

16. A method as recited in claim 1, wherein the method further comprises:
automatically implementing, by the first data-bound control, parameterized runtime operations with respect to the first data store via the first application programming interface, the automatic implementing being independent of any page developer code to handle any parameter; and
identifying with declarative parameters underlying the first application programming interface, how parameter values associated with respective ones of the runtime operations are to be evaluated at runtime.

17. A method as recited in claim 16, the parameterized operations include select, insert, update, or delete data operations.

18. A method as recited in claim 16, wherein the declarative parameters are specified in a tag-based data format.

19. A computer-storage medium comprising computer-executable instructions for a data controls architecture, the computer-executable instructions comprising instructions for:
exposing, by a first data source control, a first application programming interface for generic access to a first data store having data types, wherein the first data source control represents the first data store and the capabilities of the first data store;
exposing, by a second data source control, a second application programming interface for generic access to the second data store having data types, wherein the second data source control represents a second data store and the capabilities of the second data store, and wherein the second data store is different from the first data store;
associating a first data-bound control with the first data source control, wherein the first data bound control is a visual source control whose rendering depends on the data source control;
implementing the first application programming interface, by the first data-bound control, to automatically databind to the first data store at an appropriate time during runtime operations of the first data-bound control, wherein the first data source control allows the manipulation of underlying data without requiring a unique application programming interface for each data type being utilized, wherein the first data source control allows the manipulation of underlying data without requiring a unique application programming interface for each data type being utilized;
associating a se and data-bound control with the second data source control, wherein the second data bound control is a visual source control whose rendering depends on the second data source control; and
implementing the second application programming interface, by the second data-bound control to automatically databind to the second data store at an appropriate time during runtime operations of the second data-bound control, wherein the second data source control allows the manipulation of underlying data without requiring a unique application programming interface for each data type being utilized;

determining that a value associated with a declarative parameter maintained the first data source control has changed;

responsive to the determining, raising by the first data source control, a parameter changed event causing the fist data-bound control to re-bind to the first data store;

providing a user interface element to support generic access to the first and second data stores;

dynamically discovering, by the first data-bound control, operations supported by the first data store;

disabling, by the first data-bound control, the user interface element to the extent the user interface element reflects operations not supported by the first data store; and presenting the user interface element to reflect operations supported by the first data store.

20. A computer-storage medium as recited in claim 19 wherein the generic access is independent of any specific data store or data type.

21. A computer-storage medium as recited in claim 19, wherein the first data store is associated with database data, markup, file system data, a Universal Resource Identifier, or business data.

22. A computer-storage medium as recited in claim 19, and further comprising computer-executable instructions for:

receiving a request from the first data-bound control to implement a dynamically discovered operation promoted to the first data-bound control by a respective portion of the first application programming interface;

implementing the dynamically discovered operation, by the first data source control;

responsive to implementing, receiving data from the first data store; and communicating, by the first data source control, the data to a callback of the data-bound control.

23. A computer-storage medium as recited in claim 19, and further comprising computer-executable instructions for navigating, by the first data-bound control, parent-child relationships in hierarchical data associated with the first data store, the navigating being based on a data source view provided by the first application programming interface.

24. A computer-storage medium as recited in claim 19, and further comprising computer-executable instructions for:

automatically implementing, by the first data-bound control, parameterized runtime operations with respect to the first data store via the first application programming interface, the automatic implementing being independent of any page developer code to handle any parameter, and identifying with declarative parameters underlying the first application programming interface, how parameter values associated with respective ones of the runtime operations are to be evaluated at runtime.

25. A computer-storage medium as recited in claim 24, wherein the parameterized operations include select, insert, update, or delete data operations.

26. A computer-storage medium as recited in claim 24, wherein the declarative parameters are specified in a tag-based data format.

27. A computing device comprising:
a processor; and
a memory coupled to the processor, the memory comprising computer-program instructions executable by the processor for:

exposing, by a first data source control, a first application programming interface for generic access to a first data store, wherein the first data source control represents the first data store and the capabilities of the first data store;

exposing, by a second data source control, a second application programming interface for generic access to the second data store, wherein the second data source control represents a second data store and the capabilities of the second data store, and wherein the second data store is different from the first data store;

associating a first data-bound control with the first data source control, wherein the first data bound control is a visual source control whose rendering depends on the first data source control;

implementing the first application programming interface, by the first data-bound control, to automatically databind to the first data store at an appropriate time during runtime operations of the data-bound control, wherein the first data source control allows the manipulation of underlying data without requiring a unique application programming interface for each data type being utilized;

associating a second data-bound control with the second data source control wherein the second data bound control is a visual source control whose rendering depends on the second data source control; and implementing the second application programming interface, by the second data-bound control to automatically databind to the second data store at an appropriate time during runtime operations of the second data-bound control, wherein the second data source control allows the manipulation of underlying data without requiring a unique application programming interface for each data type being utilized;

determining, that a value associated with a declarative parameter maintained by the first data source control has changed; and responsive to the determination, raising by the first data source control, a parameter changed event causing the data-bound control to re-bind to the first data store.

28. A computing device as recited in claim 27, wherein the generic access is independent of any specific data store or data type.

29. A computing device as recited in claim 27, wherein the first data store is associated with database data, markup, file system data, a Universal Resource Identifier, or business data.

30. A computing device as recited in claim 27, and further comprising computer-programmable instructions for dynamically discovering, by the first data-bound control, operations promoted by a data source view exposed by the first application programming interface, the operations being associated with the first data store.

31. A computing device as recited in claim 27, and further comprising computer-programmable instructions for:

dynamically discovering, by the first data-bound control, operations promoted by a data source view exposed by the first application programming interface, the operations being associated with the first data store; and presenting or disabling, by the first data-bound control, a user interface element to reflect supported or non-supported operations of the operations.

32. A computing device as recited in claim 27, and further comprising computer-programmable instructions for:
receiving a request from the first data-bound control to implement a dynamically discovered operation promoted to the first data-bound control by a respective portion of the first application programming interface;
implementing the dynamically discovered operation, by the first data source control;
responsive to implementing, receiving data from the first data store; and communicating, by the first data source control, the data to a callback of the data-bound control.

33. A computing device as recited in claim 27, and further comprising computer-programmable instructions for navigating, by the first data-bound control, parent-child relationships in hierarchical data associated with the first data store, the navigating being based on a data source view provided by the first application programming interface.

34. A computing device as recited in claim 27, and further comprising computer-programmable instructions for:
automatically implementing, by the first data-bound control, parameterized runtime operations with respect to the first data store via the first application programming interface, the automatic implementing being independent of any page developer code to handle any parameter; and
identifying with declarative parameters underlying the first application programming interface, how parameter values associated with respective ones of the runtime operations are to be evaluated at runtime.

35. A computer-storage medium comprising computer-executable instructions for a data controls architecture, the computer-executable instructions comprising instructions for:
exposing, by a first data source control, a first application programming interface for generic access to a first data store having data types, wherein the first data source control represents the first data store and the capabilities of the first data store;
exposing, by a second data source control, a second application programming interface for generic access to the second data store, wherein the second data source control represents a second data store and the capabilities of the second data store, and wherein the second data store is different from the first data store;
providing a user interface element to support generic access to the first and second data stores;
associating a first data-bound control with the first data source control;
implementing the first application programming interface, by the first data-bound control, to automatically databind to the first data store at an appropriate time during runtime operations of the first data-bound control, wherein the first data source control allows the manipulation of underlying data without requiring a unique application programming interface for each data type being utilized;
associating a second data-bound control with the second data source control wherein the second data bound control is a visual source control whose rendering depends on the second data source control; and
implementing the second application programming interface, by the second data-bound control to automatically databind to the second data store at an appropriate time during runtime operations of the second data-bound control, wherein the second data source control allows the manipulation of underlying data without requiring a unique application programming interface for each data type being utilized;
dynamically discovering, by the first data-bound control, operations supported by the first data store;
disabling, by the first data-bound control, the user interface element to the extent the user interface element reflects operations not supported by the first data store;
presenting the user interface element to reflect operations supported by the first data store;
automatically implementing, by the first data-bound control, parameterized runtime operations with respect to the first data store via the first application programming interface, the automatic implementing being independent of any page developer code to handle any parameter; and
identifying with declarative parameters underlying the first application programming interface, how parameter values associated with respective ones of the runtime operations are to be evaluated at runtime.

36. A method as recited in claim 35, wherein the first data-bound control and the second data-bound control provide different functionality.

37. A method as recited in claim 35, wherein the first application programming interface and the second application programming interface provide different functionality.

38. A method as recited in claim 1, wherein the first data-bound control and the second data-bound control provide different functionality.

39. A method as recited in claim 1, wherein the first application programming interface and the second application programming interface provide different functionality.

* * * * *